(12) United States Patent
Korman et al.

(10) Patent No.: US 12,458,406 B2
(45) Date of Patent: Nov. 4, 2025

(54) JIGS, SYSTEMS, AND METHODS FOR CORRECTING JOINT DEFORMITIES

(71) Applicant: WRIGHT MEDICAL TECHNOLOGY, INC., Memphis, TN (US)

(72) Inventors: Zachary Korman, Memphis, TN (US); Robert Michael Carlo, III, Lakeland, TN (US); Elizabeth J. Phelps, Collierville, TN (US)

(73) Assignee: WRIGHT MEDICAL TECHNOLOGY, INC., Memphis, TN (US)

( * ) Notice: Subject to any disclaimer, the term of this patent is extended or adjusted under 35 U.S.C. 154(b) by 576 days.

(21) Appl. No.: 17/760,050

(22) PCT Filed: Feb. 23, 2021

(86) PCT No.: PCT/US2021/019161
§ 371 (c)(1),
(2) Date: Aug. 3, 2022

(87) PCT Pub. No.: WO2021/206817
PCT Pub. Date: Oct. 14, 2021

(65) Prior Publication Data
US 2023/0056081 A1 Feb. 23, 2023

Related U.S. Application Data

(60) Provisional application No. 63/125,442, filed on Dec. 15, 2020, provisional application No. 63/007,408, filed on Apr. 9, 2020.

(51) Int. Cl.
*A61B 17/66* (2006.01)
*A61B 17/17* (2006.01)
*A61B 17/84* (2006.01)

(52) U.S. Cl.
CPC .............. *A61B 17/66* (2013.01); *A61B 17/17* (2013.01); *A61B 17/846* (2013.01)

(58) Field of Classification Search
CPC ................ A61B 17/66; A61B 17/6425; A61B 2017/565; A61B 17/6491
See application file for complete search history.

(56) References Cited

U.S. PATENT DOCUMENTS

| 1,723,970 A | 8/1929 | Jauch |
| 4,295,827 A | 10/1981 | Martin et al. |
| (Continued) |

FOREIGN PATENT DOCUMENTS

| ES | 1076419 U | 3/2012 |
| KR | 102076634 B1 | 2/2020 |
| (Continued) |

OTHER PUBLICATIONS

International Search Report and Written Opinion issued in connection with International Patent Application No. PCT/US2021/019161, Feb. 23, 2021, 24 pages.

(Continued)

*Primary Examiner* — Julianna N Harvey
(74) *Attorney, Agent, or Firm* — DUANE MORRIS LLP

(57) ABSTRACT

A system includes a first tool. The first tool includes a first component, a second component, and at least one fastener for coupling the first component to the second component. The first component is coupled to the second component such that a distance between the first component and the second component in a first direction is adjustable. The first tool is configured to provide a controlled adjustment of a first bone relative to a second bone in a second direction that is different from the first direction.

13 Claims, 41 Drawing Sheets

(56) References Cited

U.S. PATENT DOCUMENTS

| | | | |
|---|---|---|---|
| 4,548,199 A | 10/1985 | Agee | |
| 4,730,608 A * | 3/1988 | Schlein | A61B 17/66 606/57 |
| 4,929,247 A | 5/1990 | Rayhack | |
| 5,443,467 A | 8/1995 | Biedermann et al. | |
| 6,022,354 A | 2/2000 | Mercuri et al. | |
| 6,296,647 B1 | 10/2001 | Robioneck et al. | |
| 6,755,839 B2 | 6/2004 | Van Hoeck et al. | |
| 7,347,829 B2 | 3/2008 | Mark et al. | |
| 7,549,994 B2 | 6/2009 | Zander et al. | |
| 7,678,102 B1 | 3/2010 | Heaton | |
| 7,686,836 B2 | 3/2010 | Johnston et al. | |
| 7,785,254 B2 | 8/2010 | Teasdale | |
| 8,287,543 B2 | 10/2012 | Medoff | |
| 8,343,199 B2 | 1/2013 | Tyber et al. | |
| 8,663,224 B2 | 3/2014 | Overes et al. | |
| 8,668,699 B2 | 3/2014 | Thomas et al. | |
| 8,685,037 B1 | 4/2014 | Jordan | |
| 8,979,866 B2 | 3/2015 | Patel et al. | |
| 8,998,906 B2 | 4/2015 | Kirschman | |
| 9,107,709 B2 | 8/2015 | Wieland et al. | |
| 9,168,064 B2 | 10/2015 | Hokanson | |
| 9,277,945 B2 | 3/2016 | McDevitt et al. | |
| 9,308,037 B2 | 4/2016 | Richter et al. | |
| 9,351,763 B2 | 5/2016 | Crozet et al. | |
| 9,387,087 B2 | 7/2016 | Tyber | |
| 9,550,277 B1 | 1/2017 | Williams et al. | |
| 9,585,649 B2 | 3/2017 | Blain et al. | |
| 9,597,130 B2 | 3/2017 | Pappalardo et al. | |
| 9,730,741 B2 | 8/2017 | Makhlouf | |
| 9,775,724 B2 | 10/2017 | Blaylock et al. | |
| 9,788,871 B2 | 10/2017 | Simon | |
| 9,936,995 B2 | 4/2018 | Dacosta et al. | |
| 9,993,254 B2 | 6/2018 | Loring et al. | |
| 10,136,904 B2 | 11/2018 | McGinley et al. | |
| 10,159,480 B2 | 12/2018 | Tuten | |
| 10,207,045 B2 | 2/2019 | Banko | |
| 10,226,286 B2 | 3/2019 | Sammarco | |
| 10,391,210 B2 | 8/2019 | Manandhar et al. | |
| 10,441,337 B2 | 10/2019 | Paulisch et al. | |
| 10,499,960 B2 | 12/2019 | Sinnott et al. | |
| 10,517,655 B2 | 12/2019 | Lundquist et al. | |
| 10,709,482 B2 | 7/2020 | Wright et al. | |
| 10,729,453 B2 | 8/2020 | Woodard et al. | |
| 10,736,678 B2 | 8/2020 | Schelling | |
| 10,743,924 B2 | 8/2020 | Krauss et al. | |
| 10,792,051 B2 | 10/2020 | Kohler et al. | |
| 10,856,925 B1 | 12/2020 | Pontell | |
| 10,888,365 B2 | 1/2021 | Tyber et al. | |
| 10,918,431 B2 | 2/2021 | Barmes et al. | |
| 10,987,146 B2 | 4/2021 | Denham | |
| 11,000,327 B2 | 5/2021 | Schlotterback et al. | |
| 11,083,472 B2 | 8/2021 | Windram | |
| 11,123,125 B2 | 9/2021 | Chang | |
| 11,185,359 B2 | 11/2021 | Smith et al. | |
| 11,191,553 B2 | 12/2021 | Ketelhohn et al. | |
| 11,213,333 B2 | 1/2022 | Santrock et al. | |
| 2003/0050603 A1 | 3/2003 | Todd | |
| 2005/0043682 A1 | 2/2005 | Kucklick et al. | |
| 2006/0058798 A1 | 3/2006 | Roman et al. | |
| 2006/0229604 A1* | 10/2006 | Olsen | A61B 17/6425 606/54 |
| 2009/0036931 A1 | 2/2009 | Pech et al. | |
| 2009/0048599 A1* | 2/2009 | Hajianpour | A61B 17/6491 606/59 |
| 2009/0118733 A1* | 5/2009 | Orsak | A61B 17/6475 606/329 |
| 2012/0253410 A1* | 10/2012 | Taylor | A61B 17/6458 606/86 R |
| 2013/0144211 A1 | 6/2013 | Vogt et al. | |
| 2013/0325076 A1 | 12/2013 | Palmer et al. | |
| 2014/0107428 A1 | 4/2014 | Laconte | |
| 2014/0228887 A1 | 8/2014 | Raju et al. | |
| 2017/0281235 A1* | 10/2017 | Lin | A61B 17/62 |
| 2018/0161067 A1* | 6/2018 | Dayton | A61B 17/151 |
| 2018/0242987 A1 | 8/2018 | Lintula et al. | |
| 2018/0242988 A1 | 8/2018 | DaCosta et al. | |
| 2018/0250024 A1 | 9/2018 | Woodard et al. | |
| 2018/0271507 A1* | 9/2018 | Gasser | A61B 17/683 |
| 2020/0015856 A1 | 1/2020 | Treace et al. | |
| 2020/0060698 A1 | 2/2020 | Woodard et al. | |
| 2020/0253641 A1 | 8/2020 | Treace et al. | |
| 2021/0121209 A1 | 4/2021 | Orbay et al. | |
| 2021/0128216 A1 | 5/2021 | Baskin | |
| 2021/0153878 A1 | 5/2021 | Cushen et al. | |
| 2021/0196325 A1* | 7/2021 | Lavi | A61B 17/6416 |
| 2021/0236180 A1 | 8/2021 | Decarbo et al. | |
| 2021/0251670 A1 | 8/2021 | Sayger et al. | |
| 2021/0259716 A1 | 8/2021 | Woodard et al. | |
| 2021/0330311 A1 | 10/2021 | Denham et al. | |
| 2021/0330339 A1 | 10/2021 | Robichaud et al. | |

FOREIGN PATENT DOCUMENTS

| | | | |
|---|---|---|---|
| SE | 532225 C2 * | 11/2009 | A61B 17/6466 |
| WO | 2021178132 A1 | 9/2021 | |
| WO | 2021206817 A1 | 10/2021 | |
| WO | 2021206905 A1 | 10/2021 | |

OTHER PUBLICATIONS

Extended European Search Report issued in connection with corresponding European Patent Application No. 22201429.2, Apr. 17, 2023, 2 pages.

Partial Supplementary Search Report issued in connection with European Patent Application No. 21785689.7, Jan. 5, 2024, 14 pages.

* cited by examiner

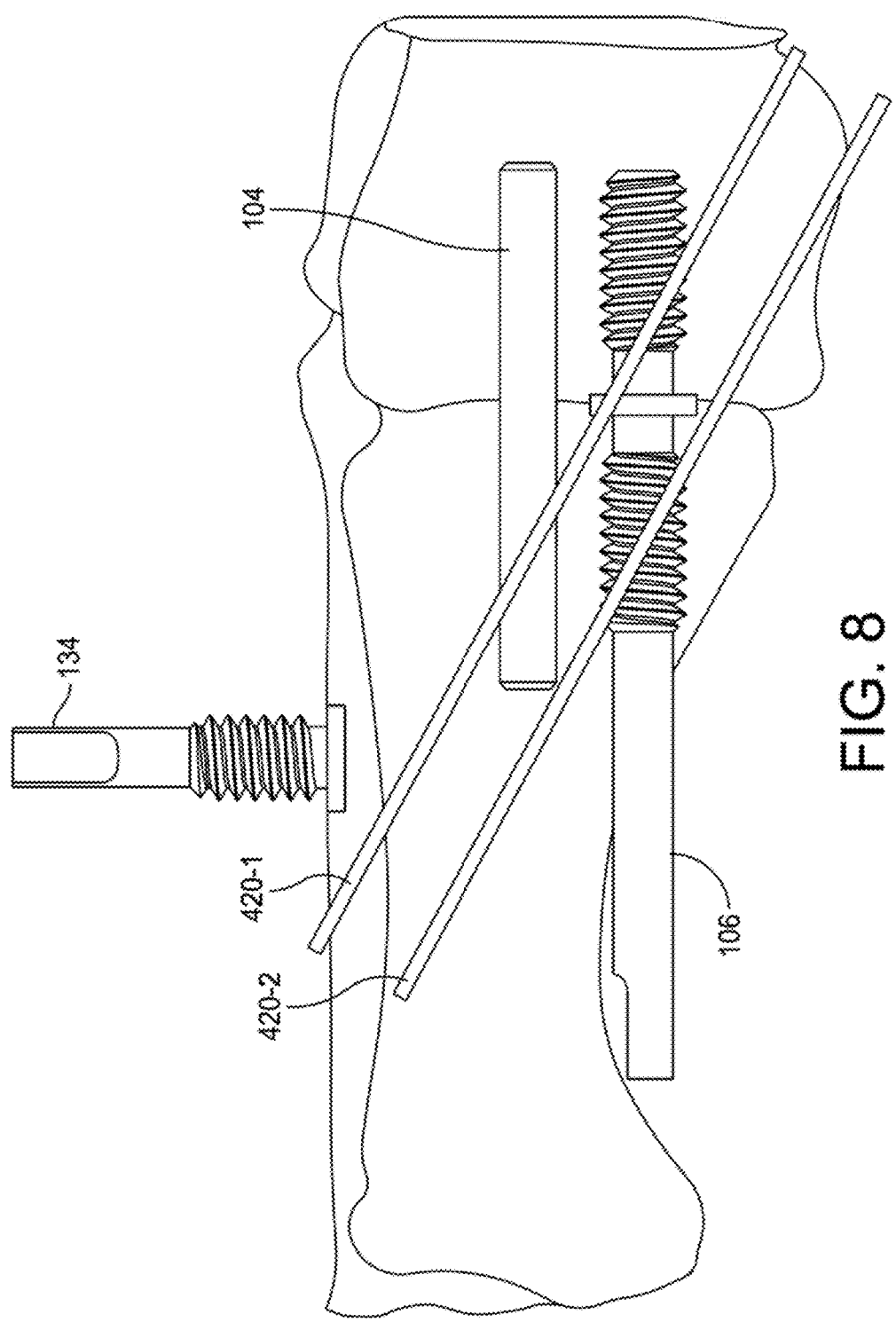

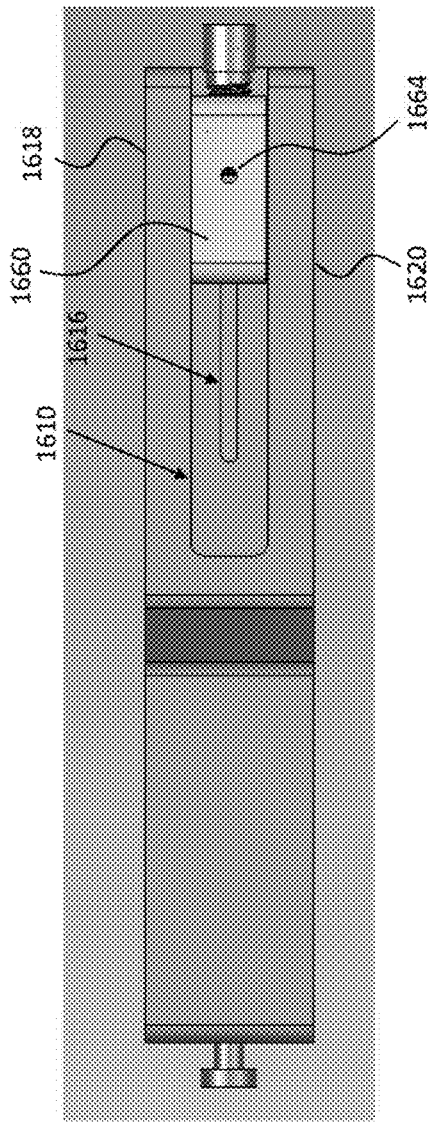
FIG. 37
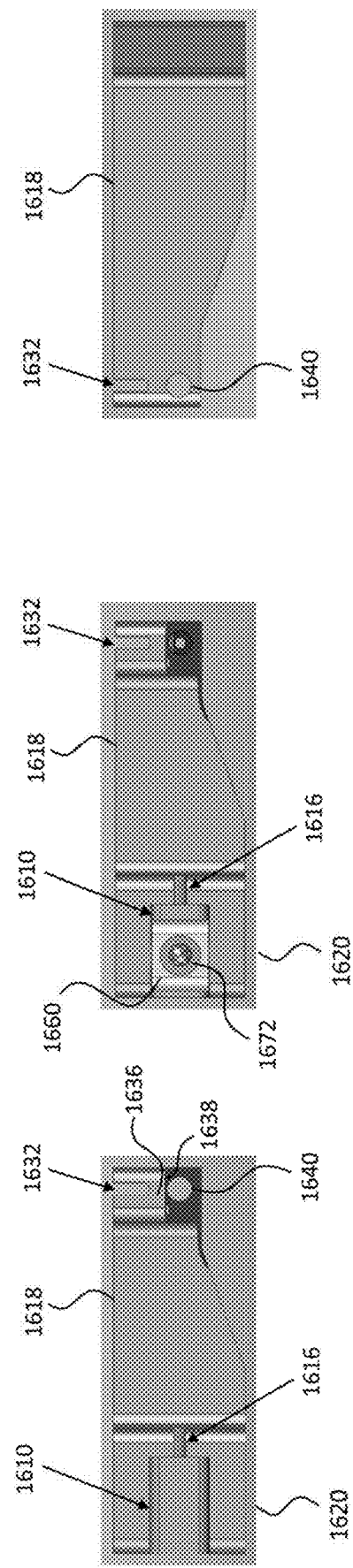
FIG. 40
FIG. 39
FIG. 38

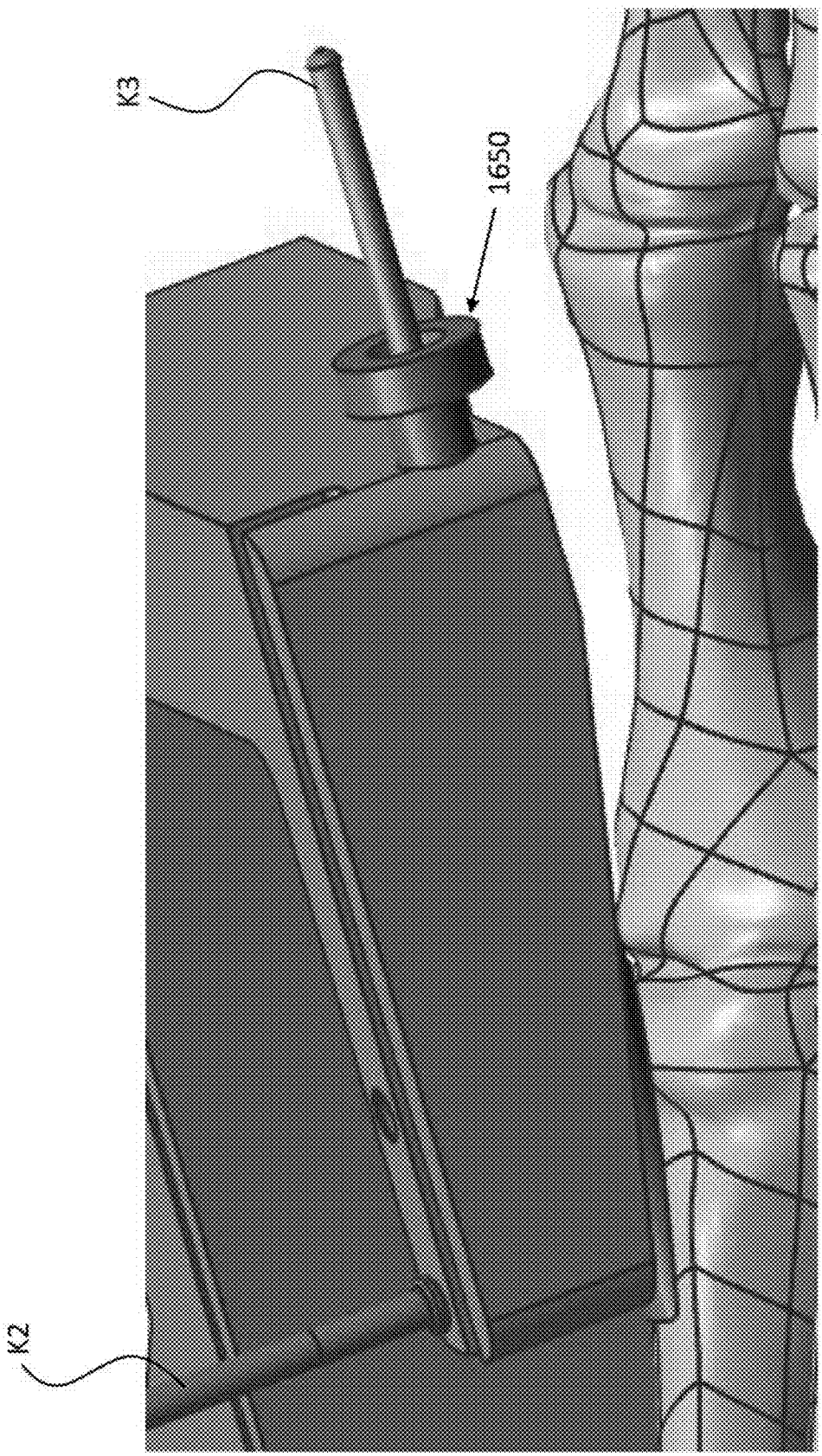

JIGS, SYSTEMS, AND METHODS FOR CORRECTING JOINT DEFORMITIES

CROSS-REFERENCE TO RELATED APPLICATIONS

This application is a National Stage Application, filed under 35 U.S.C. 371, of International Patent Application No. PCT/US2021/019161, filed on Feb. 23, 2021, which claims priority to U.S. Provisional Application No. 63/007,408, filed on Apr. 9, 2020, and U.S. Provisional Application No. 63/125,442, filed on Dec. 15, 2020, the entire contents of which are incorporated herein by reference.

FIELD OF DISCLOSURE

The disclosed systems and methods relate to the field of correcting anatomical structures. More particularly, the disclosed systems and methods relate to correcting defects in anatomical structures in the lower extremities of a patient.

BACKGROUND

Hallux valgus deformities (also known as bunions) occur when a metatarsal goes into a varus state (i.e., is pointed inwardly). In addition to being pointed inward, the metatarsal also may be rotated about its longitudinal axis such that the bottom of the bone is facing outwardly, which may result in the sesamoid being pointed outwardly when it should be located underneath the metatarsal. Correction of a bunion typically requires surgery, such as a Lapidus procedure, to fuse the TMT1 joint (i.e., the joint between the first metatarsal and first cuneiform).

SUMMARY

A system includes a first tool. The first tool includes a first component, a second component, and at least one fastener for coupling the first component to the second component. The first component is coupled to the second component such that a distance between the first component and the second component in a first direction is adjustable. The first tool is configured to provide a controlled adjustment of a first bone relative to a second bone in a second direction that is different from the first direction.

A system includes a first tool for being coupled to a first bone and a second bone that together form a joint. The first tool includes a first body component, a second body component, and a first threaded fastener for coupling the first body component to the second body component. The first body component is configured to receive one or more fixation devices for coupling the first body component to the first bone. The second body component is configured to receive one or more fixation devices for coupling the second body component to the second bone. The first threaded fastener includes a first threaded section and a second threaded section. Rotation of the first threaded fastener in a first direction causes the first and second body components to move toward each other in a second direction to compress the joint, and rotation of the first threaded fastener in a third direction causes the first and second body components to move away from each other in a fourth direction to distract the joint. The first body component is configured to translate in a fifth direction relative to the second body component to translate the first bone relative to the second bone.

BRIEF DESCRIPTION OF THE DRAWINGS

FIG. 8 illustrates one example of the view of the jig and targeting arm shown in FIG. 7 under fluoroscopy;

FIG. 37 is a side view of the targeting arm illustrated in FIG. 36 in accordance with some embodiments;

FIG. 38 is another side view of the targeting arm illustrated in FIG. 36 with an adjustment guide block having been removed in accordance with some embodiments;

FIG. 39 is the same side view of the targeting arm provided in FIG. 38 with the adjustment guide block provided within the channel of the targeting arm in accordance with some embodiments;

FIG. 40 is side view of the targeting arm that is opposite the side views shown in FIGS. 38 and 39 in accordance with some embodiments;

FIG. 53 illustrates one example of a fixation element being placed using the targeting arm illustrated in FIGS. 36-44 in accordance with some embodiments.

DETAILED DESCRIPTION

This description of the exemplary embodiments is intended to be read in connection with the accompanying drawings, which are to be considered part of the entire written description.

The disclosed devices and systems may be used in a wide variety of surgical methods and procedures. The disclosed devices and systems advantageously enable the controlled adjustment of adjacent bones in a number of ways. For example, the disclosed devices and systems enable the distraction, rotation, and compression of adjacent bones.

Figure 1:
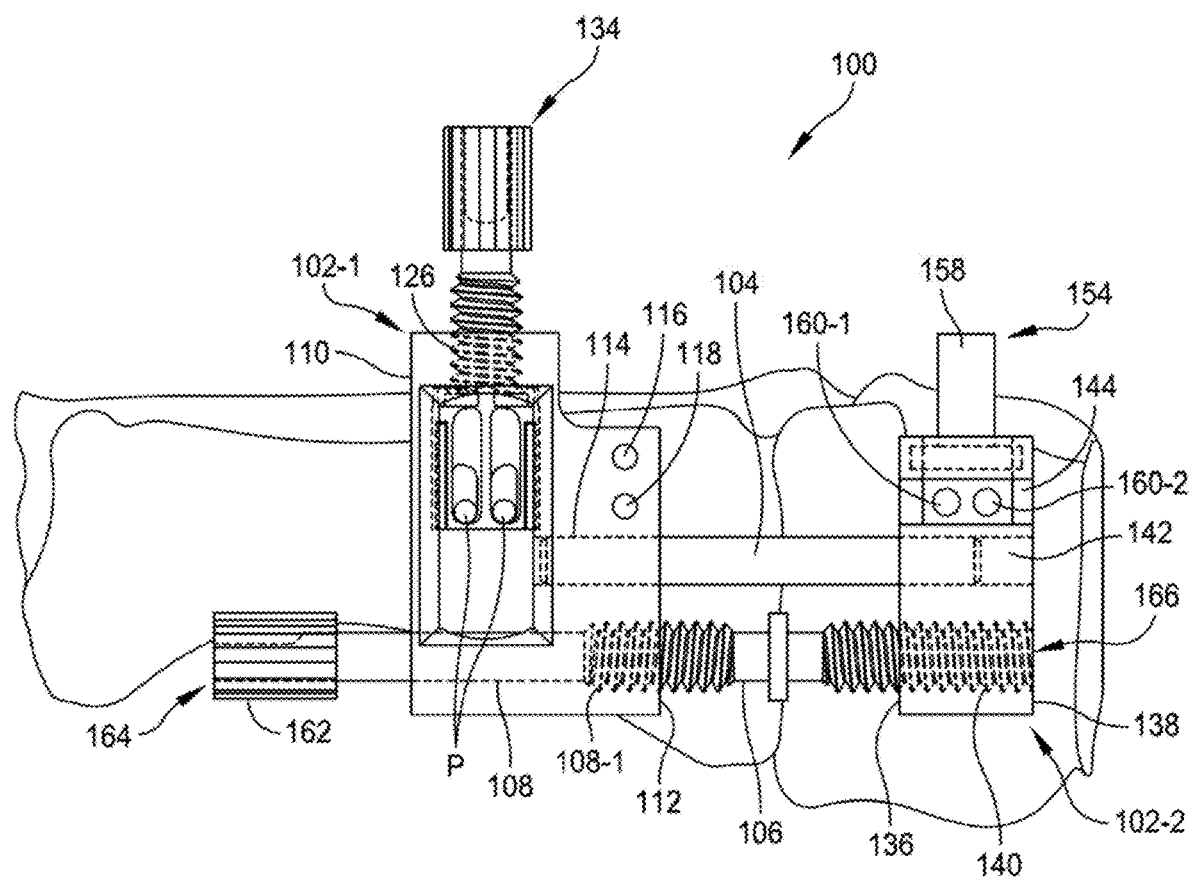
FIG. 1 is a side view of one example of a compression/distraction jig in accordance with some embodiments.

FIG. 1 illustrates one example of a jig 100 in accordance with some embodiments. As shown in FIG. 1, jig 100 may include a first body portion 102-1 and a second body portion 102-2 (collectively; "body 102"). The first and second body portions 102-1, 102-2 may be coupled together by one or more fasteners. For example, in some embodiments, the one or more fasteners include at least one dowel 104 and at least one bolt 106. More particularly, first body portion 102-1 defines a first hole 108 extending from a first side 110 of body portion 102-1 to a second side 112 of body portion 102-1. Hole 108 includes a threaded portion 108-1 extending inwardly from second side 112 of body portion and is sized and configured to receive bolt 106 as described herein. First body portion 102-1 also defines a second hole 114, which extends inwardly from second side 112. In some embodiments, second hole 114 is a blind hole sized and configured to receive dowel 104 as described herein. However, one of ordinary skill in the art will understand that second hole 114 may be a through hole. First and second holes 108, 114 may be disposed parallel to one another as illustrated in FIG. 1.

Body portion 102-1 may also define one or more holes 116, 118 that extend through body portion 102-1 from side 120 to side 122. Holes 114, 116 may extend through body portion 102-1 parallel to one another and perpendicular to holes 108, 114. As described in greater detail below, holes 116, 118 facilitate securing jig 100 to a first bone.

Figure 2:
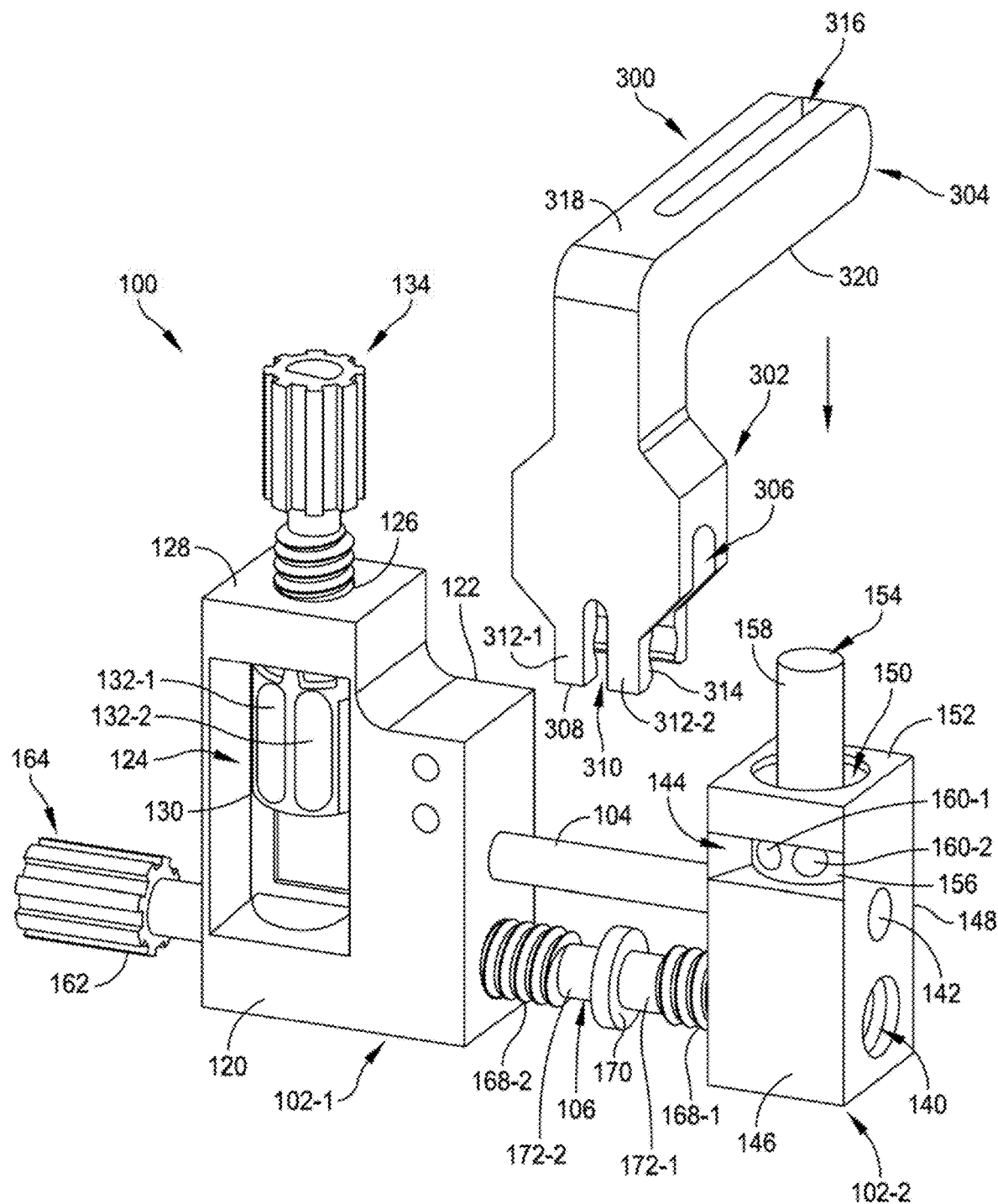
FIG. 2 is an isometric view of a placement tool and the jig illustrated in FIG. 1 in accordance with some embodiments.

Body portion 102-1 may also define an opening 124 that extends from side 120 to side 122. Opening 124 may have a generally rectangular shape when viewed from the side (e.g., as shown in FIG. 2); however, one of ordinary skill in the art will understand that opening may have other shapes. Body portion 102-1 also defines a threaded hole 126 extending inwardly from side 128 such that threaded hole 126 is in communication with opening 124. Opening 124 is sized and configured to receive a rotational insert 130, and threaded hole 126 is sized and configured to receive a bolt therein.

In some embodiments, rotational insert 130 defines a pair of parallel slots 132-1, 132-2 (collectively, "slots 132") that extend through rotational insert 130. Slots 132 are sized and configured to receive pins or k-wires therein. In some embodiments, the upper surface of rotational insert 130 is recessed to receive an end of a bolt 134. The surfaces of rotational insert 130 that define the slots 130 may be angled, which limits the vertical translation that can occur when actuating bolt 134 before all surfaces are in contact while maintaining angular freedom (e.g., front-plane rotation of the first metatarsal). As noted above, rotational insert 130 is sized and configured to be received within opening 124. When positioned within opening 124, rotational insert 130 is able to rotate about its central longitudinal axis as well as translate up and down along its longitudinal axis as will be described in greater detail below.

Second body portion 102-2 defines a threaded hole 140, which may extend from side 136 entirely through second body portion 102-2 to side 138. Threaded hole 140 is sized and configured to receive at least a portion of bolt 106 therein as will be described in greater detail below. Second body portion 102-2 also defines another hole that may extend from side 136 entirely through second body portion 102-2 to side 138. A person of ordinary skill in the art will understand that, in some embodiments, hole 142 may be a blind hole extending inwardly from side 136. Hole 142 is sized and configured to at least partially receive dowel 104 via a slip fit, although one of ordinary skill in the art will understand that hole may be sized to receive dowel 104 with other fit types.

Second body portion 102-2 also defines a window 144 that extends from side 146 to side 148. Window 144 communicates with hole 150, which extends inwardly from side 152. The combination of window 144 and hole 150 are sized and configured to receive a rotational insert 154. Rotational insert 154 includes a base 156 and a stem 158, which has a diameter that is smaller than a diameter of base 156. In some embodiments, base 156 defines a pair of parallel holes 160-1, 160-2 (collectively, "holes 160") that extend through the entirety of base 156. Base 156 is sized and configured to be received within window 144 such that base 156 is able to rotate about a central longitudinal axis that extends through base 156 and stem 158. Stem 158 is sized and configured to be received within hole 150 such that stem 158 may be rotated within hole 150.

Bolt 106, which is configured to couple together the first and second body portions 102-1, 102-2 and to provide compression and distraction as described herein. Bolt 106 extends from a head 162 disposed at a first end 164 to a second end 166. Bolt 106 includes a first threaded section 168-1 and a second threaded section 168-2 that are separated from one another by intermediate section 170. Threaded sections 168-1, 168-2 (collectively, "threaded sections 168") may be oppositely threaded. For example, in some embodiments, threaded section 168-1 is left-handed threaded, and threaded section 168-2 is right-handed threaded. In some embodiments, threaded section 168-1 is right-handed threaded, and threated section 168-2 is left-handed threaded. Intermediate section 170 includes an enlarged diameter region or shoulder disposed between two unthreaded portions 172-1, 172-2 (collectively, "unthreaded portions 172").

As noted above, the combination of dowel 104 and bolt 106 couple together body portion 102-1 and body portion 102-2. Specifically, dowel 104 is received within hole 114 defined by body portion 102-1 and within hole 142 defined by portion 102-2. As noted above, in some embodiments, dowel 104 is received within hole 114 and hole 142 via a slip fit such that body portions 102-1, 102-2 may translate along dowel 104, although dowel 104 may be received within hole 114 with other fits, including a press-fit. Second threaded section 168-1 of bolt 106 is threaded into threaded hole 140 of body portion 102-2, and first threaded section 168-2 is threaded into threaded hole 108 of body portion 102-1 such that head 162 of bolt 106 is positioned adjacent to side 110 of body portion 102-1. In some embodiments, the head 162 of bolt 106 is a separate component that is coupled to the shaft after bolt is positioned within body portions 102-1, 102-2.

In use, jig 100 may be secured to two different bones of a joint to facilitate compression and/or distraction of a joint as well as allowing for the adjustment of the angle of the one or more bones without the need to remove the jig from its engagement with the two different bones. For example, jig 100 may be secured to a first bone (such as a metatarsal) via pins inserted through slots 132 defined by rotational insert 130, which is supported by body portion 102-1, and be secured to a second bone (such as a cuneiform) via pins inserted through holes 160 defined by rotational insert 154, which is supported by body portion 102-2.

With jig 100 secured to bones, a number of adjustments may be made using the jig. For example, the bones may be moved relative to one another to adjust an angle between the two adjacent bones due to rotational inserts 130, 154 being able to pivot/rotate relative to the respective body portions 102-1, 102-2 by which they are supported. Additionally, rotation of the first bone may be made about its longitudinal axis (e.g., parallel to the axis of bolt 106 and dowel 114), which is supported by the angled nature of slots 132 described above.

Rotational insert 130 also facilitates the vertical (e.g., dorsal/plantar) adjustment of one bone relative to another bone. For example, the rotation of bolt 134 in a first direction relative to body portion 102-1 causes bolt 134 to advance into hole 126 and contact the upper surface of rotational insert 130. Rotation of bolt 134 exerts pressure on rotational insert 130 such that rotational insert 130 slides along pins P disposed within slots 132 defined by rotational insert 130 until the pins P contact the upper-most surface of slots 130. Continued rotation of bolt 134 causes rotational insert 130 to slide along opening 124 and causes the bone engaged by pins extending through slots 132 to move in a plantar direction relative to the bone engaged by pins that extend through holes 160 defined by rotational insert 154. In this manner, a surgeon or operation is provided with the ability to control precisely the elevation of one bone relative to the other.

Jig 100 may also be used to compress or distract the adjacent bones (or bone segments). Compression and/or distraction is achieved through the rotation of bolt 106, which may include two separately threaded sections 168 as described above. For example, rotating bolt in a first direction (e.g., counterclockwise or clockwise) may cause the body portions 102 to move away from each other, which in turn causes the joint to be distracted. Rotating the bole in the opposite direction (e.g., clockwise or counterclockwise) may then cause the body portions 102 to move toward each other, which in turn causes the joint to be compressed.

Figure 4:
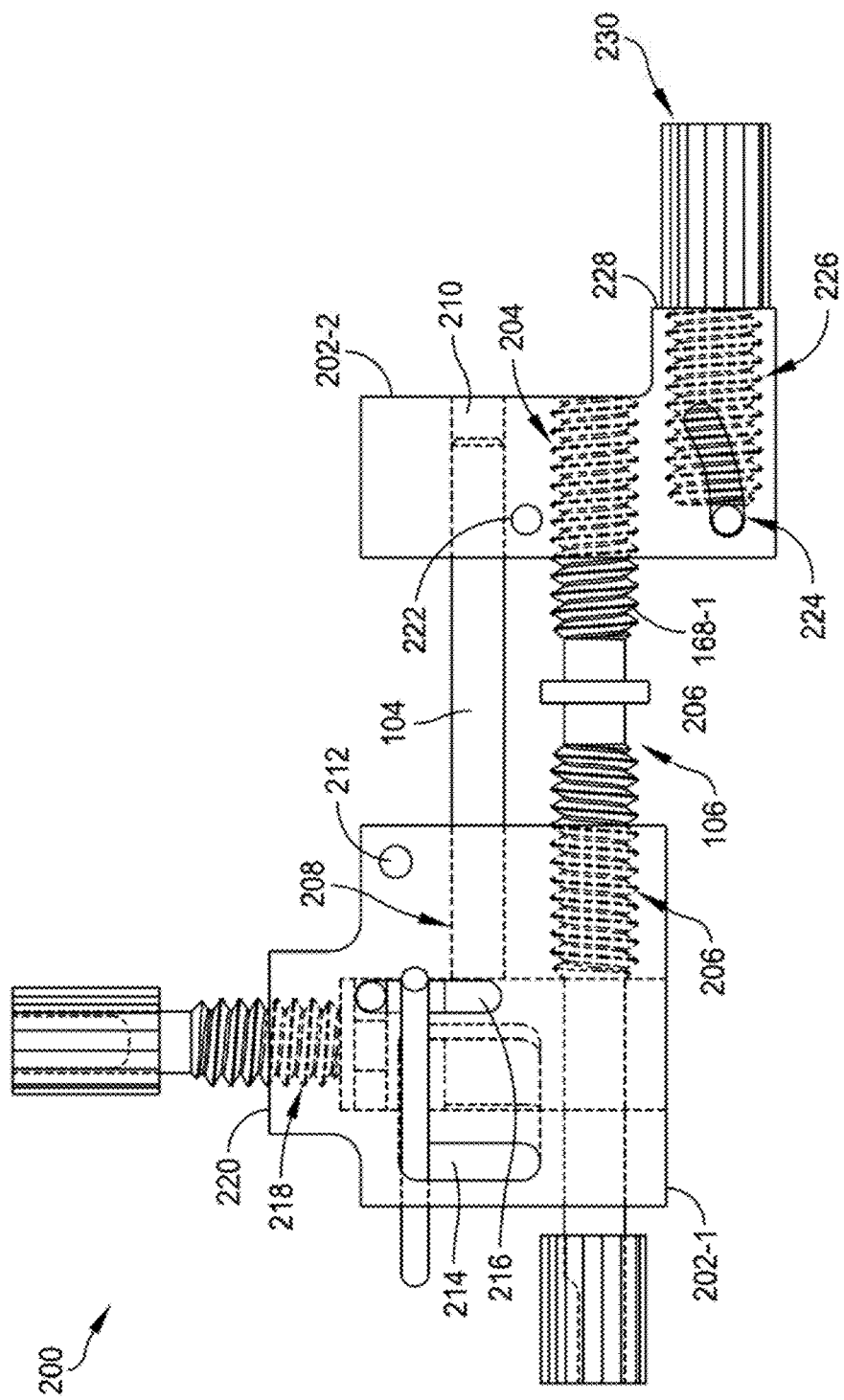
FIG. 4 illustrates another example of a compression/distraction jig in accordance with some embodiments.

FIG. 4 illustrate another example of a jig in accordance with some embodiments. Jig 200 includes first and second body portions 202-1, 202-2 (collectively, "body portions 202"). Body portions 202 may be moveably coupled together using a dowel 104 and bolt 106, which may be the same dowel and bolt described above concerning jig 100.

More particularly, a first threaded section 168-1 of bolt 106 may be received within a hole 204 that is at least partially threaded and defined by body section 202-2, and a second threaded section 168-2 of bolt 106 may be received within a hole 206 that is at least partially threaded and defined by body section 202-1. Dowel 104 may be received within a hole 208 defined by body section 202-1 and within a hole 210 defined by body section 202-2. In some embodiments, dowel 104 is received within holes 208, 210 via slip fit; however, one of ordinary skill in the art will understand that dowel 104 may be received within holes 208, 210 with other types of fit and/or a combination of fits. For example, dowel 104 may be received within hole 208 with a press fit while being received within hole 210 with a slip fit or vice versa.

Body portion 202-1 also defines at least one hole 212 extending through body portion 202-1. The at least one hole 212 is sized and configured to receive a pin or k-wire therethrough for securing body portion 202-1 to a first bone or bone segment. Body portion 202-1 also defines first and second slots 214, 216, each of which extend through body portion 202-1. Slots 214, 216 are both sized and configured to receive a pin, k-wire, or other fixation implement therethrough. In some embodiments, slot 214 is formed at an angle with respect to slot 216 such that a longitudinal axis defined by a pin or k-wire received through slot 214 will not be parallel to a longitudinal axis defined by a pin or k-wire received through slot 216 or a longitudinal axis defined by a pin or k-wire received through hole 212. Body portion 202-1 also defines a threaded hole 218 extending inwardly from side 220. Threaded hole 218 is arranged such that it is communication with slot 214 and slot 216 such that a bolt may be advanced into threaded hole 218 and contact a pin disposed within slot 214 and a pin disposed within slot 216 as described in greater detail below.

Body portion 202-2, in addition to including holes 204 and 210 for receiving dowel 104 and bolt 106, respectively, includes a hole 222 and a slot 224. In some embodiments, slot 224 is curved; however, one of ordinary skill in the art will understand that slot 224 may be straight and provided at an angle relative to a longitudinal axes defined by the bolt 106. Each of hole 222 and curved slot 224 extend through body portion 202-2. Further, both hole 222 and slot 224 are dimensioned to receive a pin, k-wire, or other fixation implement therethrough. Body portion 202-2 defines another threaded hole 226, which extends inwardly from side 228 such that threaded hole 226 is in communication with slot 224.

Jig 200 may be used in a similar manner as jig 100 described above. However, jig 200 also provides the surgeon with the ability control the plantarflexion of the joint. For example, when jig 200 is secured to first and second bones (or bone segments) between which a joint is formed, a surgeon may use bolt 230 to adjust (plantarflex) the joint. More particularly, rotation of the bolt 230 relative to body portion 202-2 causes bolt to advance into hole 226 where the leading end of bolt 230 contacts a pin disposed within curved slot 224. Continued advancement of bolt 230 into hole 226 moves the pin along curved slot 224, which results in the jig 200 pivoting about the pin that is disposed within bone and hole 222 defined by body portion 202-2.

Jig 200 can be used to distract/compress a joint in a similar manner as described above with respect to jig 100. For example, a surgeon may rotate bolt 106 in a first direction (e.g., counterclockwise or clockwise), which results in body portions 202-1, 202-2 being moved away from one another to distract the joint. Rotating bolt in the opposite directed (e.g., clockwise or counterclockwise) causes the body portions 202-1, 202-2 to move toward each other thereby compressing the joint.

Figure 3:
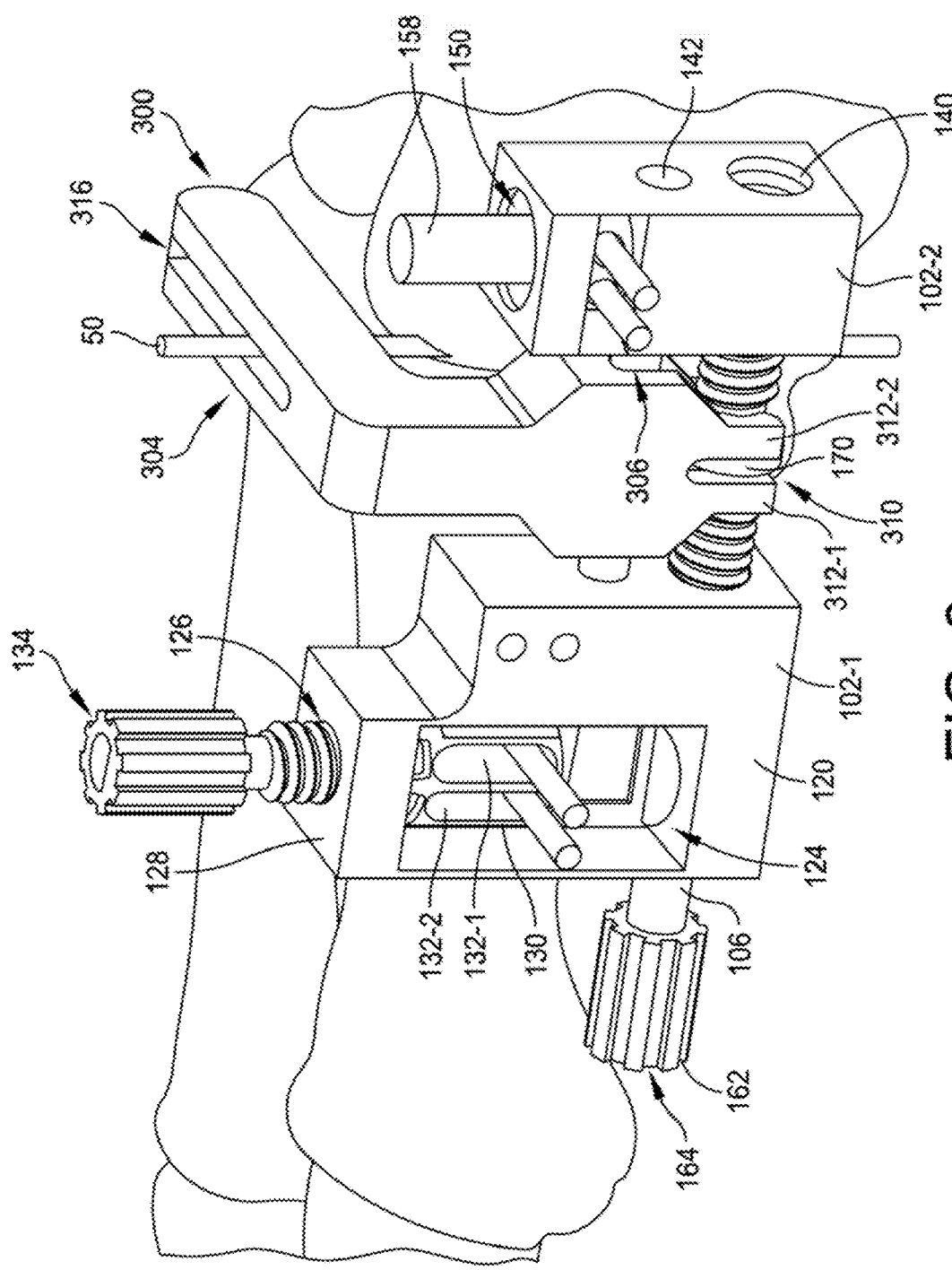
FIG. 3 illustrates the placement tool and jig being coupled across a joint in accordance with some embodiments.

In some embodiments, a placement device may be provided and/or used in connection with jig 100 and/or jig 200. One example of such a placement device 300 is shown in FIGS. 2 and 3. Placement device 300 includes a coupling section 302 and a handle section 304, which may extend from coupling section 302 at an oblique or right angle.

Coupling section 302 defines a recess 306 that inwardly extends from end 308. In some embodiments, the depth of recess 306 is dimensioned to receive both dowel 104 and bolt 106 when dowel 104 is received within hole 114 defined by body portion 102-1 and hole 142 defined by body portion 102-2 and when bolt 106 is received within hole 108 defined by body portion 102-1 and hole 140 defined by body portion 102-2.

Coupling section 302 also defines a second recess 310 extending inwardly from end 308 in a direction that is orthogonal to the direction of recess 306. Recess 310 has a depth that provides clearance for receiving the enlarged diameter 170 of intermediate section of bolt 106 when dowel 104 and bolt 106 are received within recess 306 as described in greater detail above. In some embodiments, the orthogonal arrangement of recess 306 and recess 310 results in coupling section 302 including arm pairs 312-1, 312-2 (collectively, "arms 312"). The end of each arm 312 may include a tooth 314 (collectively, "teeth 314") extending inwardly into recess 306. Teeth 314 are sized and configured to engage the unthreaded portions 172 of intermediate section 170 of bolt 106.

Handle section 304 may extend from coupling section 302 at an oblique or right angle as noted above. As best seen in FIG. 2, handle section 304 defines a slot 316 extending from an upper surface 318 to lower surface 320. Slot 316 is dimensioned (e.g., has a width) to receive a k-wire, pin, or other surgical device therethrough. The length of slot 316 may vary as will be understood by one of ordinary skill in the art. In some embodiments, the slot 316 may be replaced by or provided by a plurality of holes that either intersect with one another or are positioned adjacent to one another such that one or more holes may be selected to receive a k-wire, pin, or otherwise surgical device therethrough. A person of ordinary skill in the art will understand that the handle section 304 may define one or more openings (e.g., holes, slots, and/or combinations thereof) along at least a portion of its length to receive one or more surgical devices therethrough.

The placement device 300 may be used to guide the placement of a jig 100, 200. For example, a surgeon may place a joint-finding k-wire 50 down through a joint in a dorsal-plantar view (see FIGS. 5 and 6). The placement device 300 is snapped into engagement with the jig 100, 200 by sliding the coupling section 302 over dowel 104 and bolt 106 of the jig 100, 200 such that dowel 104 and bolt 106 are received within recess 306 and the teeth 314 engage the unthreaded portions 172 of the intermediate section 170 of bolt 106 and the enlarged diameter of intermediate section 170 is received within recess 310 defined by the coupling section 302 of placement device 300.

With a joint-finding k-wire 50 positioned in the joint and placement device 300 engaged with jig 100, 200, the surgeon may use the handle portion 304 of placement device 300 to align the slot 316 defined by the handle portion 304 of placement device 300. The assembly of the placement device 300 and jig 100, 200 is lowered into position such that the k-wire 50 disposed within the joint is received within the slot defined by the handle portion 304 of placement device 300 as best seen in FIG. 3.

The surgeon may then insert pins through the jig 100, 200 to secure the jig 100, 200 to the bones or bone segments. For example, if jig 100 is used, then pins may be inserted into holes 116, 118 and/or through slots 132 defined by rotational insert 130 supported by body portion 102-1 and inserted through holes 160 defined by rotational insert 156 supported by body portion 102-2. If jig 200 is used, then pins may be inserted through slots 214, 216 and/or hole 212 defined by body portion 202-1 to secure body portion 202-1 to a first bone or bone segment, and pins may also be inserted through hole 222 and slot 224 to secure body portion 202-2 to a second bone or bone segment.

Once the jig 100, 200 has been secured to the bones or bone segments across a joint, then the placement device 300 may be removed from its engagement with jig 100, 200. To remove the placement device 300 from its engagement with jig 100, 200, the placement device is pulled vertically (e.g., upwardly away from dowel 104 and bolt 106) to disengage teeth 314 from the unthreaded portions 172 of bolt 104. With placement device 300 removed from its engagement with jig 100, 200 and jig 100, 200 still secured to the bones or bone segments, then other tools may be coupled to the jig 100, 200 to aid a surgeon or other individual in carrying out the rest of a desired surgical procedure.

Figure 7:
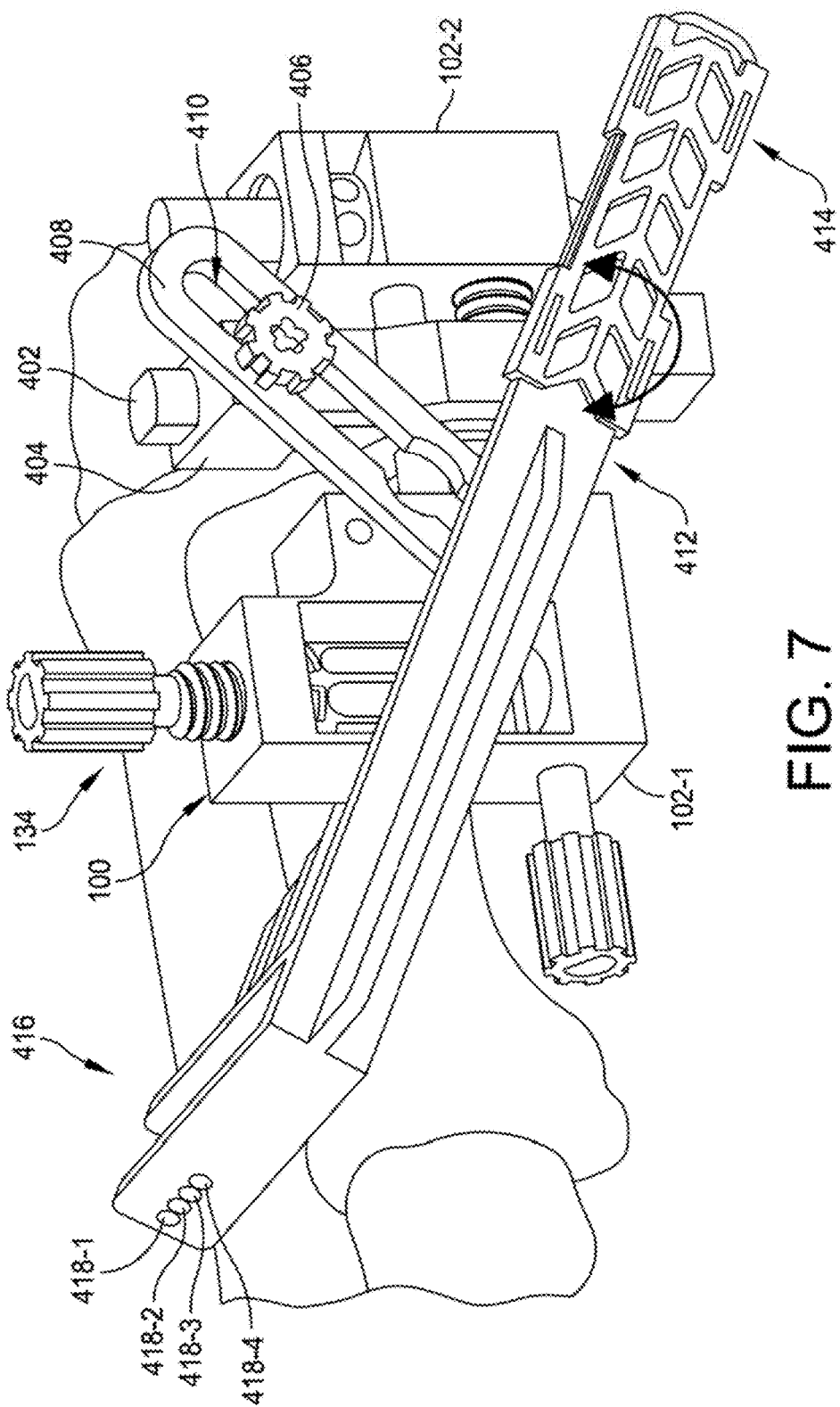
FIG. 7 illustrates one example of the jig illustrated in FIG. 1 configured with a targeting arm in accordance with some embodiments.

FIG. 7 illustrates one example of a tool guide 400 coupled to jig 100 in accordance with some embodiments. One of ordinary skill in the art will understand that while tool guide 400 is shown being coupled to jig 100, the tool guide 400 may be coupled to jig 200.

Tool guide 400 includes a base frame 402 including a coupling section having a similar configuration to coupling section 302 of placement device 300. Tool guide 400 also includes body 404 defining a hole that is sized and configured to receive at least a portion of base frame 402. In some embodiments, body 404 slideably receives a portion of base frame 402 such that body may be moved up and down along base frame 402.

Body 404 defines a hole sized and configured to receive a bolt or thumb screw 406. Thumb screw 406 couples an elongate slide arm 408 to body 404 and locks body 404 relative to base frame 402. In some embodiments, slide arm 408 defines an elongate slot 410 that is sized and configured to receive thumb screw 406. A rotating arm 412 is pivotably coupled to body 404 at a pivot point. Rotating arm 412 includes a handle portion 414 and a targeting portion 416, which extends at an oblique or right angle away from handle portion 414. Targeting portion defines one or more holes 418-1, 418-2, 418-3, 418-4 (collectively, "holes 418") each being sized and configured to receive a k-wire, pin, nail, and sleeve and drill therein.

Slide arm 408 may be slid along bolt 406 via slot 410 to adjust the location of holes 418 relative to a jig 100, 200 and bone(s). Rotating arm 412 may be rotated about a pivot point, which may cause slide arm 410 to move relative to body 404 and thumb screw 406. The position of slide arm 408 and rotating arm 412 may be fixed by rotating thumb screw 406 as will be understood by one of ordinary skill in the art.

In some embodiments, tool guide 400 is formed from radiolucent materials and rotating arm 412 includes one or more radiopaque elements for providing fluoroscopic guidance. For example, rotating arm 412 may include embedded radiopaque elements 420-1, 420-2 (collectively, "radiopaque elements 420") as illustrated in FIG. 8, which illustrates the jig 100 and tool guide 400 under fluoroscopy in accordance with some embodiments. Radiopaque elements 420 may be oriented such that they are parallel to the axis defined by holes 418. Thus, a physician may check the angle at which a k-wire, pin, nail, screw, or any appropriate fastener or fixator inserted through one of the holes 418 would be positioned within bone by using fluoroscopy to visualize radiopaque elements 420.

Figure 9:
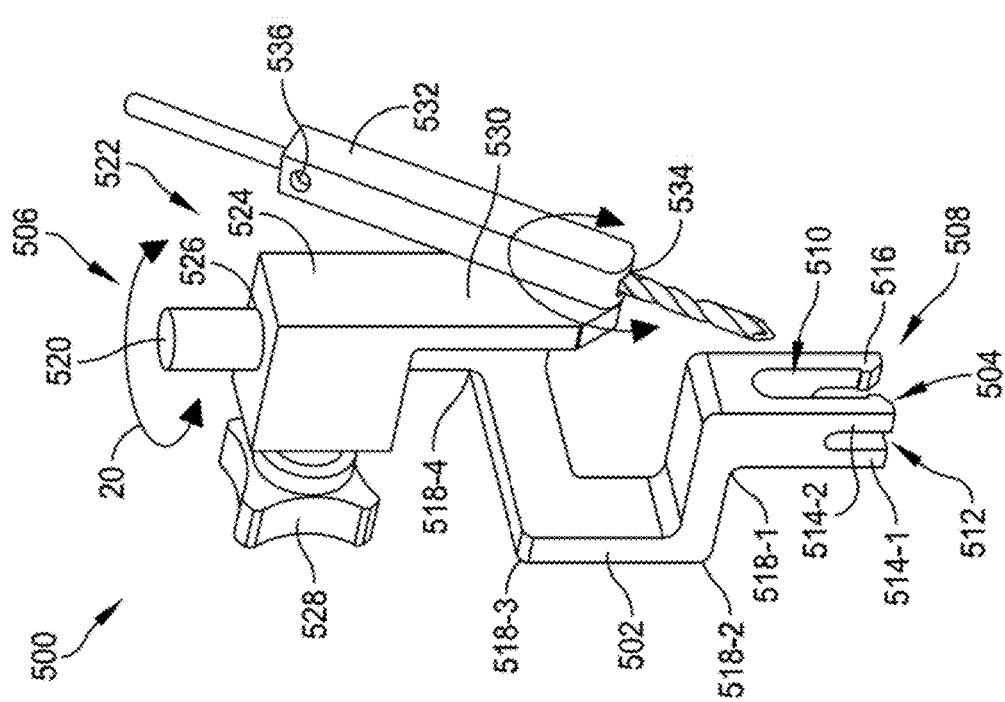
FIG. 9 is an isometric view of one example of a tool guide that may be coupled to a jig in accordance with some embodiments.

FIG. 9 illustrates one example of a guidance tool 500 that may be used in connection with a jig 100, 200 in accordance with some embodiments. In some embodiments, guidance tool 500 provides guidance for a burr or other cutting instrument.

Guidance tool 500 includes a base frame 502 extending from a first end 504 to a second end 506. A coupling section 508 is located at first end 504. In some embodiments, coupling section 508 is somewhat similar to the coupling section 302 of placement device 300 given that both tools may be coupled to a jig 100, 200 in a similar manner. For example, coupling section 508 includes a first recess 510 extending inwardly from end 506 and a second recess 512 that also inwardly extends from end 506. The first and second recesses 510, 512 are oriented orthogonally with respect to one another thereby providing arm pairs 514-1, 514-2 (collectively, "arms 514"). The end of each arm 514 may include a tooth 516 (collectively, "teeth 516") extending inwardly into recess 510. Teeth 516 are sized and configured to engage the unthreaded portions 172 of bolt 106.

In some embodiments, first recess 510 extends from end 504 to a depth that enables both the dowel 104 and at least a portion of the bolt 106 to be received within recess 510, and recess 512 extends to a depth that enables at least a portion of enlarged diameter of intermediate section 170 of bolt 106 to be received within the recess 512 when the dowel 104 and bolt 106 are received within recess 510.

Base frame 502 may include one or more bends or curves 518-1, 518-2, 518-3, 518-4 (collectively, "bends 518" or "curves 518") along its length between first end 504 and second end 506 to provide the tool guide 522 at the desired location relative to coupling section 508. Frame 502 also includes a stem 520 that extends vertically from a bend 518-4 to end 506. In some embodiments, stem 520 has a circular cross-sectional geometry to facilitate rotation of a tool holder subassembly 522 coupled to stem 520 as indicated by arrow 20 in FIG. 9.

The tool holder subassembly 522 includes a base 524 defining a hole 526 sized and configured to receive the stem 520 of base frame 502 therein. Base 524 may define a second hole that is positioned angle with respect to hole 526 for receiving a locking device 528. In some embodiments, locking device 528 includes a knob disposed at an end of a threaded shaft (not shown). Locking device 528 may be rotated relative to base 524 such that the leading end of the threaded shaft engages the stem 520 to fix the location of the tool holder subassembly 522 relative to base frame 502.

Base 524 may also include an extension 530 that extends parallel to stem 520. A tool guide 532 may be pivotably coupled along the length of extension 530. In some embodiments, tool guide 532 includes a hollow shaft defining a hole 534 sized and configured to receive a burr or other cutting or drilling device. The pivotal coupling of tool guide 532 to base 524 enables a burr or other cutting device to be guided while making sweeping (e.g., arced) cuts, such as those cuts frequently used to debride a joint during a Lapidus surgery. A hole 536, sized and configured to receive a k-wire, pin, or other radiopaque element, may be provided along the length of tool guide 532 for providing fluoroscopic guidance of the plane of the sweeping, arced cuts.

Figure 10:
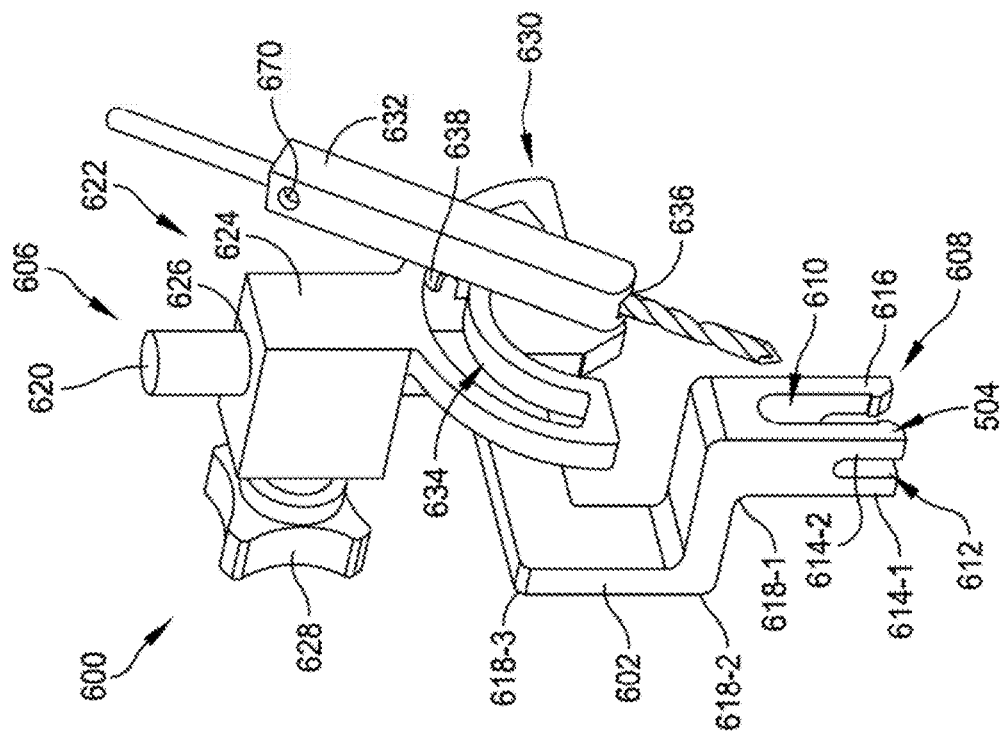
FIG. 10 is an isometric view of another example of a tool guide that may be coupled to a jig in accordance with some embodiments.

FIG. 10 illustrate another example of a guidance tool 600 in accordance with some embodiments. Guidance tool 600 includes the same base frame as the guidance tool 500 shown in FIG. 9, and a repeat discussion of the common features is not provided. The elements of the base frame of guidance tool 600 that are the same as those of base frame 502 of guidance tool 500 have the same reference numerals increased by 100.

Tool holder subassembly 622 includes a base 624 defining a pair of holes that are in communication with one another and disposed at angle with respect to one another. Hole 626 is sized and configured to receive the stem 620 of base frame 602 via a slip fit such that base 624 may be rotated about stem 620. The other hole is sized and configured to receive a locking device 628. In some embodiments, locking device 628 may include a knob disposed at an end of a threaded shaft (not shown). Locking device 628 may be rotated relative to base frame 602 such that the leading end of the threaded shaft engages the stem 620 to fix the location of the tool holder subassembly 622 relative to base frame 602.

Base 624 also includes an extension 630 that defines a track 634 and includes pivotal coupling to a tool guide 632. In some embodiments, track 634 includes a curved slot that is sized and configured to receive a pin or projection 638 coupled to the tool guide 632. In some embodiments, projection 638 includes arms or hooks that engage the top and bottom of slot 634 to provide enhanced stability. In some embodiments, the projection 638 could be configured to receive a cross pin to maintain the engagement between tool holder 632 and base 624. As will be understood by one of ordinary skill in the art, track 634 is configured to guide the projection 638 as tool guide 632 is pivoted about its pivotal coupling.

Tool holder 632 may also define a hole 670 along its length for providing fluoroscopic guidance of the plant of the sweeping, arced cuts. For example, the hole 670 may be sized and configured to receive a k-wire, pin, or other radiopaque element therein that may be viewed under fluoroscopy.

Figure 11:
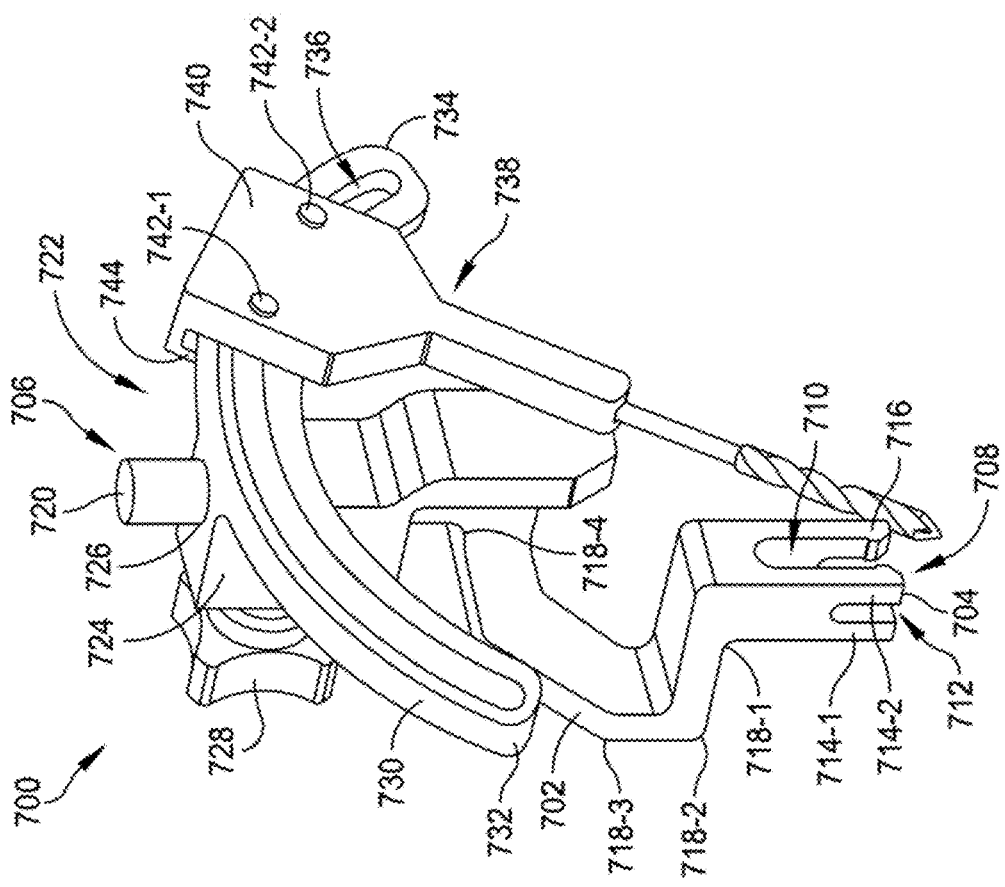
FIG. 11 is an isometric view of another example of a tool guide that may be coupled to a jig in accordance with some embodiments.

FIG. 11 illustrates another example of a guidance tool in accordance with some embodiments. Guidance tool 700 includes a base frame 702 and a tool holder subassembly 722. Base frame 702 is similar in structure to base frames 502, 602 discussed above with respect to FIGS. 9-10. The most significant difference between base frame 702 and base frames 502, 602 is the manner in which frame 702 extends along its length. One of ordinary skill in the art will understand that base frames 502, 602, 702 may have other configurations than those expressly shown in FIGS. 9-11.

Tool holder subassembly 722 includes a base 724 defining a pair of holes that are in communication with one another and disposed at angle with respect to one another. Hole 726 is sized and configured to receive the stem 720 of base frame 702 via a slip fit such that base frame 702 may be rotated about stem 720. The other hole is sized and configured to receive a locking device 728. In some embodiments, locking device 728 includes a knob disposed at an end of a threaded shaft (not shown). Locking device 728 may be rotated relative to base 724 such that the leading end of the threaded shaft engages the stem 720 to fix the location of the tool holder subassembly 722 relative to base frame 702.

Base 724 includes an arcuate track 730 that extends from a first end 732 to a second end 734. In some embodiments, track 730 defines a recessed area or channel 736 that extends about track 730 in an arc. Channel 736 is sized and configured to receive one or more pins, bearings, or other projections extending from tool guide 738 to facilitate the controlled movement of the tool guide 738 and a tool supported by the tool guide 738. For example, in some embodiments, tool guide 738 may include a body 740 including one or more projections 742-1, 742-2 (collectively, "projections 742") (e.g., pins, bearings) that are received within channel 736 while an engagement flange 744 is positioned at least partially around an upper edge of track 730.

The configuration of guidance tool 700 illustrated in FIG. 11 advantageously enables the pivot point of the tool to be located at skin level or below (e.g., subcutaneously). A person of ordinary skill in the art will understand that the location of the pivot point may be adjusted by adjusting the radius of track 730 and/or the height of the track 730.

Figure 12:
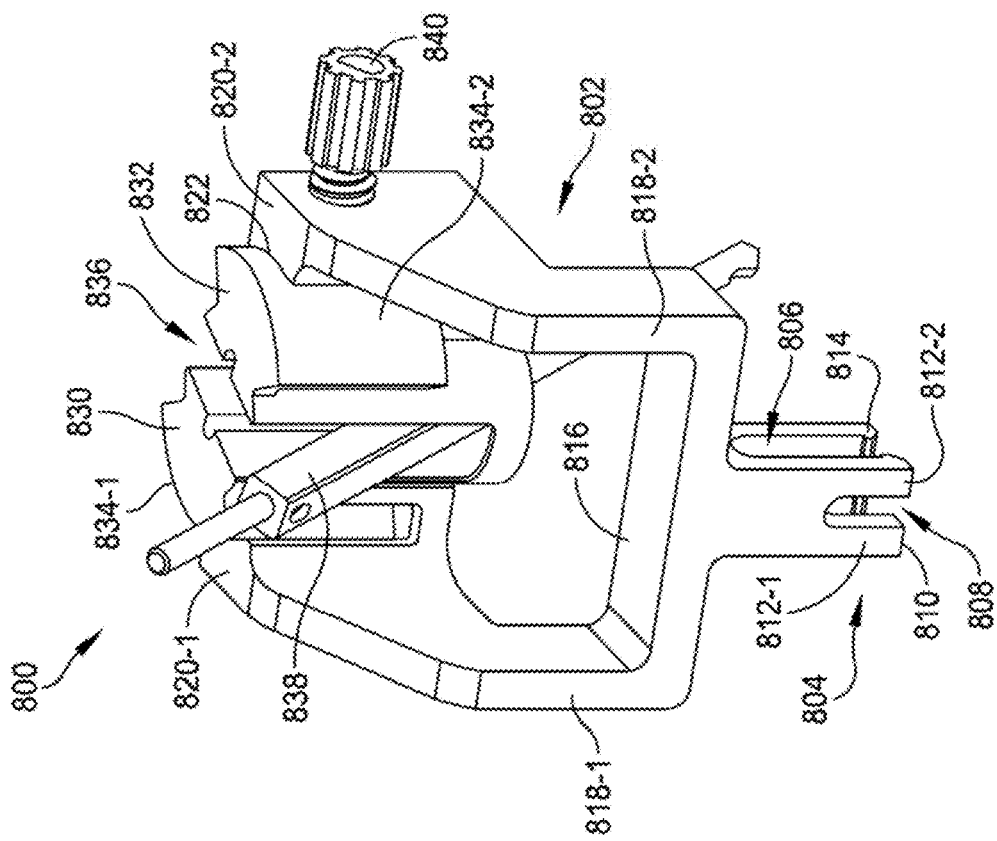
FIG. 12 is an isometric view of another example of a tool guide that may be coupled to a jig in accordance with some embodiments.

FIG. 12 illustrates another example of a guidance tool in accordance with some embodiments. Guidance tool 800 includes a base frame 802 that rotatably supports a tool holder subassembly 830.

Base frame 802 includes a coupling section 804 that includes first and second recesses 806, 808 inwardly extending from an end 810 of base frame 802. Recesses 806, 808 are oriented orthogonally with respect to one another thereby providing arm pairs 812-1, 812-2, (collectively, "arms 812"). Each arm 812 may include a tooth 814 (collectively, "teeth 814") and an end thereof for engaging the unthreaded portions 172 of intermediate section 170 of bolt 106.

As with other coupling sections, recess 806 may extend from end 810 to a depth that enables both the dowel 104 and at least a portion of bolt 106 to be received within recess 806. Recess 808 also may extend from end 810 to a depth that enables at least a portion of enlarged diameter of intermediate section 170 of bolt 106 to be received within the recess 808 when the dowel 104 and bolt 106 are received within recess 806.

Base frame 802 includes a forked body including a cross bar 816 that is disposed between and supports a pair of upwardly extending uprights 818-1, 818-2 (collectively, "uprights 818"). In addition to extending vertically, uprights 818 also extend horizontally before respectively terminating at ends 820-1, 820-2 (collectively, "ends 820"). In some embodiments, uprights 818 have curved interior surfaces 822 for supporting tool holder subassembly 830 while allowing tool holder subassembly 830 to rotate about its vertical axis.

Tool holder subassembly 830 includes a body 832, which may include a pair of curved outer surfaces 834-1, 834-2 (collectively, "outer surfaces 834"). Outer surfaces 834 may be sized and configured to be complementary to curved interior surfaces 822 of base frame 802. Further, tool holder subassembly 830 and ends 820 may include a curved groove that engage one another to provide for stable rotation while preventing tool holder subassembly 830 from falling out of engagement with ends 820. In some embodiments, body 832 defines a central aperture 836. A portion of central aperture 836 extends through body 832 such that tool holder 838 may be received therethrough. In some embodiments, tool holder 838 is pivotably coupled to body 832. A locking device 840 may be received within a hole defined by at least one of uprights 818 for fixing, at least temporarily, the position of body 832 relative to base frame 802.

Figure 13:
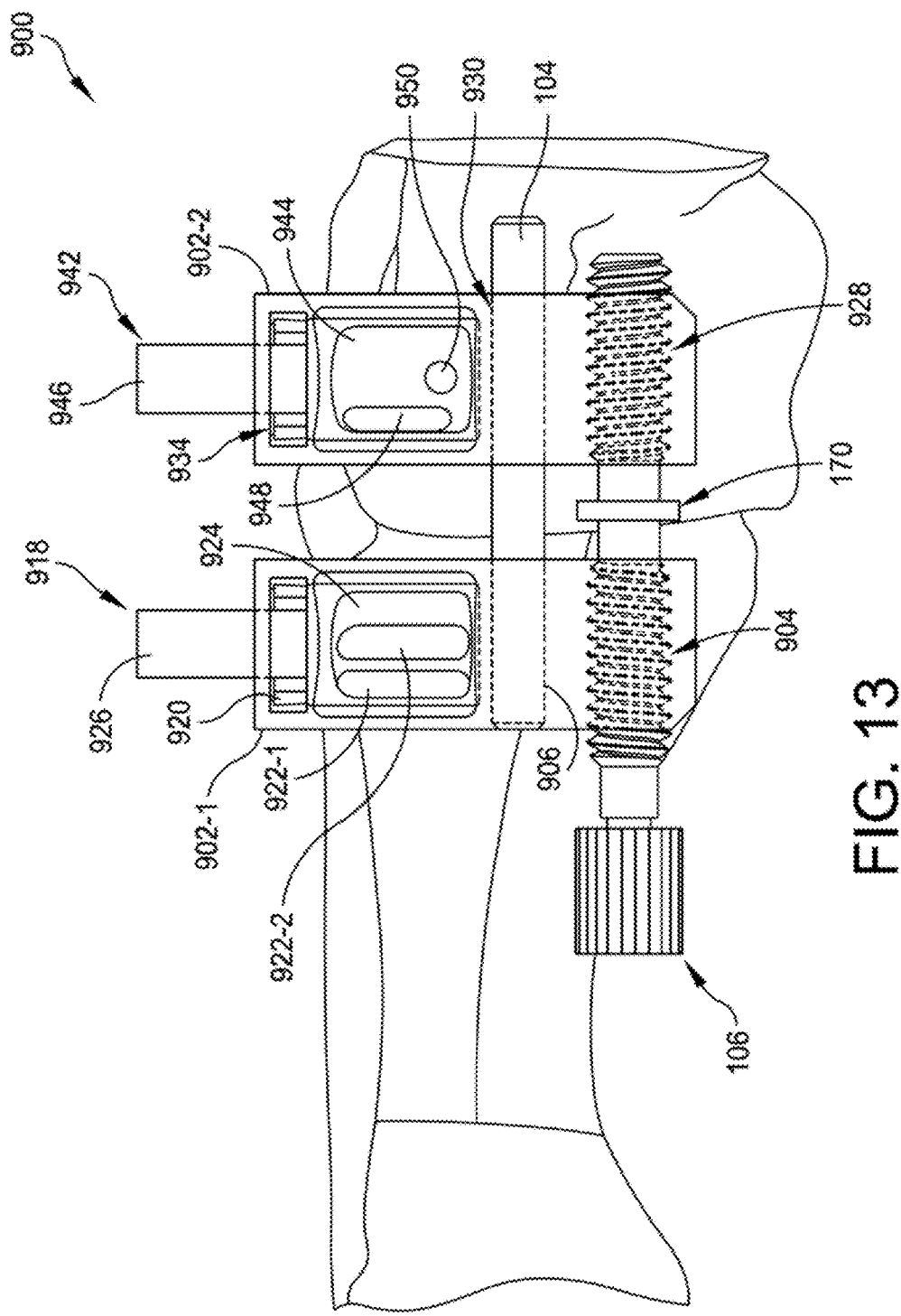
FIG. 13 is a plan view of another example of a compression/distraction jig positioned across a joint in accordance with some embodiments.

FIGS. 13-20 illustrate another example of a system in accordance with some embodiments. Referring first to FIGS. 13 and 13, jig 900 includes a body 902 having a first body component 902-1 and a second body component 902-2. Body component 902-1 defines a first hole 904 and a second hole 906 that extend parallel to each other through body component 902-1. In some embodiments, hole 904 is threaded and hole 906 is unthreaded. Threaded hole 904 may be sized and configured to engage a threaded portion of a bolt, such as bolt 106 describe above. Hole 906 may be sized and configured to receive a dowel, such as dowel 104, in a press-fit, a slip-fit, or other type of engagement.

Figure 14:
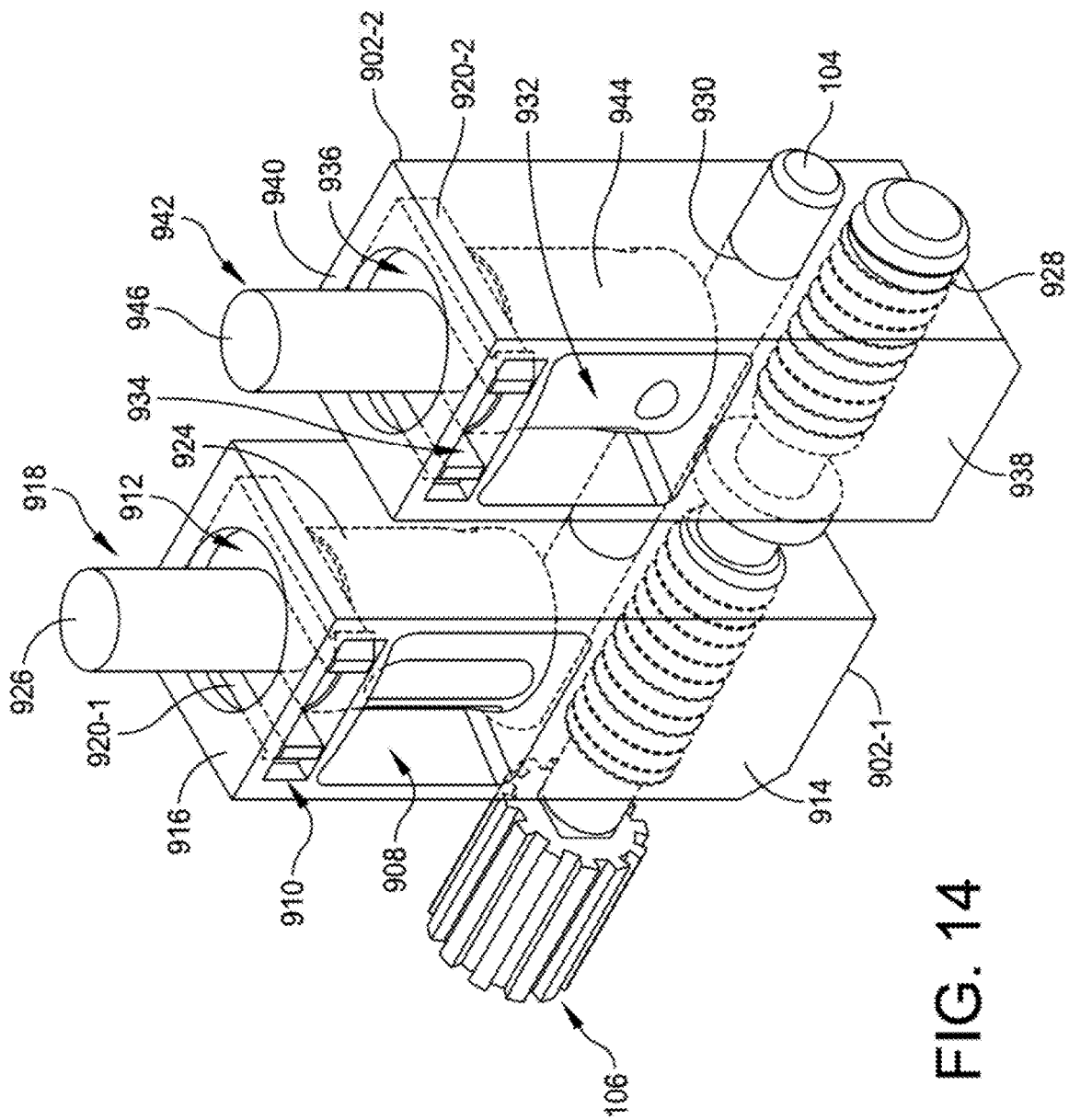
FIG. 14 is an isometric view of the compression/distraction jig illustrated in FIG. 13 in accordance with some embodiments.

Body component 902-1 also defines a first opening or window 908, a second opening or window 910, and a hole 912 that are in communication with one another. Windows 908, 910 extend inwardly from side 914, and hole 912 extends inwardly from side 916 as best seen in FIG. 14. The combination of windows 908, 910, and hole 912 is dimensioned to receive a rotational insert 918, which may be secured within body component 902-1 by a clip 920-1 that is positioned within window 910. In some embodiments, rotational insert 918 defines a pair of parallel slots 922-1, 922-2 (collectively, "slots 922") that extend through the base 924 of rotational insert 918. Slots 922 are sized and configured to receive pins, k-wires, or other fixation elements therethrough. In some embodiments, slots 922 may be angled (such as described above with respect to slots 132). Rotational insert 918 may also include a stem 926 extending from an upper surface of base 924. When positioned within body component 902-1, rotational insert 918 is able to rotate about its central longitudinal axis (e.g., an axis extending through base 924 and stem 926) while clip 920 prevents rotational insert 918 from translating along its longitudinal axis.

Body component 902-2 defines a first hole 928 and a second hole 930 that extend parallel to each other through body component 902-2. In some embodiments, hole 928 is threated and hole 930 is unthreaded. Threaded hole 928 may be sized and configured to engage a threaded portion of a bolt, such as bolt 106 described above. Hole 930 may be sized and configured to receive a dowel, such as dowel 104, in a press-fit, a slip-fit, or other type of engagement.

Body component 902-2 also defines a first opening or window 932, a second opening or window 934, and a hole 936 that are in communication with one another. Windows 932, 934 and hole 936 extend inwardly from side 938 of body component 902-2, and hole 936 extends inwardly from side 940 of body component 902-2 as best seen in FIG. 14. Rotational insert 942 is dimensioned to be received within the combination of windows 932, 934 and hole 936 and secured by a clip 920-2 that may be positioned within window 934. In some embodiments, rotational insert 942 includes a base 944 from which a stem 946 extends. As best seen in FIG. 13, base 944 may define a slot 948 and a hole 950 that both extend through base 944. When positioned within body component 902-2, rotational insert 942 is able to rotate about its central longitudinal axis (e.g., an axis extending through base 944 and stem 946) while clip 920-2 prevents rotational insert 942 from translating along its longitudinal axis.

Jig 900 may be assembled by inserting a dowel, such as dowel 104, into holes 906 and 930 and bolt 106 into holes 904 and 928. In some embodiments, the head of bolt 906 is removable such that the head 162 may be removed in order to insert threaded section 168-2 into hole 904 after which the head 162 may then be reattached to bolt 106. As described above, threaded sections 168 of bolt 106 may be oppositely threaded. For example, in some embodiments, threaded section 168-1 is left-handed threaded, and threaded section 168-2 is right-handed threaded. In some embodiments, threaded section 168-1 is right-handed threaded, and threated section 168-2 is left-handed threaded. Thus, rotating the bolt 106 in one direction may cause the body portions 902-1, 902-2 to move towards each other (e.g., compression) and rotating the bolt 106 in an opposite direction may cause the body portions to move away from each other (e.g., distraction). Dowel 104 prevents the body portions 902-1, 902-2 from rotating relative to one another.

Figure 15:
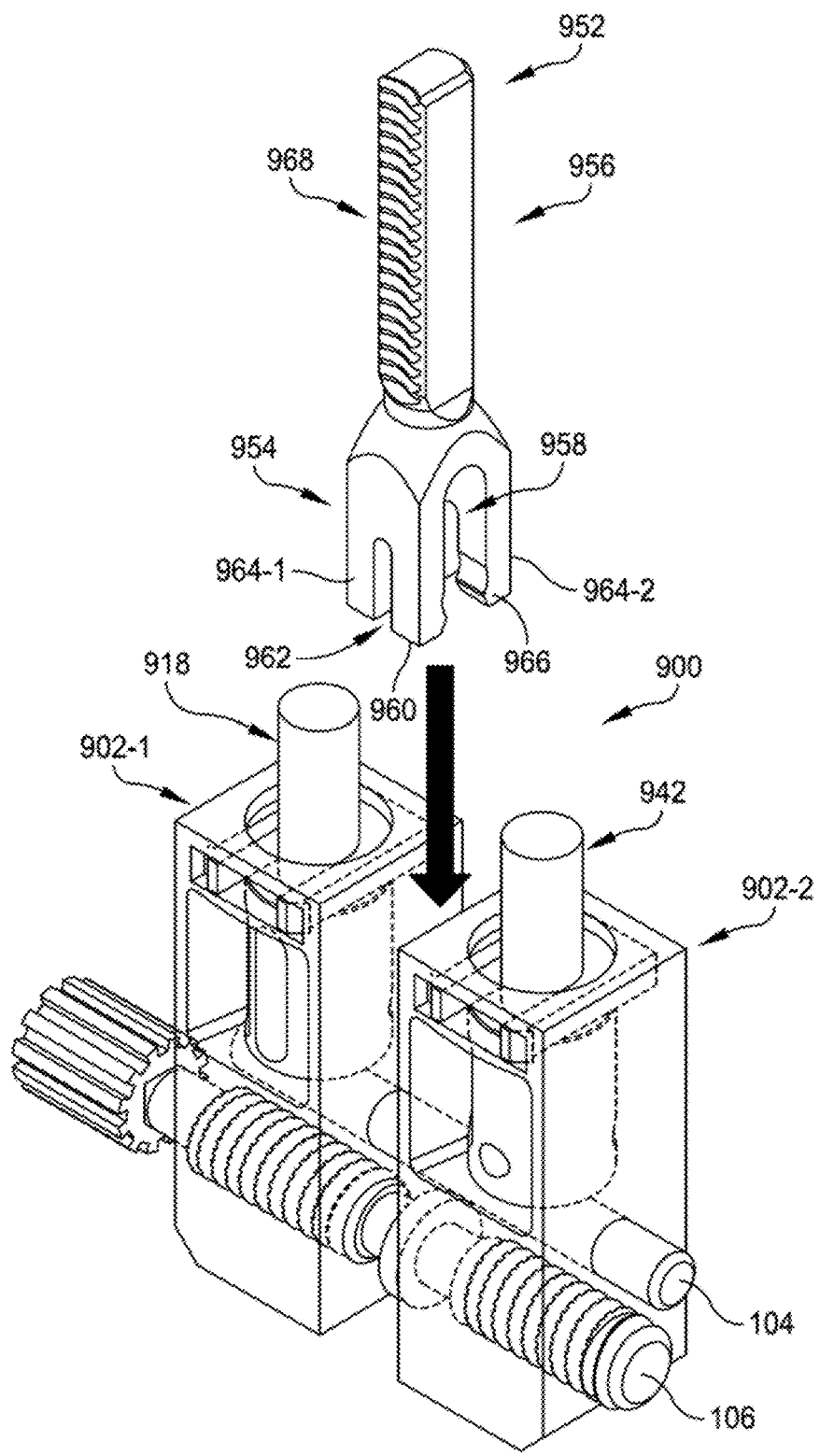
FIGS. 15 and 16 are isometric views of an adjustment base being coupled to the jig illustrated in FIG. 13 in accordance with some embodiments.
Figure 16:
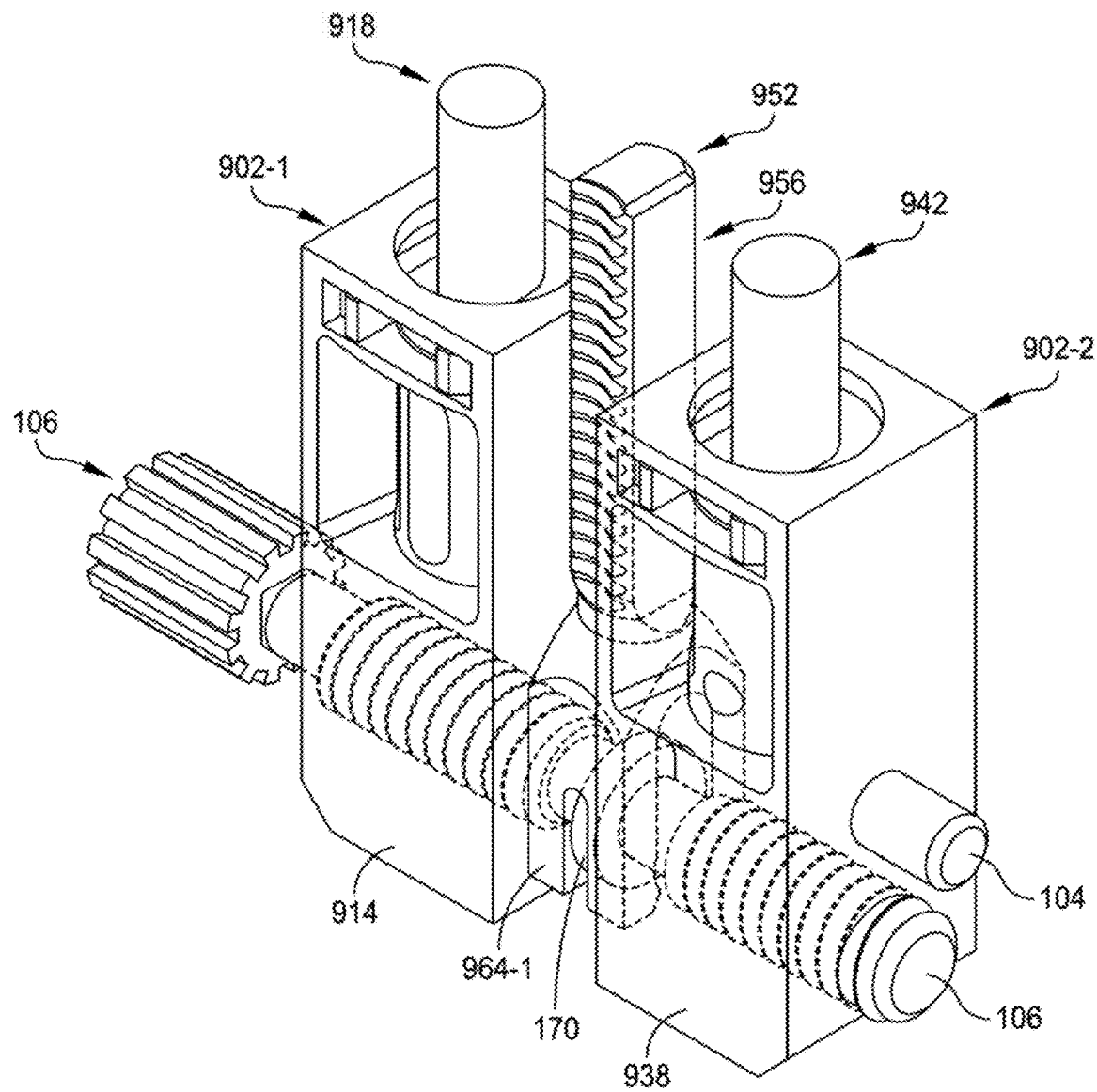

Turning now to FIGS. 15-16, an adjustment base 952 may be coupled to jig 900. Adjustment base 952 includes a coupling portion 954 and an adjustment portion 956 extending from coupling portion 954. Coupling portion 954 defines a recess 958 that inwardly extends from end 960. In some embodiments, recess 958 has a depth that enables both dowel 104 and at least a portion of bolt 106 to be received within recess 958 when dowel 104 is received within holes 906, 930 and bolt 106 is received within holes 904, 928. Coupling section 954 defines a second recess 962 extending inwardly from end 960 with an orientation that is orthogonal to the orientation of recess 958 to form pairs of arms 964-1, 964-2 (collectively, "arms 964"). Recess 962 has a depth that is sufficient to provide clearance for receiving the enlarged diameter of intermediate section 170 of bolt 106 when dowel 104 and bolt 106 are received within recess 958 as shown in FIG. 16. As best seen in FIG. 15, the end of each arm 964 may include a tooth 966 (collectively, "teeth 966") extending inwardly into recess 958. Teeth 966 are sized and configured to engage the unthreaded portions 172 of intermediate section 170 of bolt 106.

Adjustment portion 956 extends perpendicularly from coupling end 954 with respect to the direction at which recesses 958, 962 extend through coupling end 954. In some embodiments, adjustment portion 956 has a rectangular shape with threads or teeth 968 being formed along one side for reasons described below.

Coupling adjustment base 952 to jig 900 include positioning adjustment base 952 between the body portions 902-1, 902-2 of jig 900 and sliding coupling portion 954 of adjustment base 952 into engagement with dowel 104 and bolt 106 as shown by the arrow in FIG. 15. For example, the coupling end 954 of adjustment base 952 is pressed into engagement with bolt 106 such that the teeth 966 of arms 964 snap over the unthreaded portions 172 of bolt 106 and the enlarged diameter of the intermediate section 170 is received within recess 962 as shown in FIG. 16.

Figure 17:
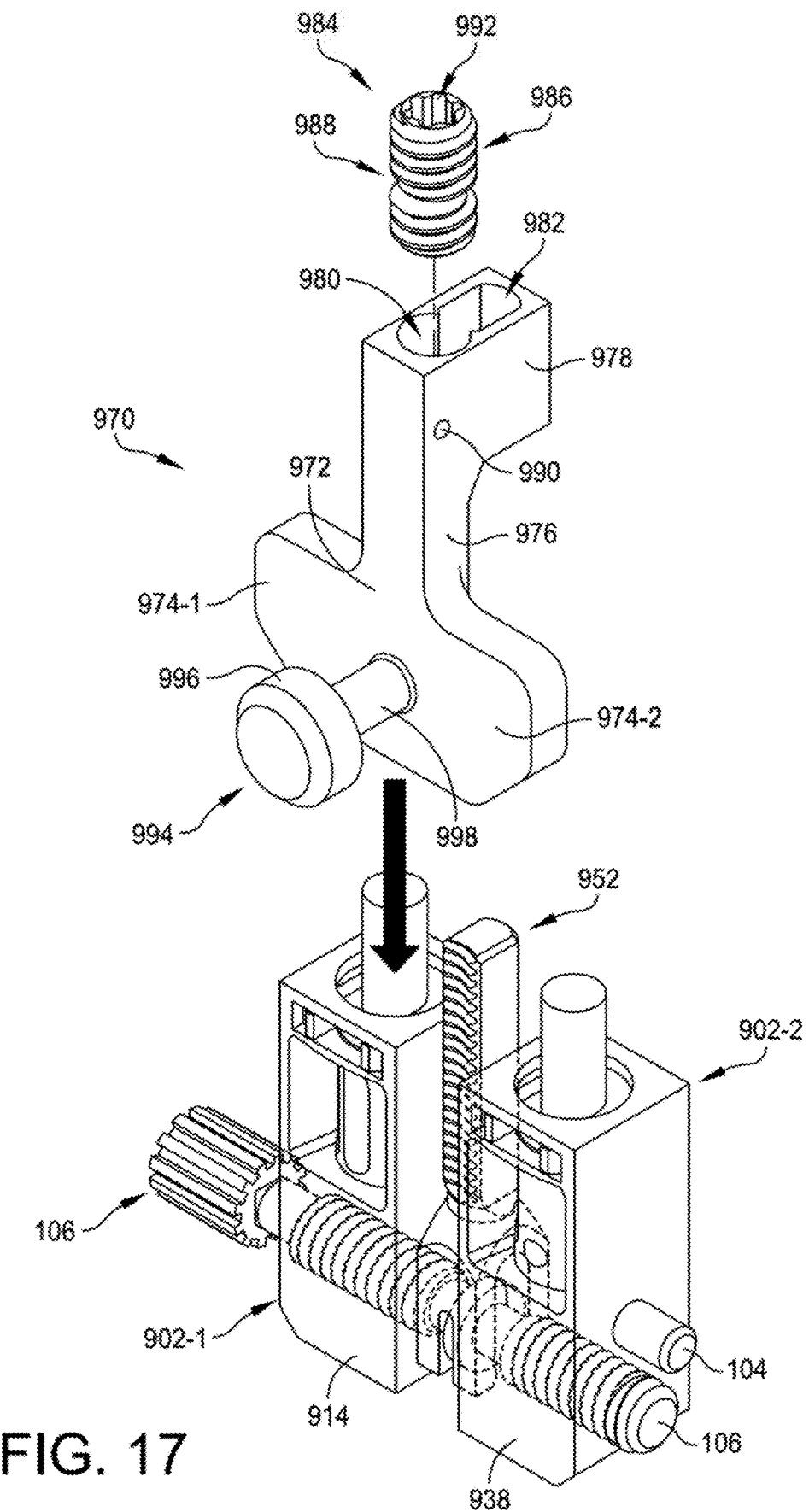
FIGS. 17 and 18 are isometric views of an arm base being coupled to an assemblage illustrated in FIG. 16 of the adjustment base and the jig in accordance with some embodiments.
Figure 18:
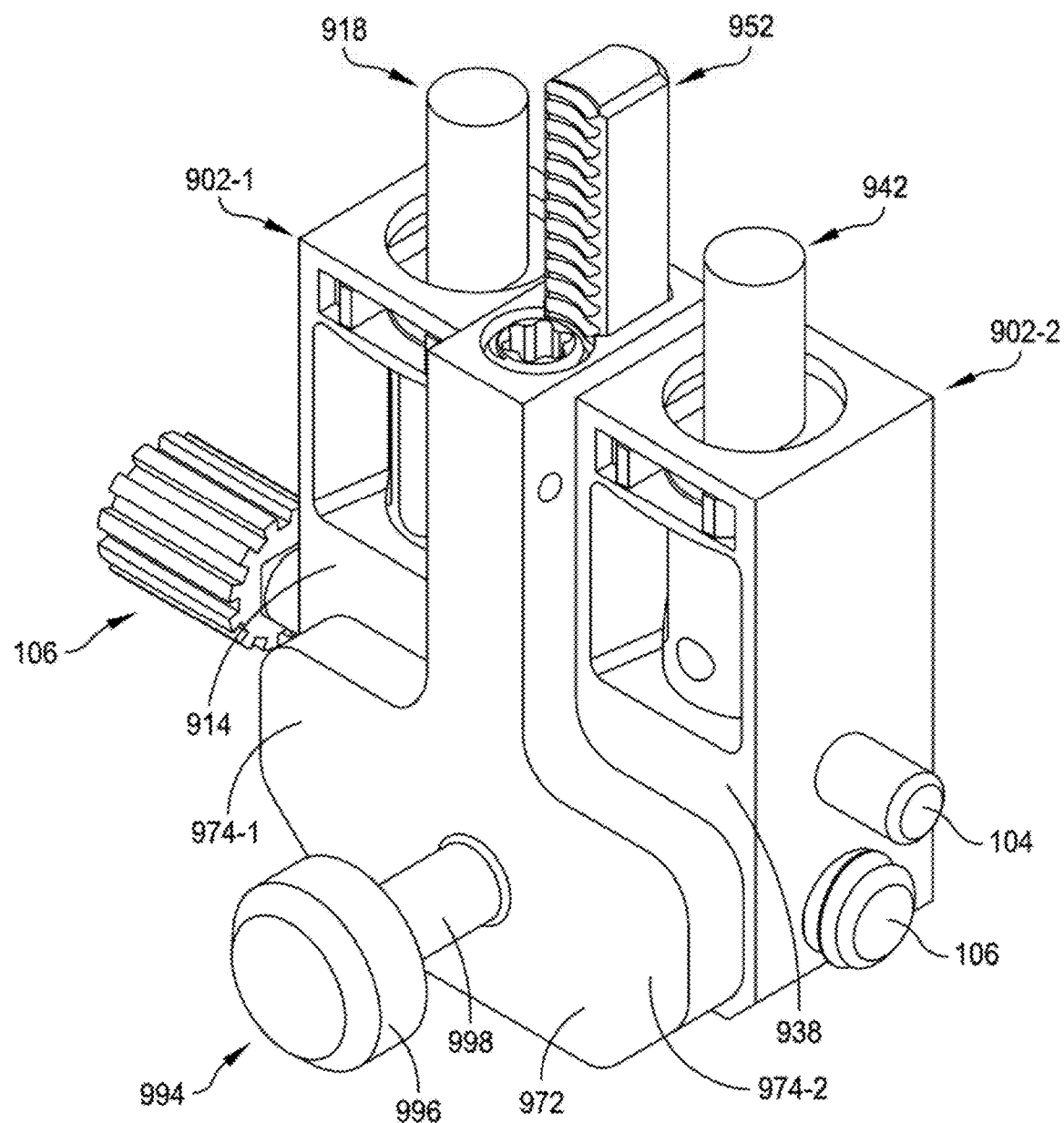

FIG. 17 illustrates one example of an arm base 970 that may be coupled to the adjustment base 952. As shown in FIG. 17, the body 972 may have a pair of wings 974-1, 974-2 (collectively, "wings 974") that extend outwardly from a central stem 976. The upper portion of body 972 may include a coupling block 978 that defines a hole 980 and cavity 982 that overlap one another and extend parallel to the longitudinal axis defined by stem 976. Cavity 982 may be sized and configured to receive adjustment portion 956 slideably therein as best seen in FIG. 18. For example, in embodiments in which adjustment portion 956 has a rectangular cross-sectional geometry, cavity 982 may have a complementary (e.g., rectangular) shape. Hole 980 is sized and configured to receive an adjustment screw 984 therein.

Adjustment screw 984 may include one or more interrupted threads 986 where the interruption 988 is disposed along the length of screw 984 and is sized and configured to receive a portion of a cross pin (not shown) that may be inserted into hole 990 defined by body 972 of arm base 970. The cross pin may confine adjustment screw 984 within hole 980 while also allowing adjustment screw 984 to rotate about a central longitudinal axis of adjustment screw 984. The upper end of adjustment screw 984 may also define an engagement structure 992 for being engaged by a driving tool as will be understood by one of ordinary skill in the art.

In some embodiments, a knob 994 extends from body 972 of arm base 970 between wings 974. Knob 994 may include a first portion 996 having a first diameter and a second portion 998 having a second diameter that is smaller than the first diameter. Knob 994 may be firmly secured to body 972 to provide a fixed pivot point as will be further described herein.

The arm base 970 may be positioned on the adjustment portion 956 of adjustment base 952 by inserting the adjustment portion 956 into cavity 982 as indicated by the arrow in FIG. 17. Adjustment screw 984 may be rotated within hole 980, such as by using a driving tool (e.g., a screwdriver or Allen wrench to list only a few possible examples), which causes the threads 986 of the adjustment screw 984 to engage the threads or teeth 968 of the adjustment portion 956 of the adjustment base 952. Rotation of the adjustment screw 984 in one direction may cause the arm base 970 to translate in a first direction along the adjustment portion 956 of the adjustment base 952, and rotation of the adjustment screw 984 in the opposite direction may cause the arm base 970 to translate in a second direction, which is opposite the first direction, along the adjustment portion 956 of the adjustment base 952. When arm base 970 is coupled to adjustment base 952, as shown in FIG. 18, the coupling block 978 is positioned between body portions 902-1, 902-2 of jig 900 and the wings 974-1, 974-2 are disposed adjacent to sides 914, 938 of body portions 902-1, 902-2.

Figure 19:
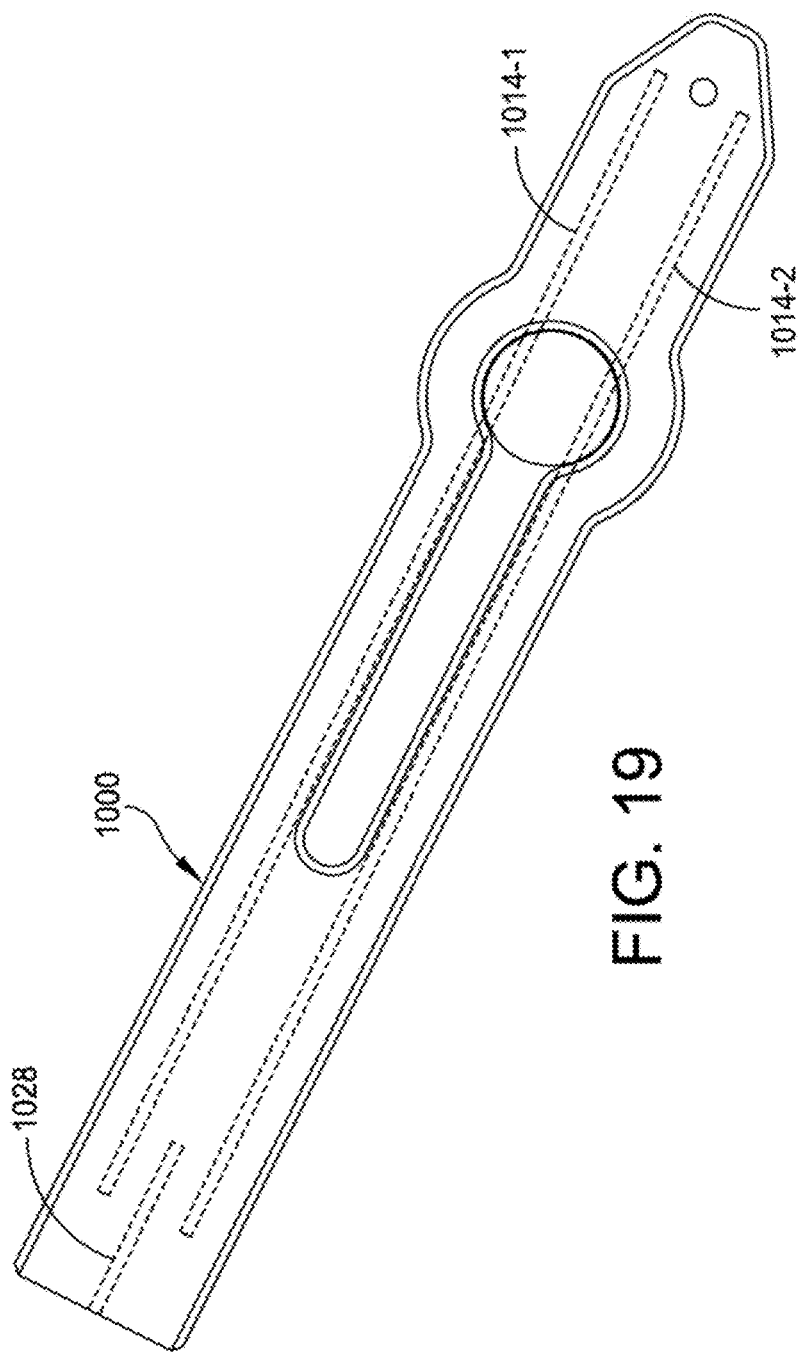
FIG. 19 illustrates a side view of a targeting arm in accordance with some embodiments.
Figure 20:
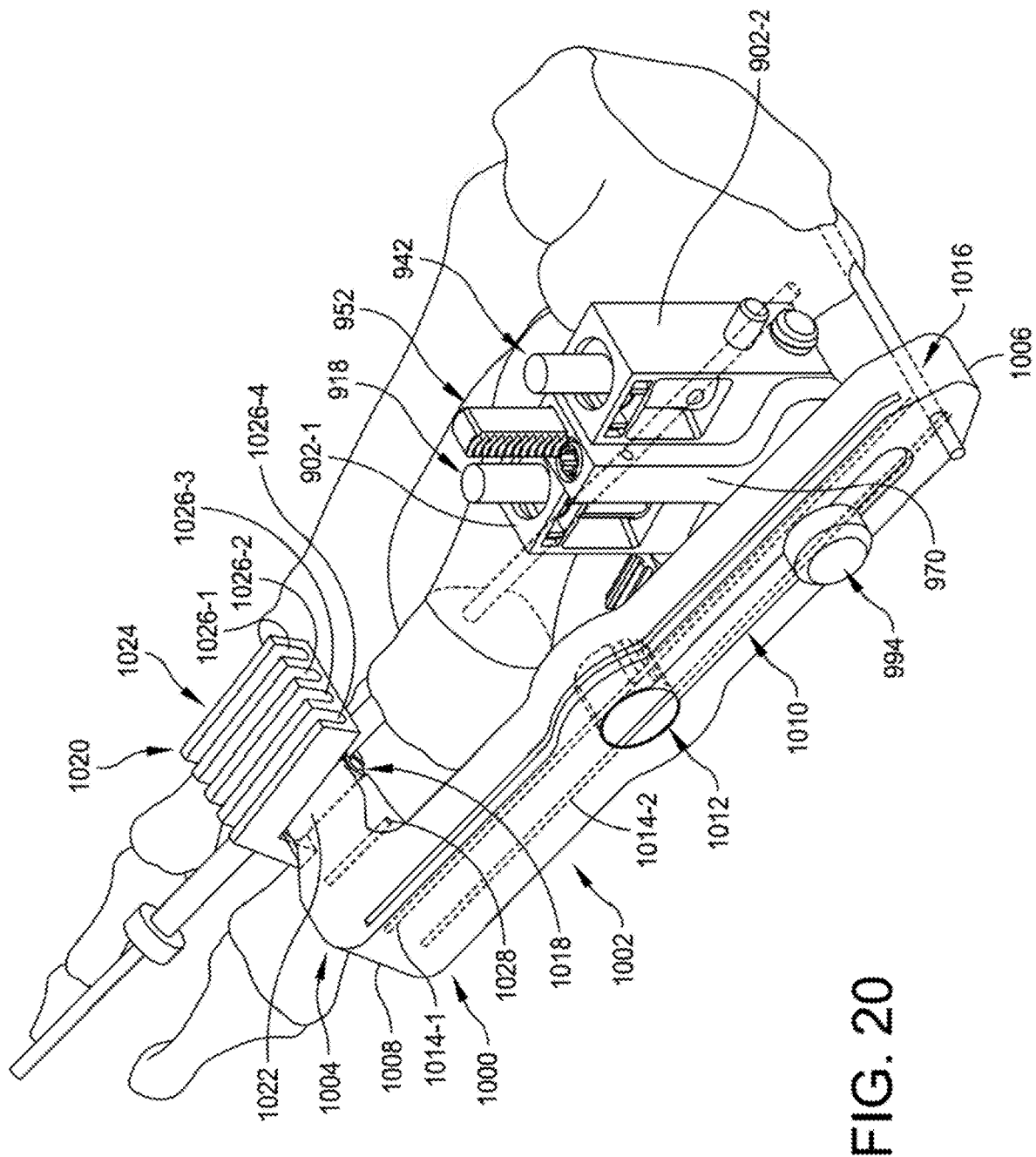
FIG. 20 illustrates the targeting arm illustrated in FIG. 19 coupled to the assemblage illustrated in FIG. 18 in accordance with some embodiments.

FIG. 19 illustrates is a side view of one example of a targeting arm 1000 in accordance with some embodiments, and FIG. 20 illustrates the targeting arm 1000 coupled to jig 900. Targeting arm 1000 includes an arm portion 1002 and a guide portion 1004. Arm portion 1002 extends from a first end 1006 to a second end 1008 and defines a slot 1010 along its length. Slot 1010 includes an enlarged opening 1012 at one end. Enlarged opening 1012 is dimensioned to receive the knob 994 of arm base 970 therein, and arm 1000 has a width is less than a width of the second portion 998 of knob 994 such that arm 1000 may be positioned between body 972 of arm base 970 and the first portion 996 of knob 994 as shown in FIG. 19. Slot 1010 has a width that is greater than a diameter of the second portion 998 of knob 994 such that targeting arm 1000 may be slid along knob 994.

In some embodiments, arm portion 1002 is formed from a radiolucent material and includes or supports one or more radiopaque members 1014-1, 1014-2 (collectively, "radiopaque members 1014"). Radiopaque members 1014 extend along the length of arm portion 1002 and are oriented parallel to one another and to the length of slot 1010. A hole 1016 is defined adjacent to end 1006 and is sized and configured to receive a pin or k-wire therein as shown in FIG. 20. Fewer or additional radiopaque members may be provided and/or supported by targeting arm 1000. For example, in some embodiments another radiopaque member 1028 is provided between targeting guide 1020 and arm portion 1002. As best seen in FIG. 19, radiopaque member 1028 and is positioned such that it will be disposed equidistantly between radiopaque members 1014 to provide a surgeon with a visual indicator to confirm that the x-ray machine is aligned with the plane of the device, which helps to avoid parallax errors as will be understood by one of ordinary skill in the art.

Guide portion 1004 of targeting arm 1000 extends at an angle away from arm portion 1002. In some embodiments, guide portion 1004 is oriented perpendicular to arm portion 1002 as shown in FIG. 20. One or more holes 1018 are defined by guide portion 1004. The one or more holes 1018 may be sized and configured to support a targeting guide 1020. For example, the targeting guide may include one or more bushings (or protrusions) 1022 that may be received within the one or more holes 1018 of targeting guide 1020. Targeting guide may also include an overhang portion 1024 that defines one or more slots 1026-1, 1026-2, 1026-3, 1026-4 (collectively, "slots 1026"). The position of the one or more slots 1026 corresponds to the location of the one or more holes 1018 to provide a visual indication of the trajectory of a pin that can be inserted into the one or more holes 1018. More particularly, the slots 1026 are sized and configured to receive a radiopaque element (e.g., a pin, k-wire, or other elongate, radiopaque element) that may be laid across the skin above a bone (e.g., a metatarsal) such that dorsal-plantar x-ray would show the trajectory of a fixation element (e.g., a pin, k-wire, wire, screw, or other suitable fixation element) that is to be inserted into bone. This visualization may inform the decision of the surgeon as to which targeting hole (e.g., one of holes 1018) to use.

In use, the jig 900 is placed along a joint, such as the TMT1 joint. In some embodiments, jig 900 is placed using placement guide 300 as described above. Once positioned, body portion 902-1 of jig 900 may be coupled to a first bone, such as the first metatarsal, by inserting one more fixation elements (e.g., a pin or k-wire) through the one or more slots 922 of rotational insert 918. Body portion 902-2 of jig 900 may be coupled to a second bone, such as a cuneiform, by inserting one or more fixation elements (e.g., a pin or k-wire) through the slot 948 and hole 950 of rotational insert 942. The joint may be compressed or distracted by rotating the bolt 106 as described above.

When the desired amount of compression or distraction of the joint has been achieved, the adjustment base 952 is coupled to the jig 900. As described above, coupling the adjustment base 952 to the jig may include positioning adjustment base 952 between the body portions 902-1, 902-2 of jig 900 and sliding coupling portion 954 of adjustment base 952 into engagement with dowel 104 and bolt 106 as shown by the arrow in FIG. 15. For example, the coupling end 954 of adjustment base 952 is pressed into engagement with bolt 106 such that the teeth 966 of arms 964 snap over the unthreaded portions 172 of bolt 106 and the enlarged diameter of the intermediate section 170 is received within recess 962 as shown in FIG. 16.

Arm base 970 may then be coupled to adjustment base 952. In some embodiments, arm base 970 may be provided to a surgeon already coupled to adjustment base 952. As described above, coupling arm base 970 may include inserting the adjustment portion 956 of adjustment base 952 into cavity 982 of arm base 970 as indicated by the arrow in FIG. 17, which brings adjustment screw 984 into engagement with threads 968 of adjustment portion 956. Adjustment screw 984 may then be rotated to position arm base 970 along the adjustment portion 956 of the adjustment base 952.

Targeting arm 1000 may be coupled to arm base 970 by sliding enlarged opening 1012 of slot 1010 over knob 994 of arm base 970. Targeting arm 1000 may then be slid along knob 994 and/or rotated about knob 994. The position of targeting arm 1000 may be checked using fluoroscopy (e.g., medial-lateral and dorsal-plantar) as described. When the targeting arm 1000 is located in the desired position, a pin may be inserted through hole 1016 and into a bone (e.g., the cuneiform) as shown in FIG. 20. A pin may then be inserted through one of the one or more holes 1018 to fuse the joint. One of ordinary skill in the art would understand that the joint may be debrided using one or more of the tool guides 400, 500, 600, 700, which may be coupled to jig 900. Further, jig 900 may be used to adjust the compression/distraction of the bones of the joint and/or the alignment of the bones while being coupled to the bones as described above with respect to the other jigs 100, 200.

Figure 21:
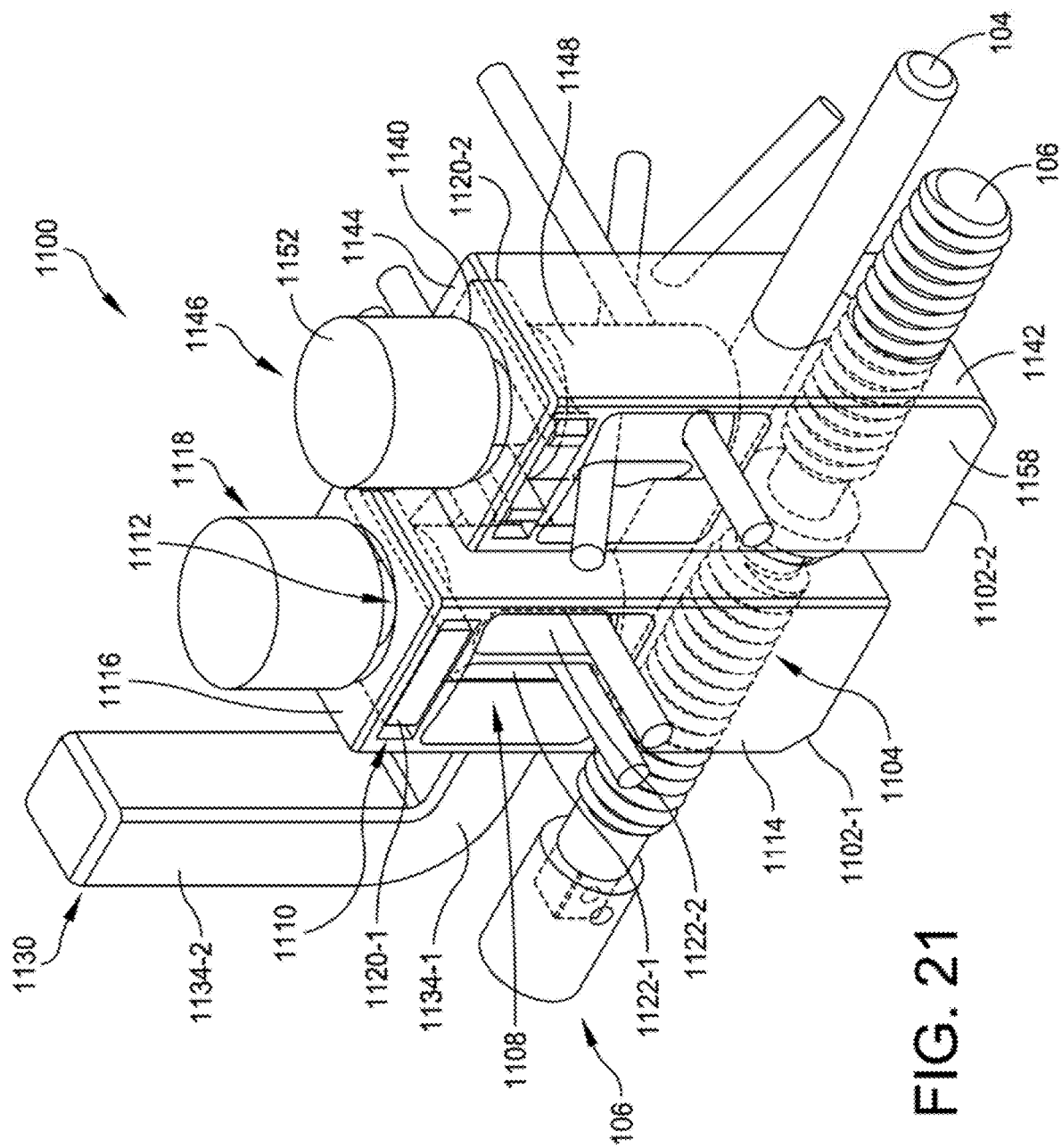
FIG. 21 is an isometric view of another example of a jig in accordance with some embodiments.
Figure 24:
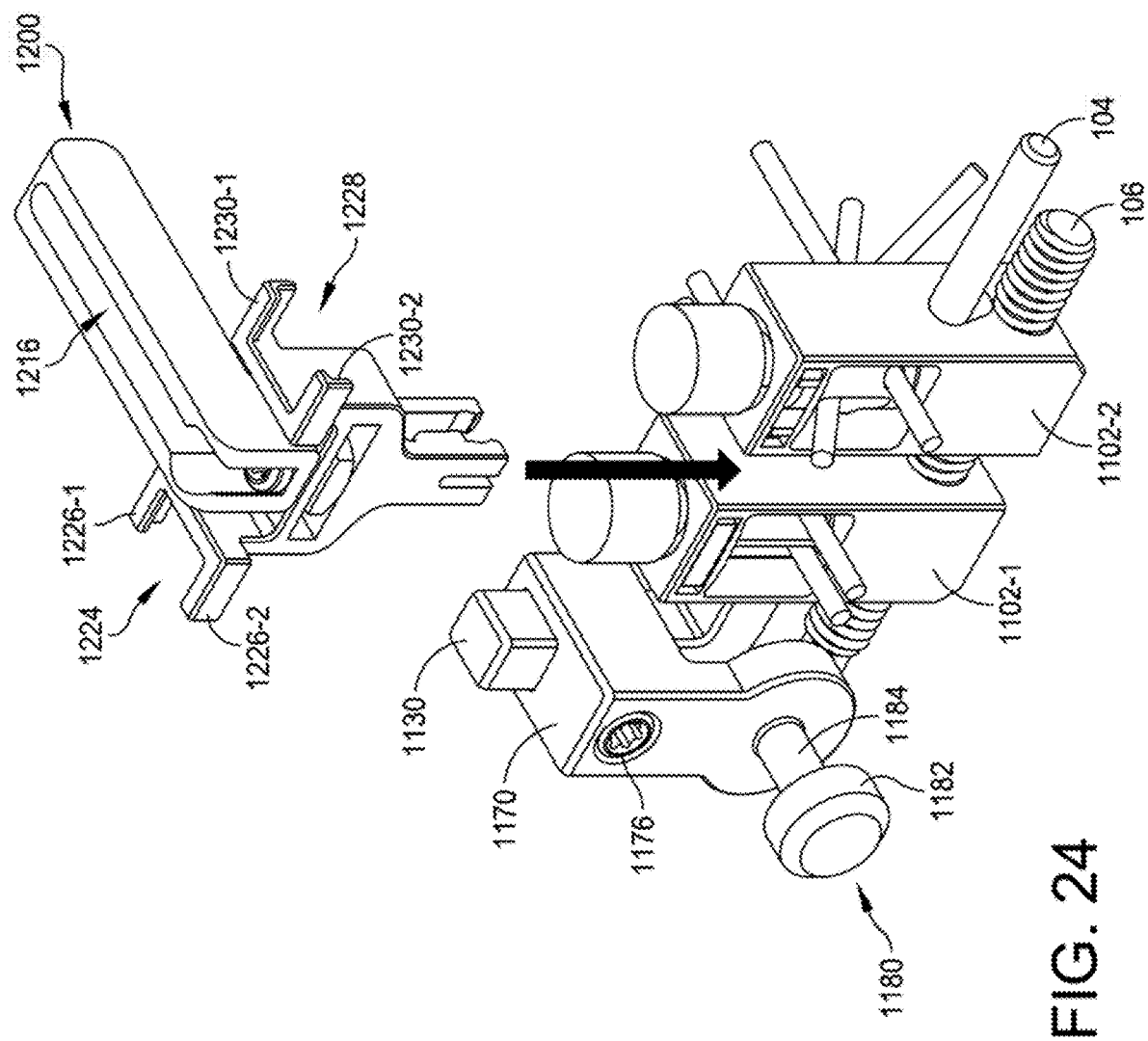
FIG. 24 illustrates one example of the placement device illustrated in FIG. 23 being coupled to the jig illustrated in FIG. 21, which is coupled to the coupling component illustrated in FIG. 22, in accordance with some embodiments.

FIG. 21 illustrates another example of a jig in accordance with some embodiments. Jig 1100 includes a body 1102 having a first body component 1002-1 and a second body component 1102-2. Body component 1102-1 defines a first hole 1104 and a second hole 1106 that extend parallel to each other through body 1102, as best seen in FIGS. 21 and 24. In some embodiments, hole 1104 is threaded and hole 1106 is unthreaded. When threaded, hole 1104 may be sized and configured to engage a threaded portion of a bolt 106 described above. For example, the bolt 106 may include a head 162 that is coupled the rest of the bolt 106 once the bolt 106 is coupled to the first and/or second body components 1102-1, 1102-2. Hole 1106 may be sized and configured to receive a dowel, such as dowel 104, in a press-fit, slip-fit, or other type of engagement.

Body component 1102-1 may also define a first opening or window 1108, a second window or opening 1110, and a hole 1112 that are in communication or otherwise are connected to one another. Openings 1108, 1110 extend inwardly from side 1114, and hole 1112 extends inwardly from side 1116. In some embodiments, openings 1108, 1110 extend through body component 1102. The combination of windows 1108, 1110 and hole 1112 is dimensioned to receive a rotational insert 1118, which may be secured within body component 1102-1 by a clip 1120-1 positioned within window 1110 as shown in FIG. 21. In some embodiments, rotational insert 1118 defines a pair of parallel slots 1122-1, 1122-2 (collectively, "slots 1122") that extend through the base 1124 of rotational insert 1118. In some embodiments, slots 1122 are angled like slots 132 described above.

Rotational insert 1118 may include a stem 1126 and an enlarged head 1128 to provide an area for a surgeon or other user to manipulate. When positioned within body component 1102-1, rotational insert 1118 is able to rotate about its central longitudinal axis (e.g., an axis extending through base 1124, stem 1126, and head 1128). Clip 1120-1 serves to prevent rotational insert 1118 from translating along this longitudinal axis as will be understood by one of ordinary skill in the art.

Figure 25:
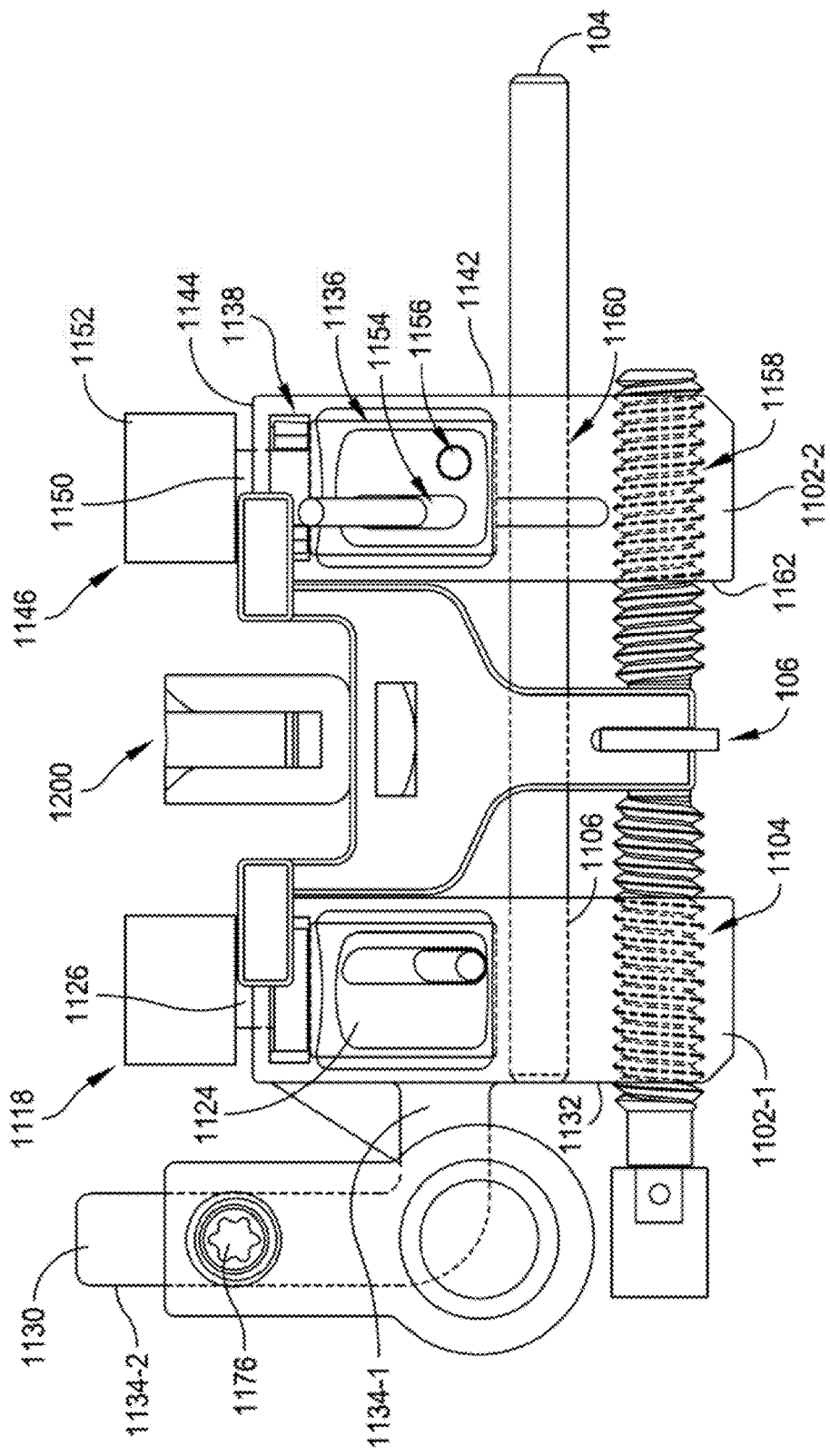
FIG. 25 is a side view of one example of an assembly of a placement device illustrated in FIG. 23, jig illustrated in FIG. 21, and coupling component illustrated in FIG. 22, in accordance with some embodiments.

Body component 1102-1 also may include an arm support 1130 extending from a side 1132. Arm support 1130 may include first and second legs 1134-1, 1134-2 that collectively form arm support 1130. As best seen in FIGS. 24 and 25, arm component 1134-1 extends horizontally from side 1132. Arm component 1134-2 may extend perpendicularly or obliquely from arm component 1134-1 in an upward direction.

Body component 1102-2 may also define a first window or opening 1136, a second window or opening 1138, and a hole 1140 that are in communication or otherwise are connected to one another. More particularly, windows 1136, 1138 extend inwardly from side 1158, and hole extends inwardly from side 1144. Windows 1136, 1138 and hole 1140 are collectively sized and configured to receive another rotational insert 1146. Rotational insert 1146 may include a body 1148, a stem 1150 extending from body 1148, and an enlarged head 1152 extending from stem 1150. In some embodiments, body 1148 of rotational insert 1146 defines at least one slot 1154 and at least one hole 1156 that extend through body 1148 and are both sized and configured to receive a fixation element, such as a k-wire or pin, for securing the second body component 1102-2 to a bone. Rotational insert 1146 may be secured within body component 1102-2 by a clip 1120-2, which may be positioned within window 1138.

Body component 1102-2 may also define a first hole 1158 and a second hole 1160 that extend from one side 1162 of body component 1102-2 to an opposite side 1142 of body component 1102-2. In some embodiments, hole 1158 is threaded such that hole 1158 is configured to engage the threads of bolt 106. Hole 1160 may be sized and configured to receive dowel 104 in a slip-fit, press-fit, or other manner of engagement.

Figure 22:
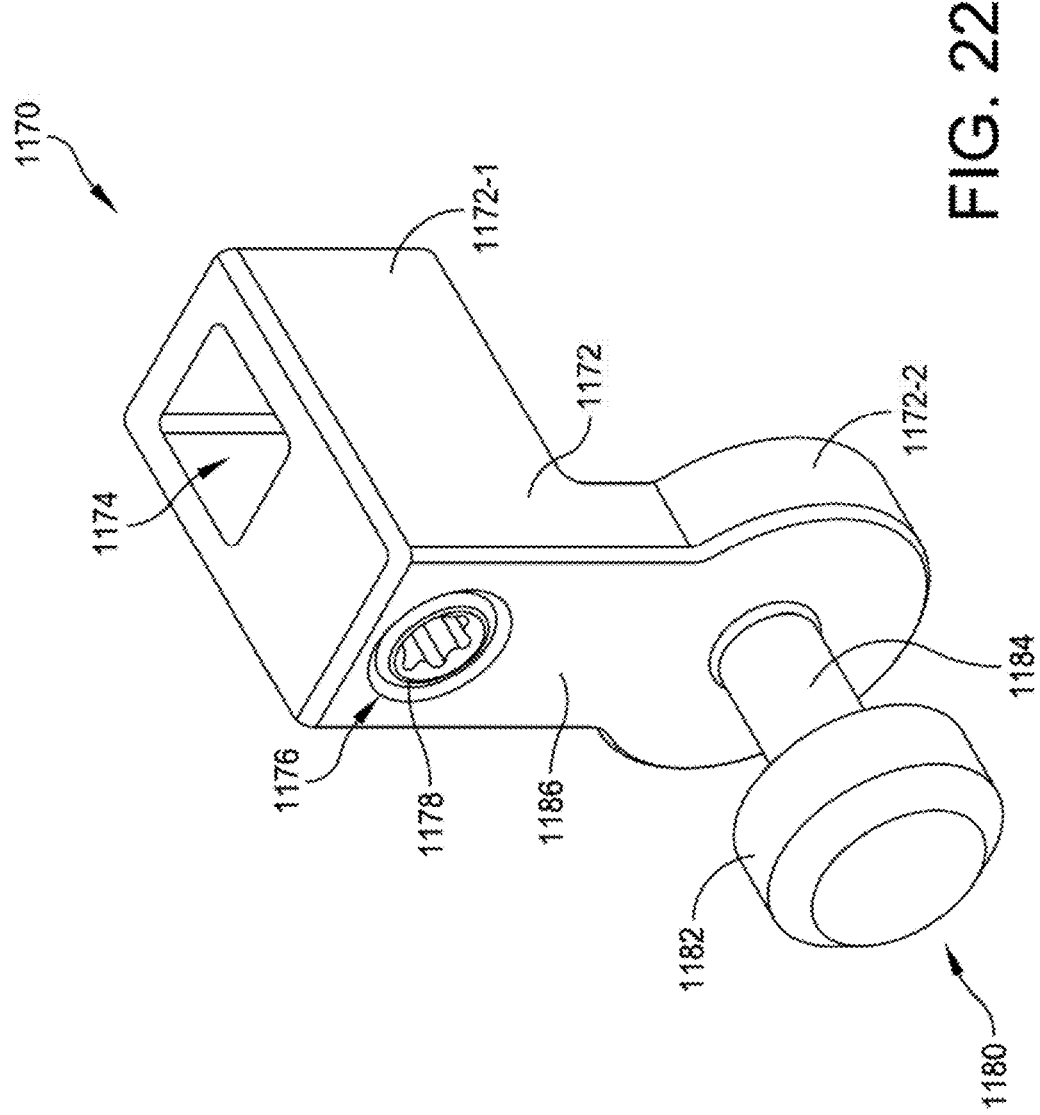
FIG. 22 is an isometric view of one example of a coupling component in accordance with some embodiments.

Turning now to FIG. 22, a coupling component 1170 is shown. Coupling component 1170 may include a body 1172 having a pair of divergent legs 1172-1, 1172-2. Leg 1172-1 defines and opening 1174 that is sized and configured to receive the leg 1134-2 of arm support 1130 therein (see FIG. 24). In some embodiments, opening 1174 has a geometry (e.g., circular, rectangular, etc.) that is complementary to the cross-sectional geometry of leg 1134-2. Coupling component 1170 also defines a hole 1176 that is disposed at an angle (e.g., perpendicular or normal) relative to opening 1174. Hole 1176 communicates with opening 1174 and is sized and configured to receive a set screw 1178 therein for locking the position of coupling component 1170 along arm support 1130. Leg 1162-2 includes a knob 1180 extending outwardly from an outer surface 1186. Knob 1170 may include a first portion 1182 having a first diameter and a second portion 1184 having a second diameter that is smaller than the first diameter. Knob 1180 may be firmly secured to body 1172 to provide a fixed pivot point as will be further described herein.

Figure 23:
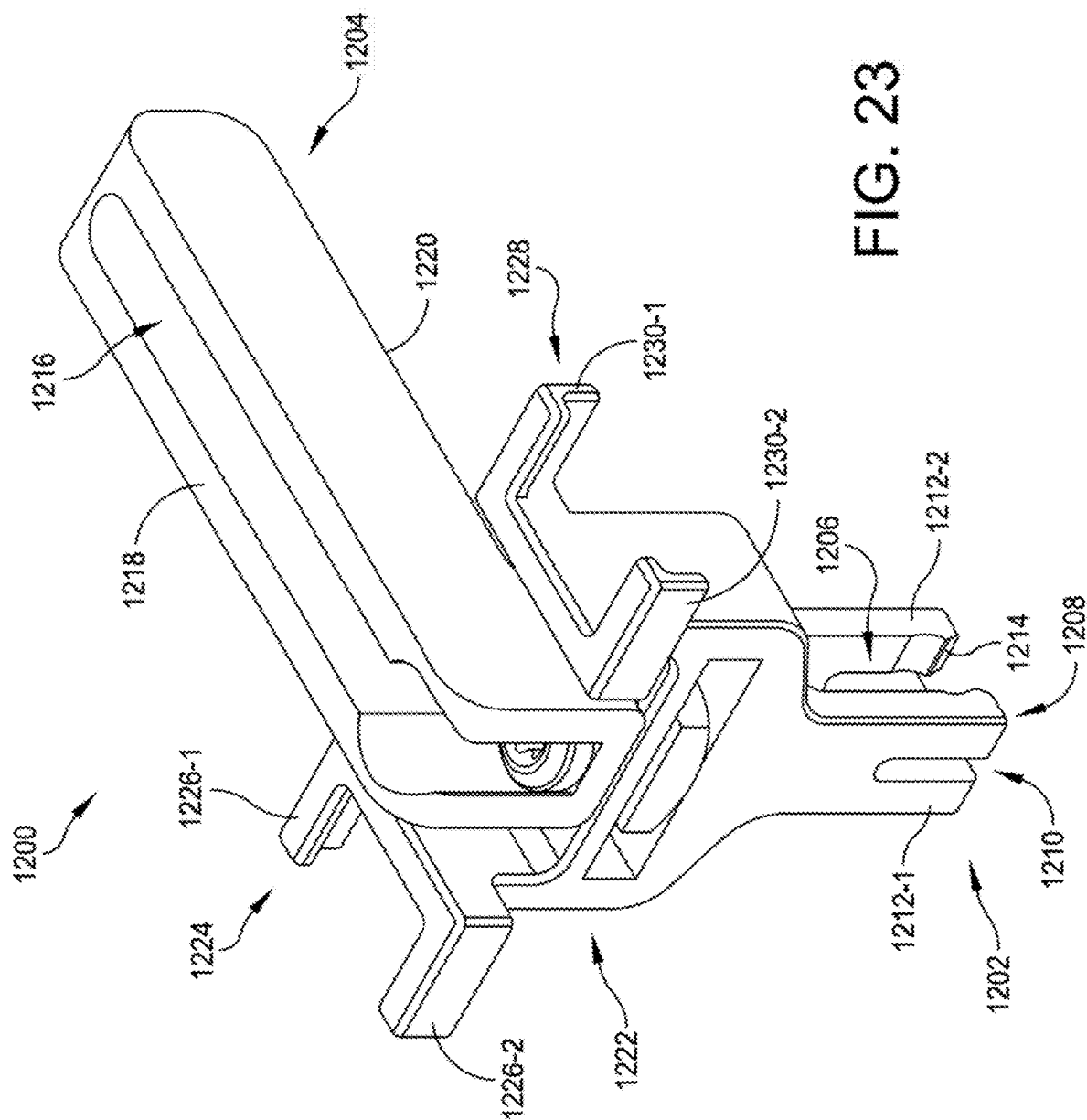
FIG. 23 is an isometric view of another example of a placement device in accordance with some embodiments.

A burr guide 1200, shown in FIG. 23, may be used to provide guiderails for a debridement device. Burr guide 1200 includes a coupling section 1202 and an extension 1204, which may extend from coupling section 1202 at an oblique or right angle. Coupling section 1202 defines a recess 1206 that inwardly extends from end 1208. In some embodiments, the depth of recess 1206 is dimensioned to receive both dowel 104 and bolt 106 when dowel 104 is received within hole 1106 defined by body portion 1102-1 and hole 1160 defined by body portion 1102-2 and when bolt 106 is received within hole 1106 defined by body portion 1102-1 and hole 1158 defined by body portion 1102-2.

Coupling section 1202 also defines a second recess 1210 extending inwardly from end 1208 in a direction that is orthogonal to the direction of recess 1206. Recess 1210 has a depth that provides clearance for receiving the enlarged diameter 170 of intermediate section of bolt 106 when dowel 104 and bolt 106 are received within recess 1206 as described above. In some embodiments, the orthogonal arrangement of recess 1206 and recess 1210 results in coupling section 1202 including arm pairs 1212-1, 1212-2 (collectively, "arms 1212"). The end of each arm 1212 may include a tooth 1214 (collectively, "teeth 1214") extending inwardly into recess 1206. Teeth 1214 are sized and configured to engage the unthreaded portions 172 of intermediate section 170 of bolt 106.

Extension 1204 may extend from coupling section 1202 at an oblique or right angle as noted above. Extension 1204 also may define a slot 1216 extending from an upper surface 1218 to lower surface 1220. Slot 1216 is dimensioned (e.g., has a width) to receive a k-wire, pin, cannula, or debridement tool (e.g., a burr), or other surgical device therethrough. The length of slot 1216 may vary as will be understood by one of ordinary skill in the art.

The interface section 1222 between coupling section 1202 and extension 1204 may include a first locating brace 1224, including arms 1226-1, 1226-2 (collectively, "arms 1226"), and a second locating brace 1228, including arms 1230-1, 1230-2 (collectively, "arms 1230"). Arms 1226 are spaced apart from one another by a distance that is sufficient to receive body component 1102-1 therebetween, as best seen in FIGS. 24 and 25. Similarly, arms 1230 are spaced apart from one another by a distance that is sufficient to receive body component 1102-2 therebetween, as best seen in FIGS. 24 and 25.

The placement device 1200 may be coupled to the jig 1100 by placing coupling section 1202 of guide 1200 into contact and/or engagement with dowel 104 and bolt 106 such that teeth 1214 engage the unthreaded sections 172 of bolt 106 and enlarged diameter 160 is received within slot 1210 as indicated by the arrow in FIG. 24. The resulting construct or assembly (with coupling component 1170 having been coupled to arm support 1130) is shown in FIG. 25.

Figure 5:
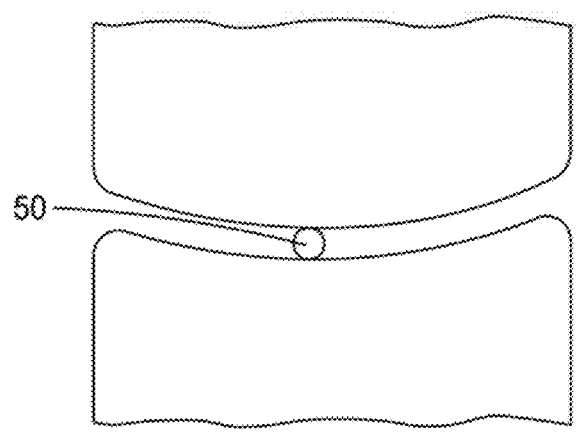
FIGS. 5 and 6 illustrate plan and isometric views of a pin being inserted in a joint in accordance with some embodiments.
Figure 6:
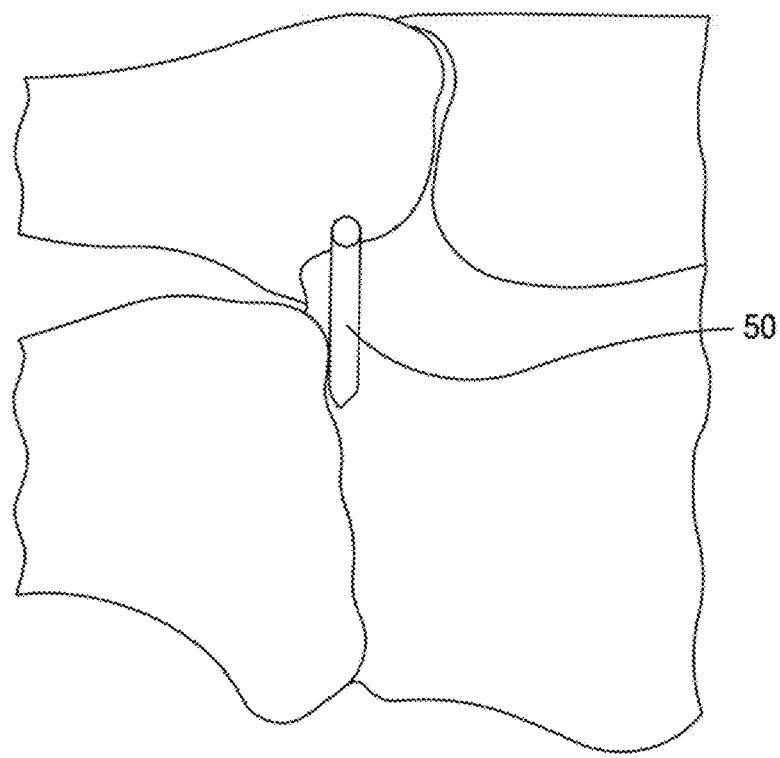

The assemblage of jig 1100, coupling component 1170, and guide 1200 may be placed along a bone (e.g., a first metatarsal) with guidance from a joint-finding k-wire, such as the joint-finding k-wire 50 shown in FIGS. 5 and 6. For example, with joint-finding k-wire 50 positioned in a bone, the construct is located by inserting the free end of the joint-finding k-wire 50 into slot 1216 defined by the handle section 1204 of placement device 1200.

Figure 26:
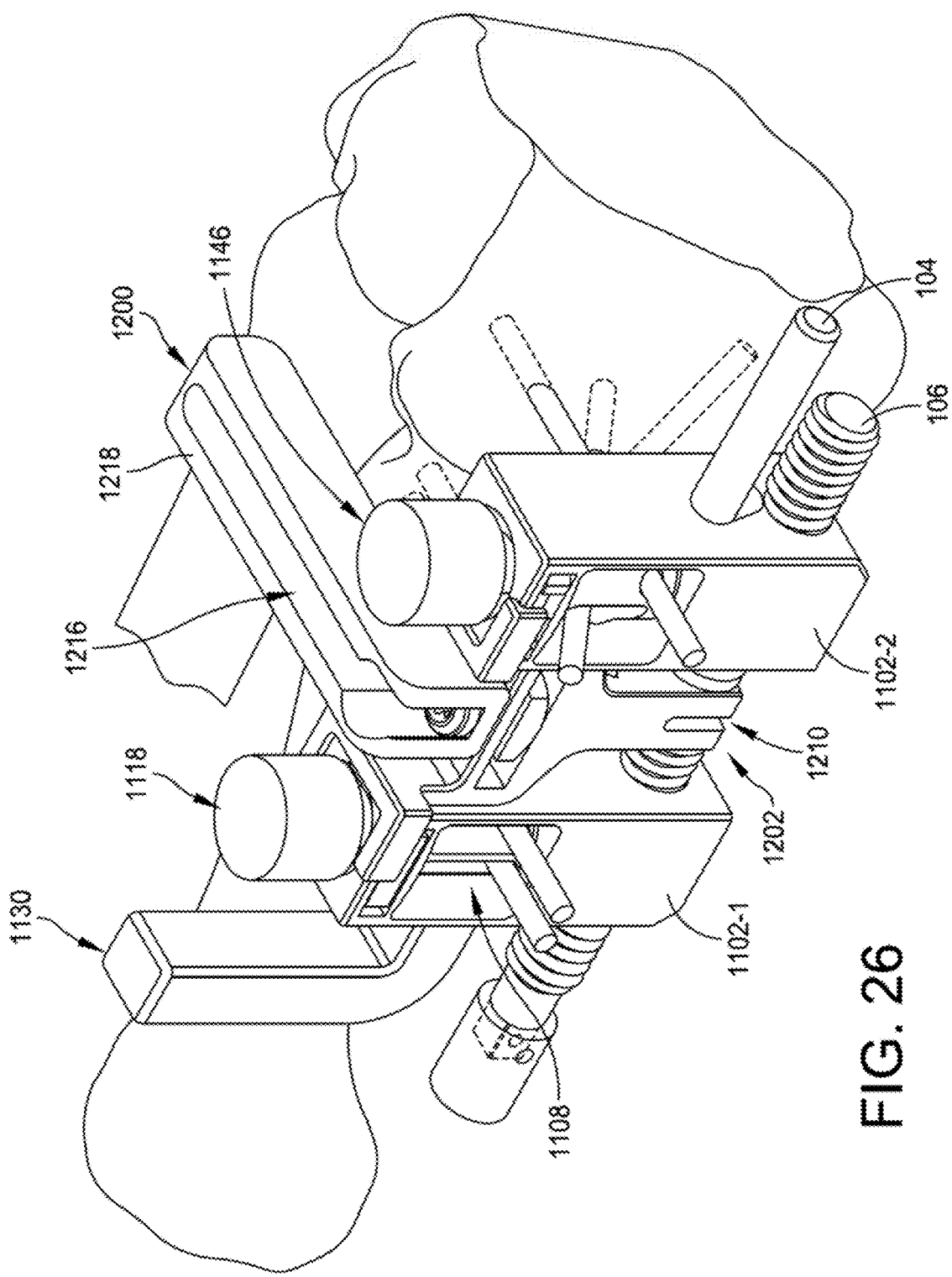
FIG. 26 is an isometric view of the jig illustrated in FIG. 21 and placement device illustrated in FIG. 23 coupled to a bone in accordance with some embodiments.
Figure 27:
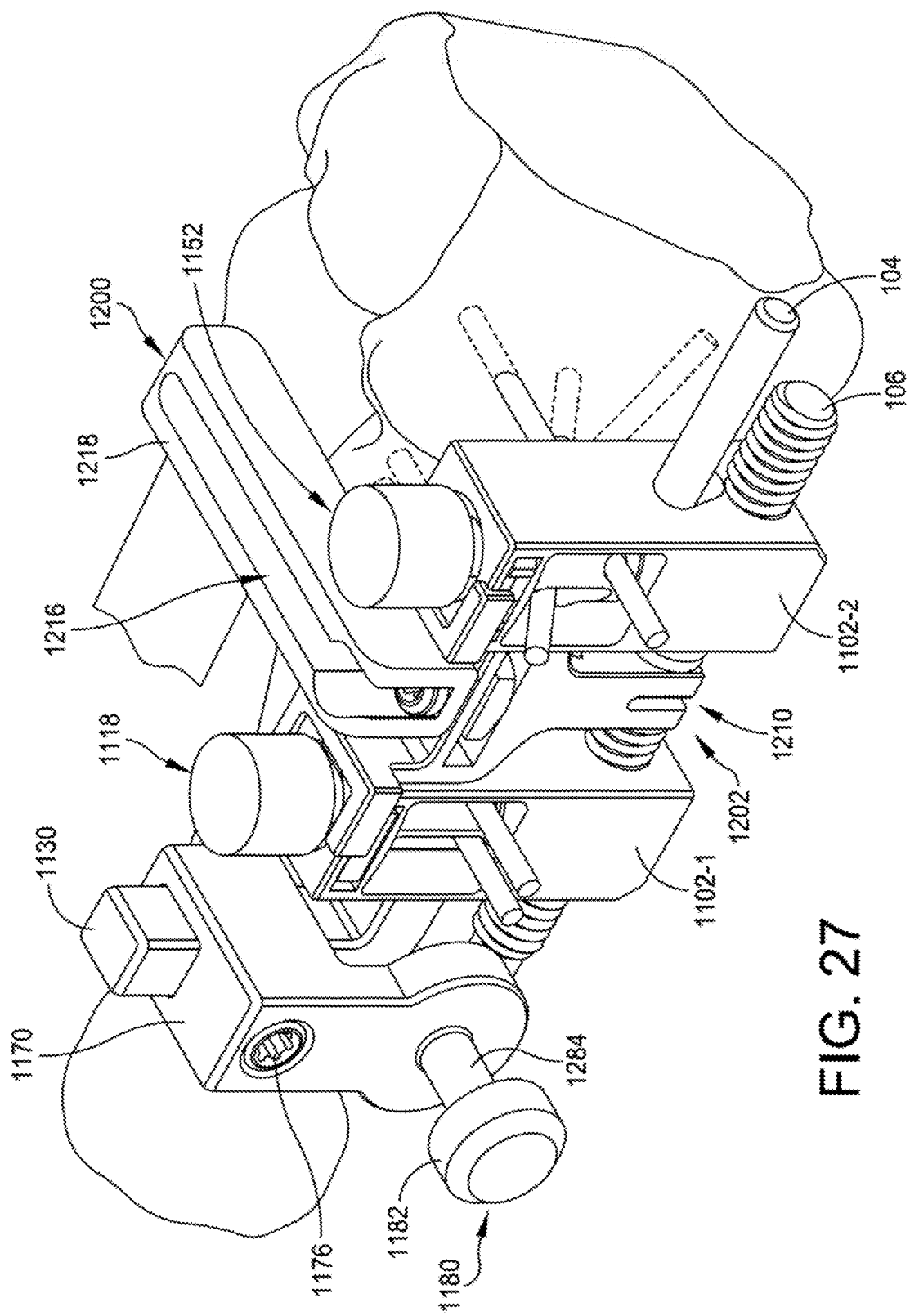
FIG. 27 is an isometric view the assembly shown in FIG. 25 coupled to bone in accordance with some embodiments.

Pins may be inserted through slots 1122-1, 1122-2 defined by rotational insert 1118 to couple body component 1102-1 to a first bone, or bone segment as shown in FIGS. 26 and 27. Pins may also be inserted through slot 1160 and hole 1154 defined by rotational insert 1146 to couple body component 1102-2 to a bone (which may be the same or different bone or bone segment).

Figure 28:
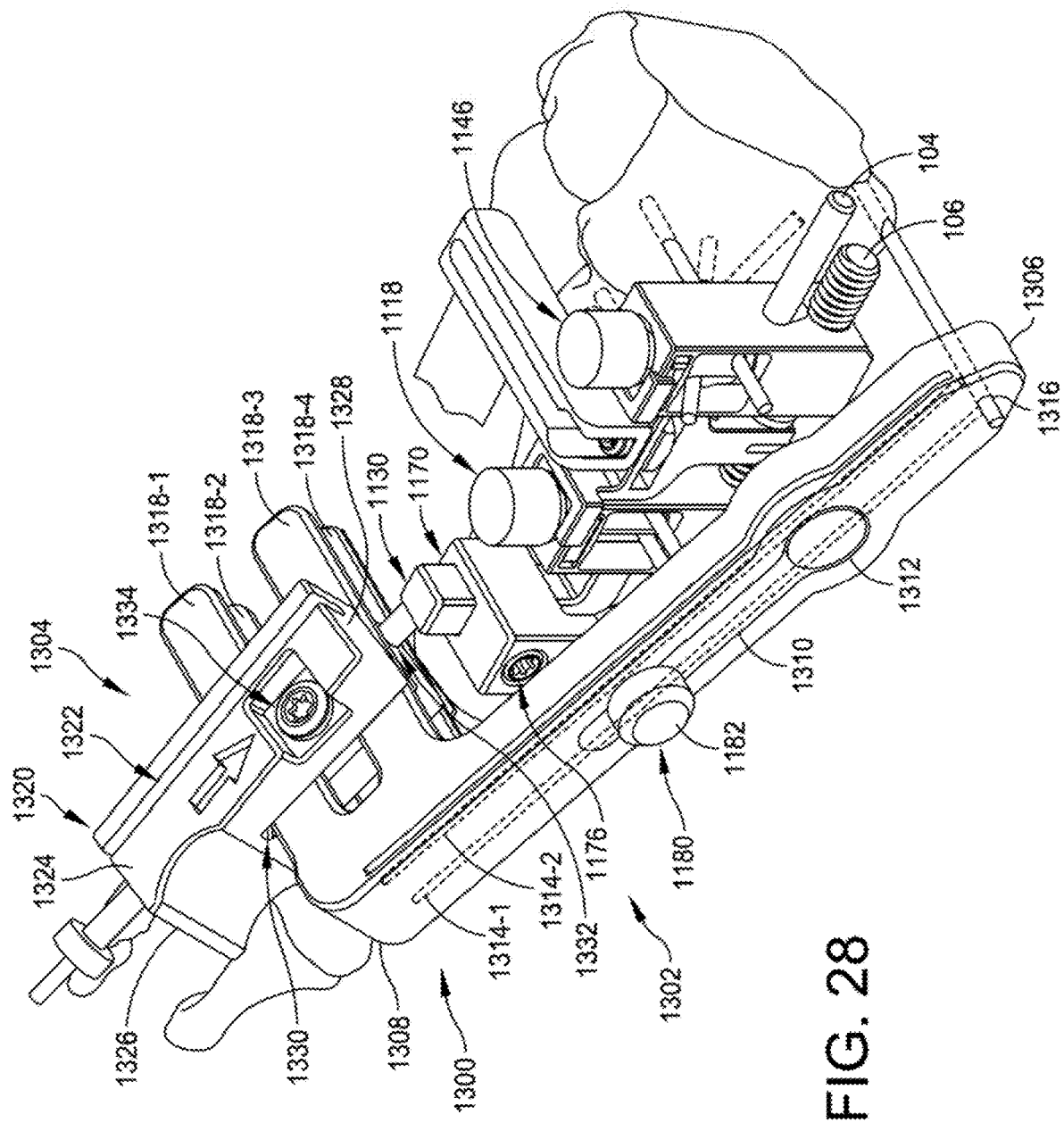
FIG. 28 is an isometric view of another example of a targeting guide coupled to the assembly shown in FIG. 27 in accordance with some embodiments.

A targeting guide 1300 may be coupled to the jig 1100 via coupling component 1170. Although targeting guide 1300 is described as being used with jig 1100, it should be understood that targeting arm 1000 could be used instead. Targeting arm 1300 may include an arm portion 1302 and a guide portion 1304. Arm portion 1302 extends from a first end 1306 to a second end 1308 and defines a slot 1310 along its length. Slot 1310 includes an enlarged opening 1312 at one end. Opening 1312 is dimensioned to receive knob 1180 therein. Arm 1300 may have a width that is less than a width of the second portion 1184 of knob 1180 such that arm 1300 may be positioned between coupling component 1170 and the first portion 1182 of knob 1180 as shown in FIG. 28. Slot 1310 may have a width that is greater than a diameter of the second portion 1184 of knob 1180 such that targeting arm 1300 may slide along knob 1180.

In some embodiments, arm portion 1302 is formed from a radiolucent material and includes or supports one or more radiopaque members 1314-1, 1314-2 (collectively, "radiopaque members 1314"). Radiopaque members 1314 extend along the length of arm portion 1302 and are oriented parallel to one another and to the length of slot 1310. Targeting guide 1300 may also include another radiopaque member (not shown) that is similar to radiopaque member 1028 described above with respect to FIGS. 19 and 20. The radiopaque member provided by targeting guide 1300 may be disposed equidistantly between radiopaque members 1314 to provide a surgeon with a visual indicator to confirm that the x-ray machine is aligned with the plane of the device, which helps to avoid parallax errors as will be understood by one of ordinary skill in the art. A hole 1316 is defined adjacent to end 1306 and is sized and configured to receive a pin or k-wire therein as shown in FIG. 28.

Guide portion 1304 of targeting arm 1304 extends at an angle away from arm portion 1302. In some embodiments, guide portion 1304 is oriented perpendicular to arm portion 1302. Guide portion 1304 may include a number of fingers 1318-1, 1318-2, 1318-3, 1318-4 (collectively, "fingers 1318") that are spaced apart from one another. Fingers 1318 provide clearance for receiving a targeting component 1320. Targeting component 1320 defines a slot 1322 along its upper surface 1324 extending from a first side 1326 to a second side 1328 along with a hole 1332, positioned directly beneath slot 1322 that also extends from side 1326 to side 13258. Targeting component 1320 may define another slot 1330 that inwardly extends from side 1328 towards side 1326. Slot 1330 is sized and configured to receive one or more fingers 1318 (e.g., fingers 1318-1, 1318-3) therein.

Targeting component 1320 may also define a hole (not shown) for receiving a fastener 1334, such as a screw or bolt, that is used for clamping targeting component 1320 to the fingers (e.g., fingers 1318-1, 1318-3) to fix the position of targeting component 1320 relative to the guide portion 1304 of targeting arm 1300. Slot 1322 is sized and configured to receive a radiopaque element (e.g., a pin, k-wire, or other elongate, radiopaque element) that may be laid across the skin above a bone (e.g., a metatarsal) such that dorsal-plantar x-ray would show the trajectory of a fixation element (e.g., a pin, k-wire, wire, screw, or other suitable fixation element) that is to be inserted into bone. This visualization may inform the decision of the surgeon as to whether the desired trajectory has been achieved and whether the fastener should be rotated to fix the position of targeting component 1320 relative to the guide portion 1304 of targeting arm 1300.

Figure 29:
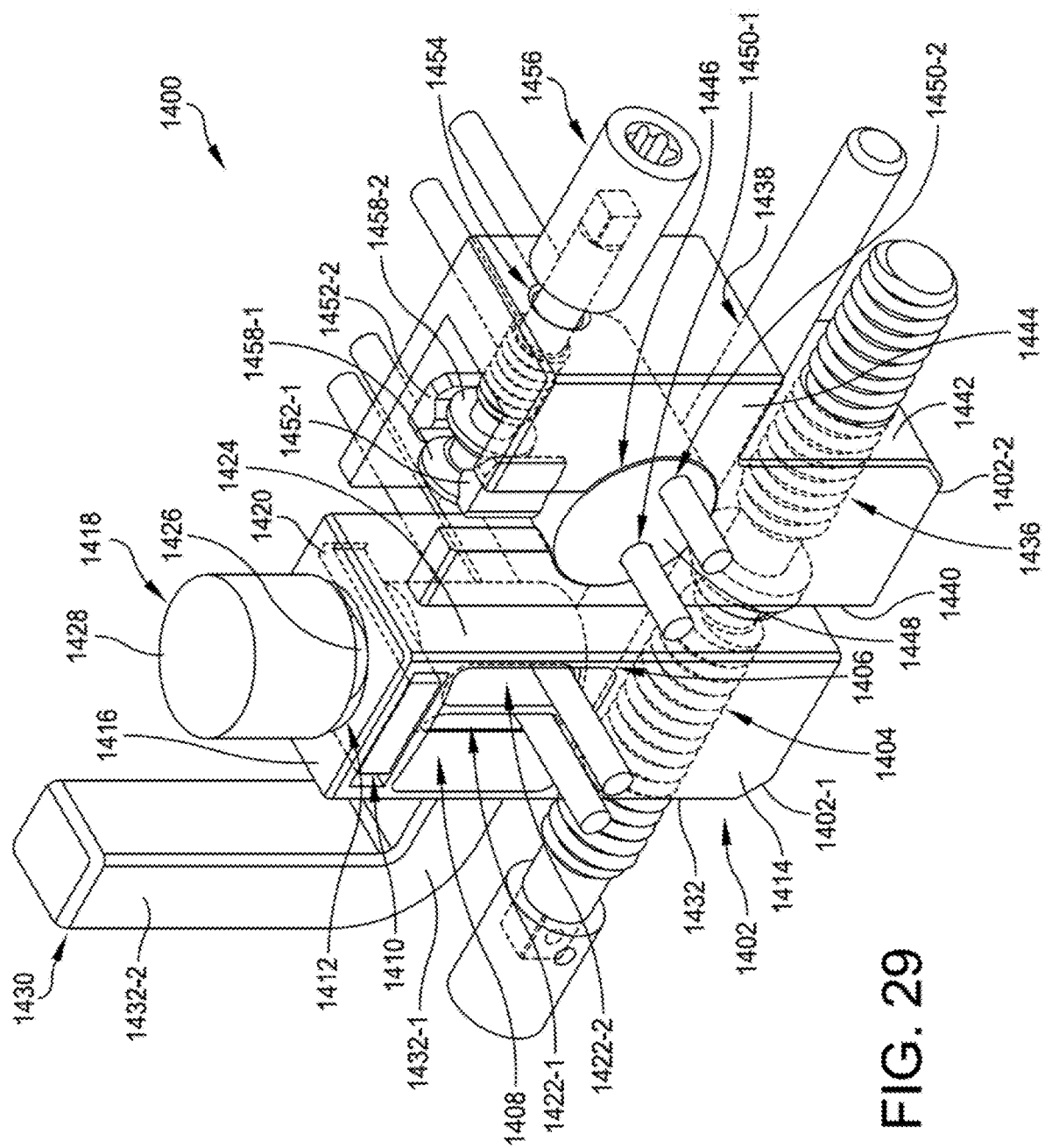
FIG. 29 is an isometric view of another example of a jig in accordance with some embodiments.
Figure 30:
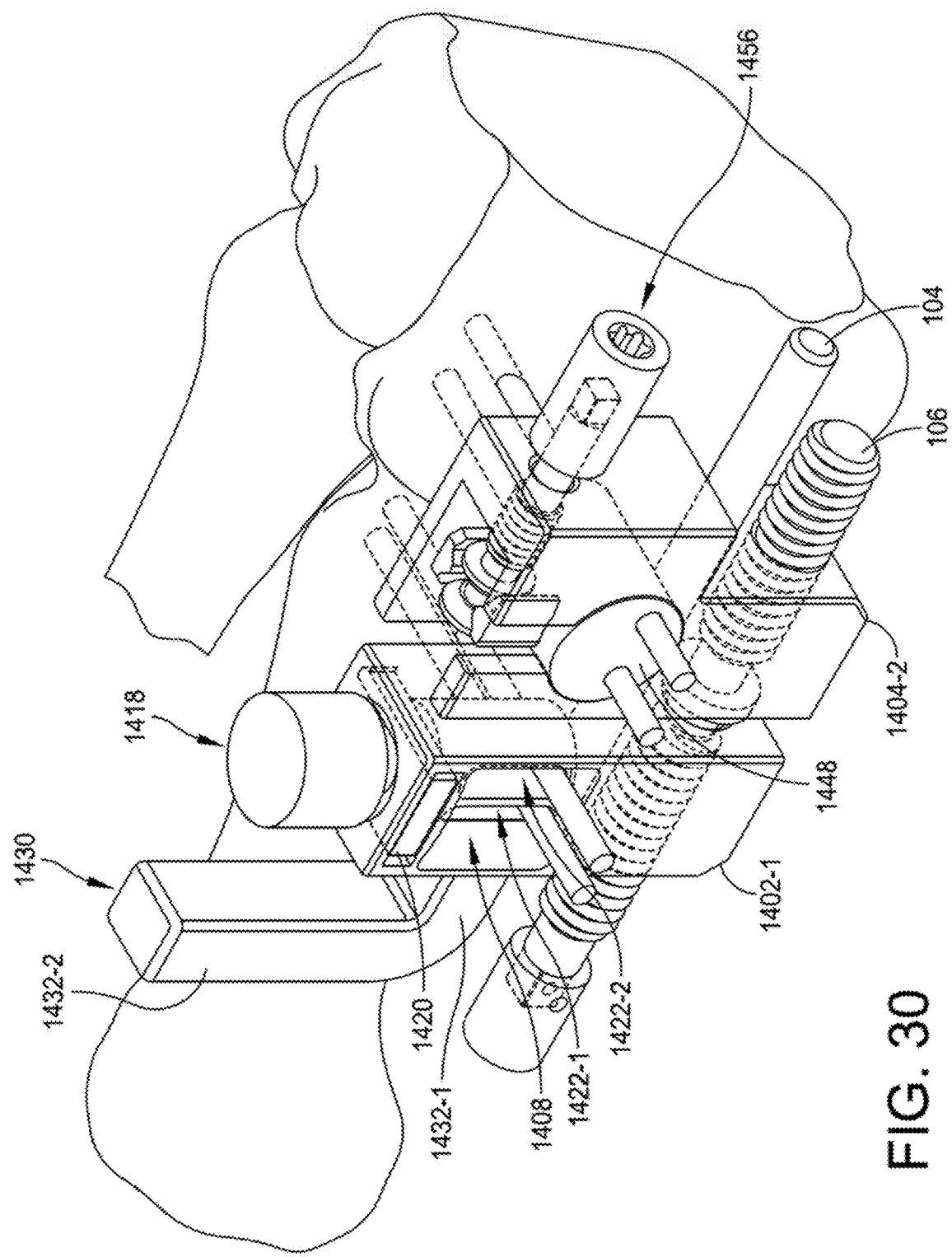
FIG. 30 is an isometric view of the jig illustrated in FIG. 29 coupled to bone in accordance with some embodiments.

Another example of a jig is illustrated in FIGS. 29 and 30. Jig 1400 includes a body 1402 having a first body component 1402-1 and a second body component 1402-2. Body component 1402-1 defines a first hole 1404 and a second hole 1406 that extend parallel to each other through body 1402. In some embodiments, hole 1404 is a threaded hole, and hole 1406 is a non-threaded hole. Hole 1404 may be sized and configured to receive bolt 106 with a threaded engagement, and hole 1406 may be sized and configured to engage dowel 104 with slip-fit, press-fit, or other type of engagement as will be understood by one of ordinary skill in the art.

Body component 1402-1 may also define first and second openings, 1408, 1410 and another hole 1412 that are in communication or otherwise connected to one another. Openings 1408, 1410 extend inwardly from side 1414, and hole 1412 may extend inwardly from side 1416. In some embodiments, openings 1408, 1410 extend through body component 1402-1. The combination of windows 1408, 1410 and hole 1412 is shaped and dimensioned to receive a rotational insert 1418, which may be secured within body component 1402-1 by a clip 1420 positioned within window 1410. Rotation insert 1418 may define a pair of parallel slots 1422-1, 1422-2 (collectively, "slots 1422") that extend through the base 1424 of rotational insert 1418. Slots 1422 may be angled like slots 132 described above.

Rotational insert 1418 may include a stem 1426 and an enlarged head 1428, which provides a surgeon with increased surface area to grasp the insert 1418. The clip 1420 is configured to engage the stem or neck 1426 of rotational insert 1418 and prevent rotational insert 1418 from translating along its central longitudinal axis (e.g., an axis extending through base 1424, stem 1426, and head 1428) while allowing rotational insert 1418 to rotate about this axis.

Body component 1402-1 also may include an arm support 1430 extending from side 1432, which is disposed adjacent to side 1414 and side 1416. Arm support 1430 may include a first leg 1434-1 and a second leg 1434-2 (collectively, "legs 1434") that collectively provide arm support 1430; however, one of ordinary skill in the art will understand that arm support may have fewer or more segments or legs. Leg 1434-1 may extend horizontally from side 1432, and leg 1434-2 may extend perpendicularly or obliquely from leg 1434-1 in an upward direction as shown in FIG. 29.

Body component 1402-2 may define a first hole 1436 and a second hole 1438 that extend parallel to each other from a first side 1440 through body component 1402-2 to second side 1442. Body component 1402-2 may include an extension 1444 having an enlarged width dimension (i.e., in the direction from side 1440 to side 1442) compared to the rest of body component 1402-2. An opening 1446 may be defined by body component 1402-2 that is sized and configured to receive a rotational insert 1448. Rotational insert 1448 may define one or more holes 1450-1, 1450-2 (collectively, "holes 1450") and may include one or more engagement features 1452-1, 1452-2 (collectively, "engagement features 1452") extending from an outer surface of rotational insert 1448. Holes 1450 are sized and configured to receive a fixation element (e.g., pin or k-wire) therein. The one or more engagement features 1452 are configured (e.g., dimensioned and shaped) to engage corresponding engagement features 1458-1, 1458-2 (collectively, "engagement features 1458") of an adjustment bolt 1456 that may be received within a hole 1454 defined by the extension 1444 of body component 1402-2. Hole 1454 may extend parallel to hole 1436 and hole 1438 defined by body component 1402-2.

Adjustment bolt 1456 may be threaded along at least a portion of its length such that the threaded portion of adjustment bolt 1456 may engage threads provided along the length of hole 1454. Rotation of adjustment bolt 1456 relative to body component 1402-2 in a first direction (e.g., clockwise) may result in the adjustment bolt 1456 advancing linearly along the hole 1454 (e.g., into the hole 1454), and rotation of adjustment bolt 1456 in a second direction (e.g., counterclockwise) may result in the adjustment bolt 1456 advancing linearly along the hole 1454 in an opposite direction (e.g., out of hole 1454). Due to the engagement between the engagement features 1452 on rotational insert 1448 and engagement features 1458 on adjustment bolt 1456, the rotational insert 1448 may rotate about its axis within body component 1402-2.

Figure 31:
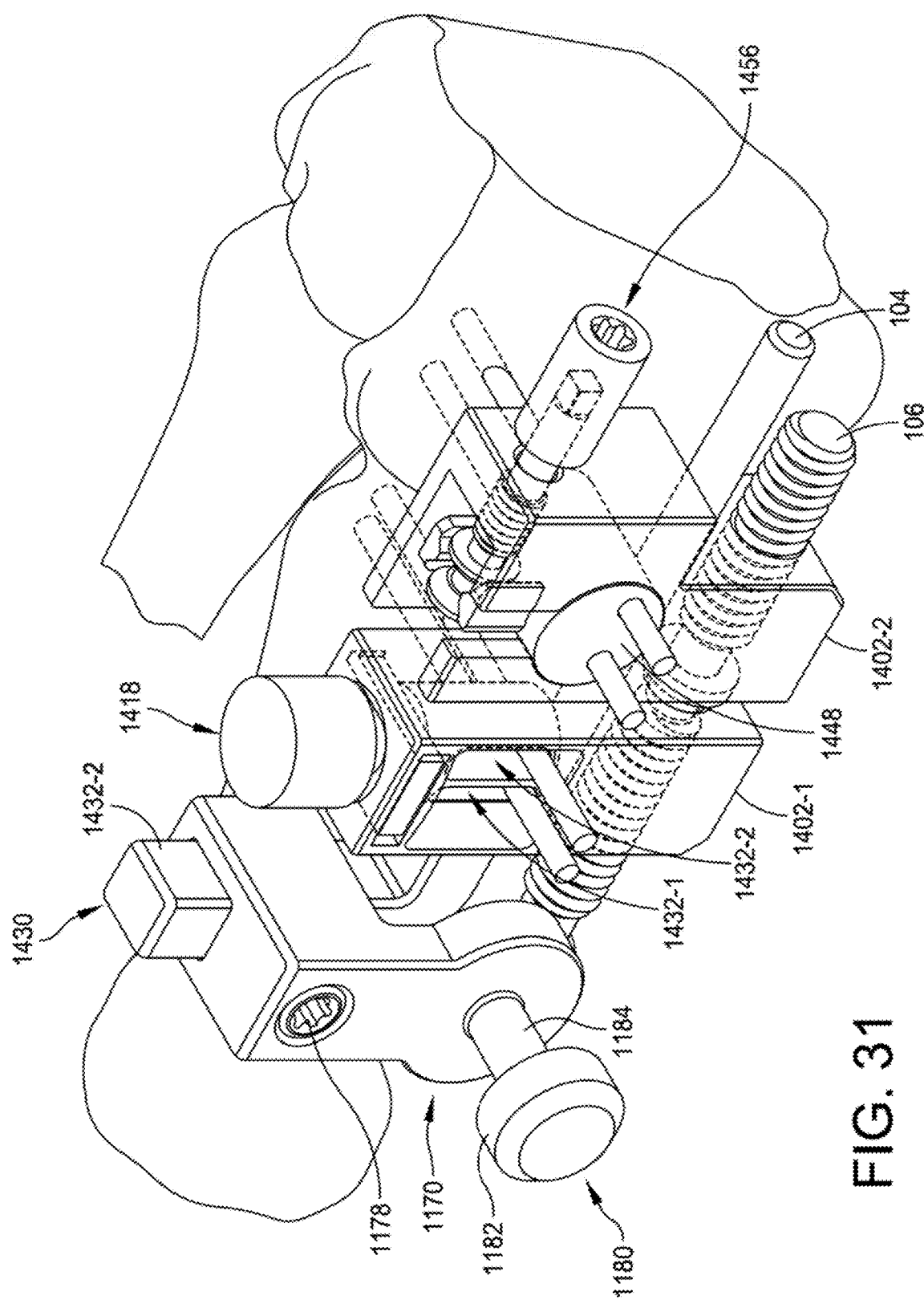
FIG. 31 shows a coupling component illustrated in FIG. 22 coupled to the jig illustrated in FIGS. 29 and 30 in accordance with some embodiments.

As shown in FIG. 31, the arm support 1430 may be used to engage coupling component 1170. More specifically, the leg 1432-2 of arm support 1430 may be received within opening 1174 defined by coupling component 1170. The position of coupling component 1170 along the length of leg 1432-2 may be fixed by tightening of set screw 1178 as will be understood by one of ordinary skill in the art.

Figure 32:
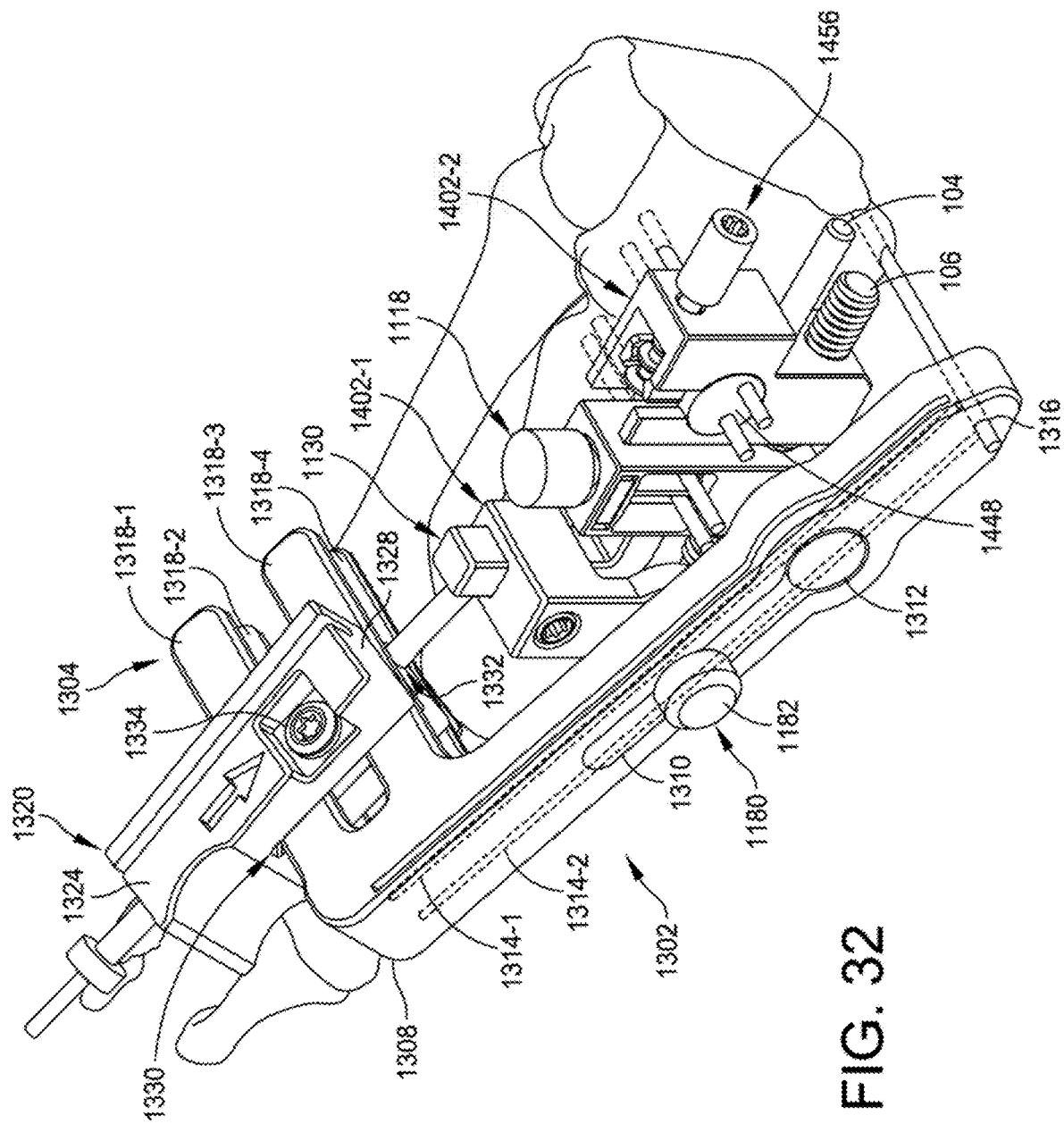
FIG. 32 is an isometric view of the targeting guide illustrated in FIG. 28 coupled to the assemblage shown in FIG. 31, in accordance with some embodiments.
Figure 33:
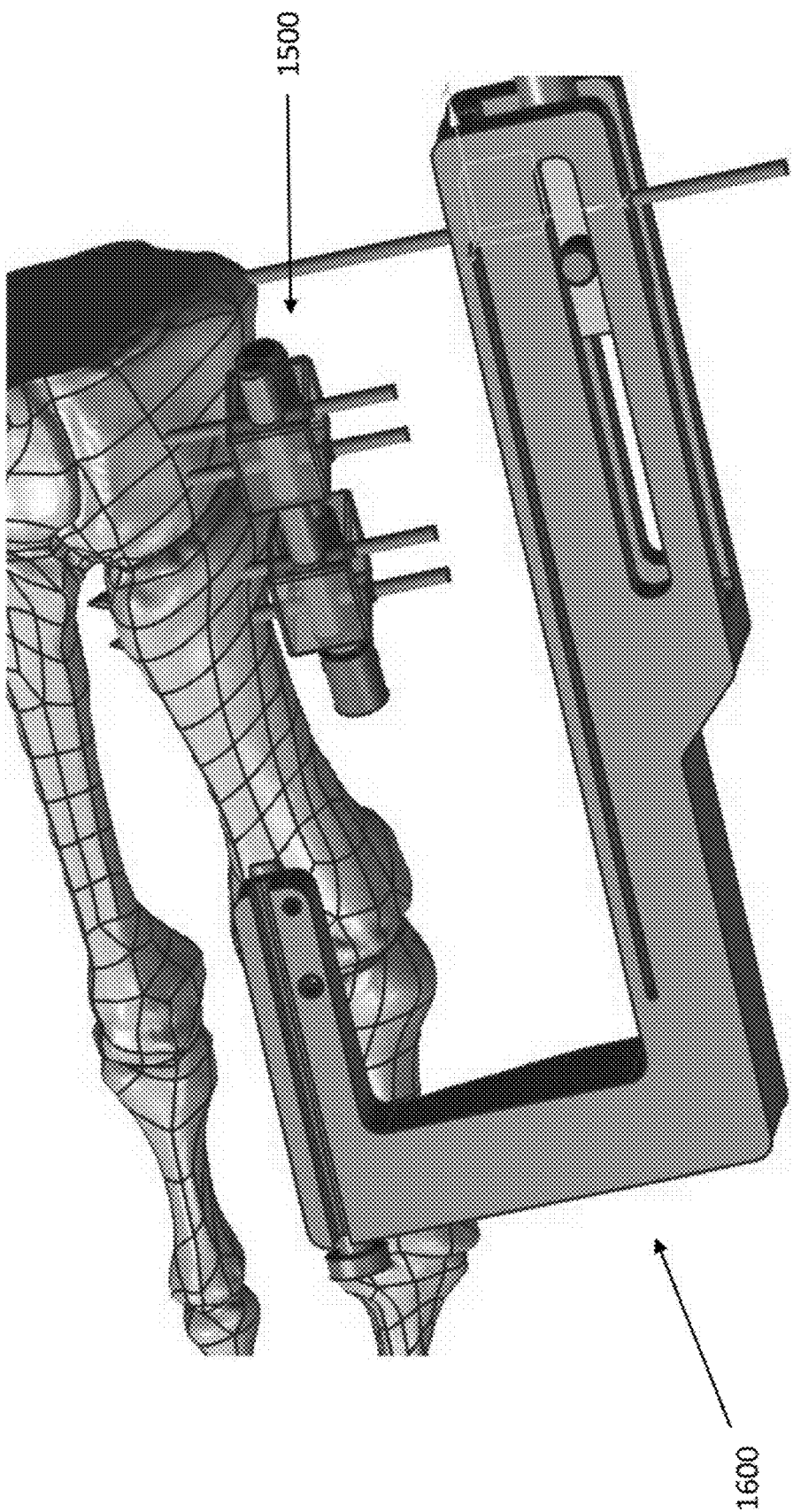
FIG. 33 illustrates one example of a compression/distraction jig and a targeting arm coupled to an extremity in accordance with some embodiments.

As shown in FIG. 32, the targeting guide 1300, which is described above, may be coupled to coupling component 1170 that is supported by jig 1400. While targeting guide 1300 is shown as being coupled to jig 1400, it should be understood that other targeting arms, including targeting arm 1000 coupled be coupled to the assemblage of jig 1400 and coupling component 1170. Further, it should be understood that any of the guidance tools 500, 600, 700, 800, 1200 could be coupled to jig 1400 via bolt 106 and dowel 104 as described above.

Figure 35:
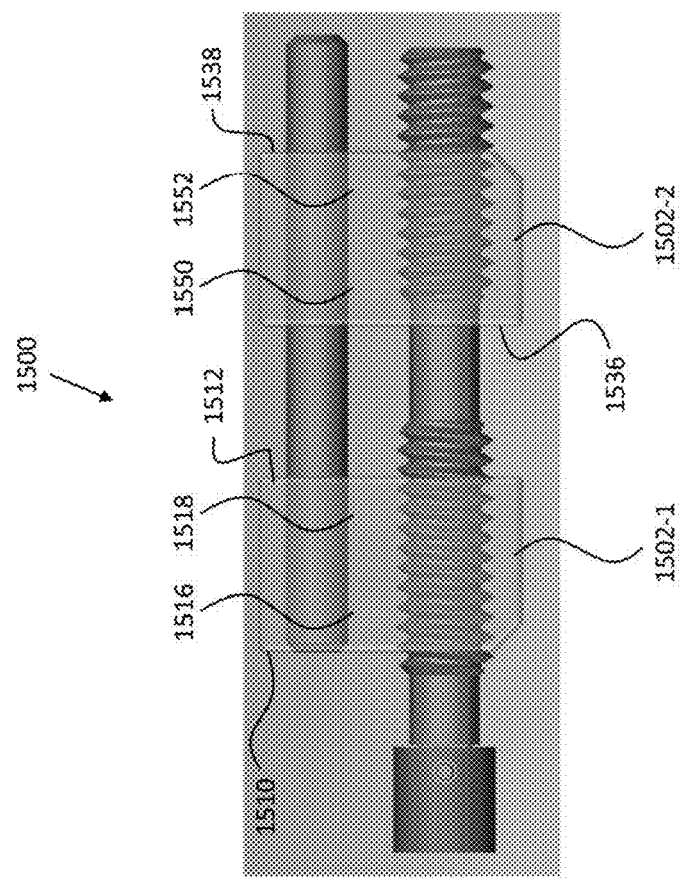
FIG. 35 is a front side view of the compression/distraction jig illustrated in FIG. 34 in accordance with some embodiments.
Figure 34:
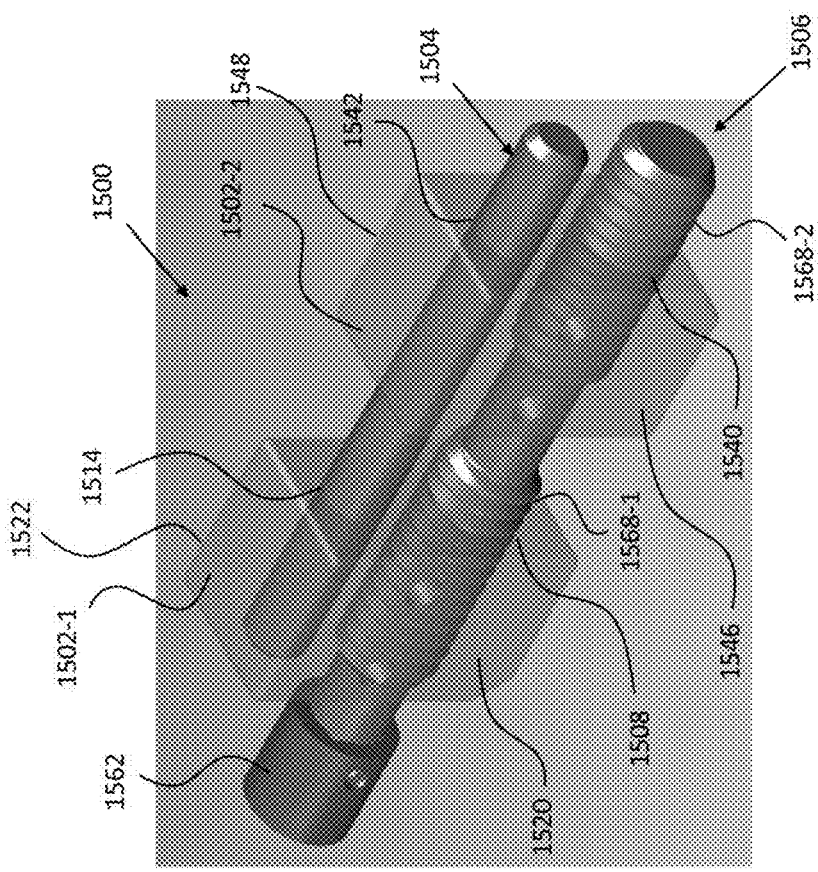
FIG. 34 is an isometric view of one example of a compression/distraction jig in accordance with some embodiments.

FIGS. 33-53 illustrates one example of a system and its use in accordance with some embodiments. System includes a compression/distraction jig 1500, which is illustrated in FIGS. 34 and 35, including a first body portion 1502-1 and a second body portion 1502-2. First and second body portions 1502-1, 1502-2 may be coupled together using one or more fasteners. For example, in some embodiments, the one or more fasteners include at least one dowel 1504 and at least one bolt 1506. Dowel 1504 may have the same configuration as dowel 104, and bolt 1506 may have the same configuration as dowel 106. As such, duplicative descriptions are not provided.

First body portion 1502-1 defines a first hole 1508 extending from a first side 1510 to a second side 1512. Hole 1508 may be threaded and configured to receive bolt 1506 as discussed herein. First body portion 1502-1 also defines a second hole 1514 that extends inwardly from second side 1512. Second hole 1514, which may be disposed parallel to first hole 1508, is sized and configured to receive dowel 1504.

Body portion 1502-1 may also define one or more holes 1516, 1518 that extend through body portion 1502-1 from side 1520 to side 1522. Holes 1514, 1516 may extend through body portion 1502-1 parallel to one another and perpendicular to holes 1508, 1514. As described in greater detail below, holes 1516, 1518 facilitate securing compression/distraction jig 1500 to a first bone. In some embodiments, hole 1514 may be a blind hole and be sized and configured to receive a dowel, such as dowel 1504, via an interference fit as will be understood by one of ordinary skill in the art. One of ordinary skill in the art will understand that dowel 1504 or other elements may be received within hole 1514 via other fits, e.g., slip fit, in some embodiments.

Second body portion 1502-2 defines a hole 1540, which may be threaded and extend from side 1536 entirely through second body portion 1502-2 to side 1538. Hole 1540 is sized and configured to receive at least a portion of bolt 1506 therein as will be described in greater detail below. Second body portion 1502-2 also defines another hole that may extend from side 1536 entirely through second body portion 1502-2 to side 1538. A person of ordinary skill in the art will understand that, in some embodiments, hole 1542 may be a blind hole extending inwardly from side 1536. Hole 1542 is sized and configured to at least partially receive dowel 1504 via a slip fit, although one of ordinary skill in the art will understand that hole may be sized to receive dowel 1504 with other fit types.

Second body portion 1502-2 may also define a pair of holes 1550, 1552 extending from side 1546 to side 1548. In some embodiments, holes 1550, 1552 are parallel to one another and perpendicular to holes 1540, 1542. Holes 1550, 1552 are sized and configured to receive a pin for securing second body portion 1502-2 to a bone.

As noted above, the combination of dowel 1504 and bolt 1506 couple together body portion 1502-1 and body portion 1502-2. Specifically, dowel 1504 is received within hole 1514 defined by body portion 1502-1 and within hole 1542 defined by portion 1502-2. As noted above, in some embodiments, dowel 1504 is received within hole 1514 and hole 1542 via a slip fit such that body portions 1502-1, 1502-2 may translate along dowel 1504, although dowel 1504 may be received within hole 1514 with other fits, including a press-fit. Second threaded section 1568-1 of bolt 1506 is threaded into threaded hole 1540 of body portion 1502-2, and first threaded section 1568-2 is threaded into threaded hole 108 of body portion 1502-1 such that head 1562 of bolt 1506 is positioned adjacent to side 1510 of body portion 1502-1.

In use, the compression/distraction jig 1500 may be secured to two different bones of a joint to facilitate compression and/or distraction of a joint. For example, jig 1500 may be secured to a first bone (such as a cuneiform) via pins inserted through holes 1550, 1552 defined by second body portion 1502-2 and to a second bone (e.g., a metatarsal) via pins inserted through holes 1514, 1516 defined by first body portion 1516-1. Note that the compression/distraction jig 1500 may be used with a placement device, such as placement device 300 described above, or other placement suitable placement devices as will be understood by one of ordinary skill in the art. Repetitive descriptions of placement device 300 are not provided here.

Compression/distraction jig 1500 may be used in combination with a targeting guide, such as targeting arm 1600 illustrated in FIGS. 36-44, via indirect coupling as described below. Targeting arm 1600 includes an arm portion 1602 and a guide portion 1604. Arm portion 1602 extends from a first end 1606 to a second end 1608. A channel 1610 extends inwardly from end 1606 along at least a portion of a length of arm portion 1602 and inwardly from side 1612 as best seen in FIGS. 36-39. In some embodiments, channel 1610 has a rectangular cross-sectional geometry (FIGS. 38-39) although one of skill in the art will understand that channel 1610 may have other cross-sectional geometries.

Side 1614, which is disposed on the opposite side of arm portion 1602 as side 1612 as best seen in FIGS. 36-39, defines a slot 1616 that extends inwardly from end 1606 and communicates with channel 1610. In some embodiments, a length of slot 1616 is less than a length of channel 1610, although one of ordinary skill in the art will understand that slot 1616 has a length that is equal to or greater than a length of channel 1610. Slot 1616 may have a width that is less than a width of channel 1610 as best seen in FIGS. 37-39.

Figure 36:
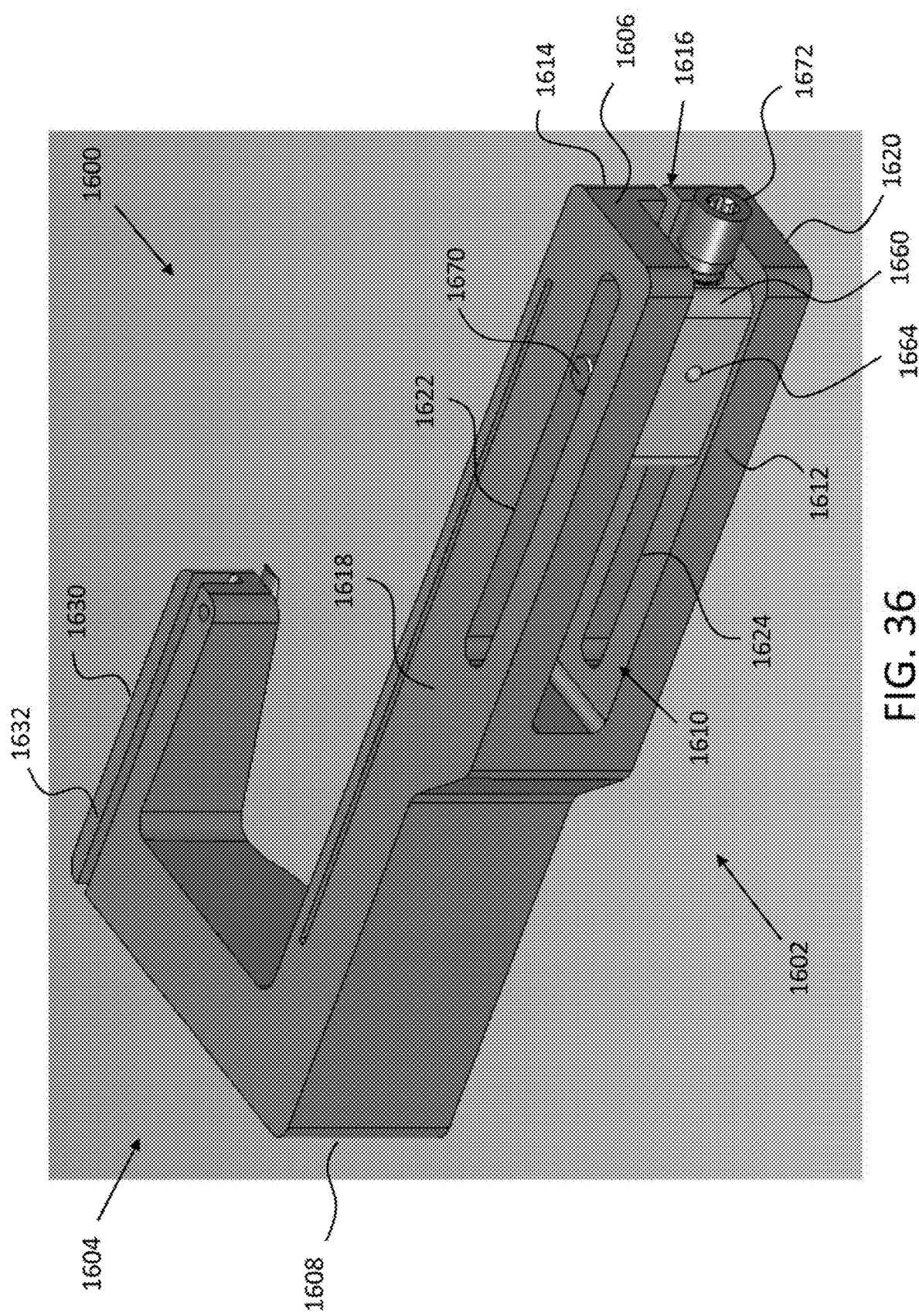
FIG. 36 is an isometric view of one example of a targeting arm in accordance with some embodiments.
Figure 42:
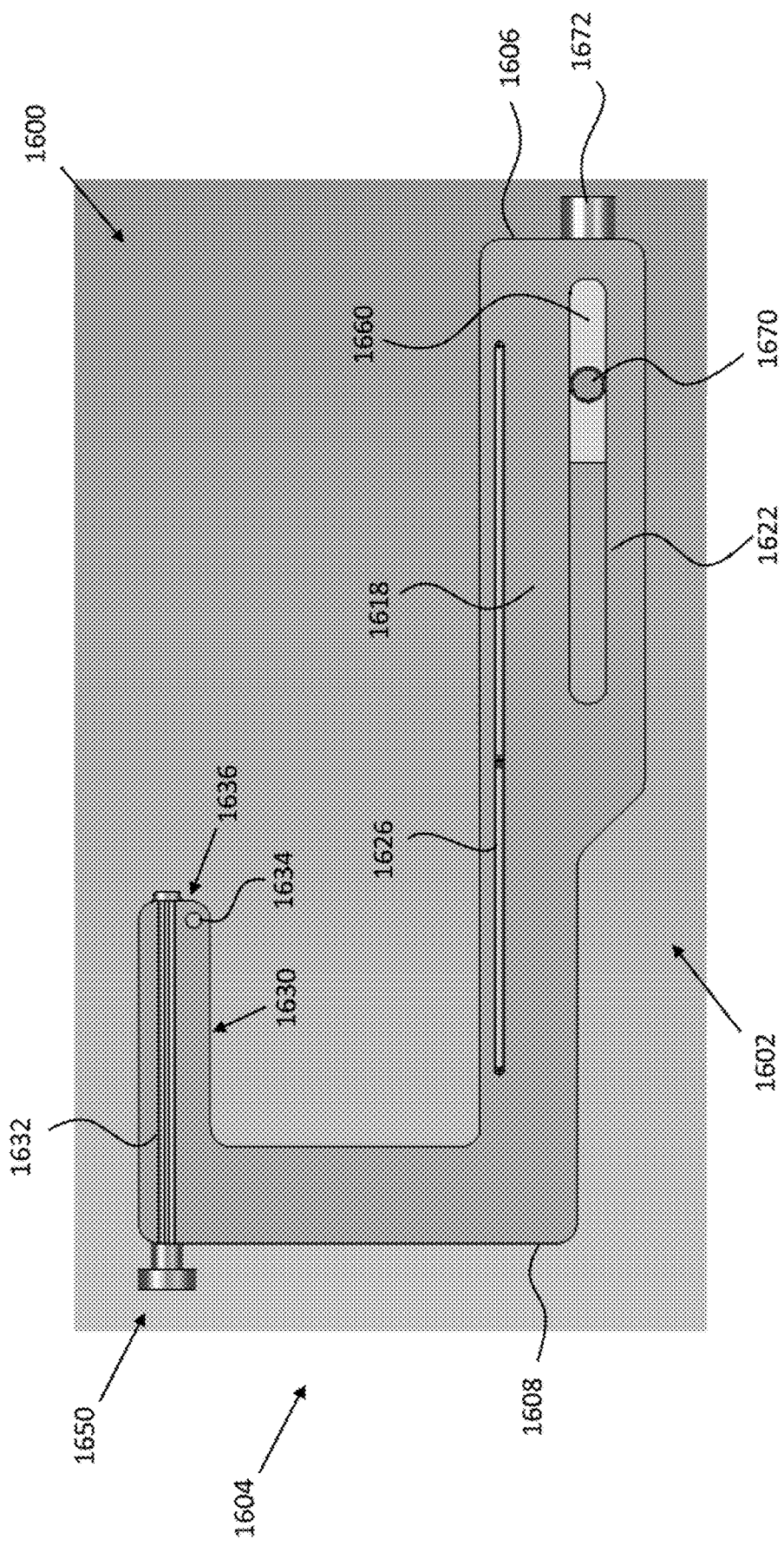
FIG. 42 is a top side plan view of the targeting arm illustrated in FIG. 36 in accordance with some embodiments.

As best seen in FIGS. 36 and 42, opposed sides 1618, 1620 may each define a respective slot 1622, 1624. Slots 1622, 1624 may be aligned with one another and communicate with channel 1610. In some embodiments, slots 1622, 1624 are sized and configured to receive a dowel, such as dowel 1670, pin, or other component in sliding engagement as described in greater detail below.

Figure 52:
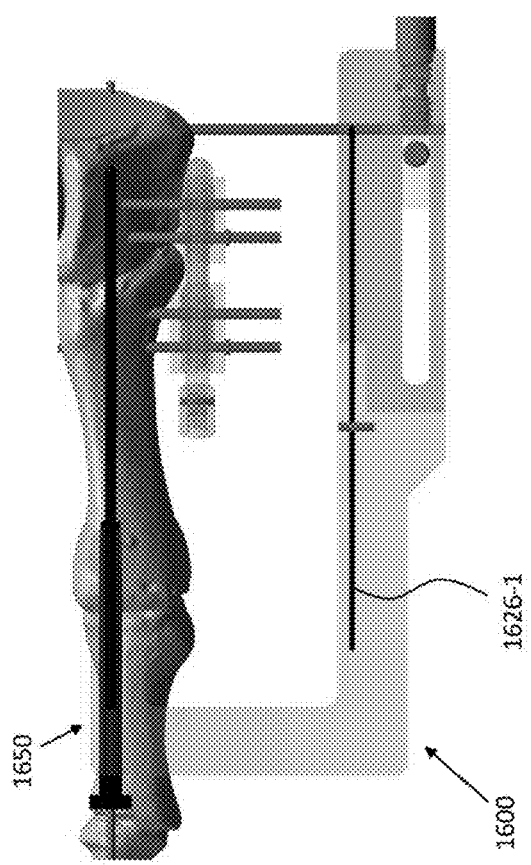
FIG. 52 illustrates one example of an A-P view of the targeting arm illustrated in FIGS. 36-44 showing the radiopaque guidance provided by the targeting arm and an auxiliary pin in accordance with some embodiments.
Figure 51:
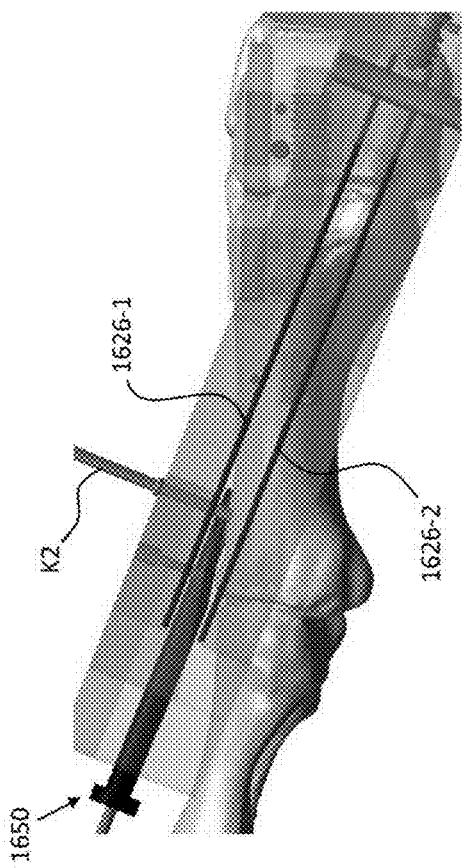
FIG. 51 illustrates one example of a lateral view of the targeting arm illustrated in FIGS. 36-44 showing the radiopaque guidance provided by the targeting arm in accordance with some embodiments.

Arm portion 1602 may be formed from a radiolucent material and include and/or support one or more radiopaque members 1626-1, 1626-2 (collectively, "radiopaque member 1626") that extend parallel to one another along the length of arm portion 1602 (best seen in FIGS. 42, 51-52). Radiopaque members 1626 provide visual cues for confirming the proper orientation and alignment of the targeting arm 1600 to avoid parallax errors as will be understood by one of ordinary skill in the art.

Guide portion 1604 of targeting arm 1600 extends at an angle away from arm portion 1602. In some embodiments, guide portion 1604 is oriented perpendicular to arm portion 1602 as shown in FIGS. 36 and 42, although one of ordinary skill in the art that guide portion 1604 may extend from arm portion 1602 at other angles.

Figure 41:
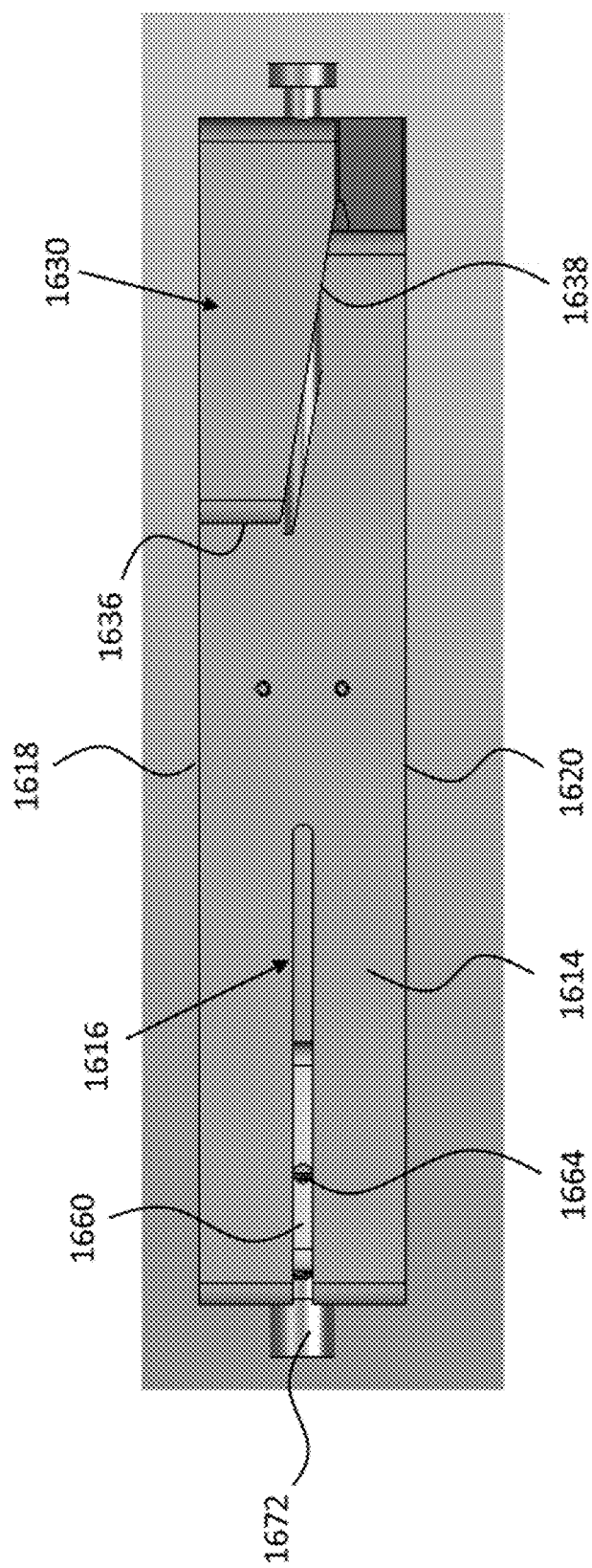
FIG. 41 is a side view of the targeting arm that is opposite the side view shown in FIG. 37 in accordance with some embodiments.

Guide portion 1604 may also include a targeting extension 1630 that extends parallel to arm portion 1602 (FIG. 42). A targeting slot 1632 may extend inwardly from side 1618 and along the entire or a portion of the length of the targeting extension 1630. Slot 1632 is sized and configured to receive an auxiliary pin or other radiopaque device to provide visualization of the trajectory provided by hole 1640. A hole 1634 is defined adjacent to the end 1636 of targeting extension 1630 and targeting slot 1632 extending through targeting extension 1630 from side 1618 to side 1638. Hole 1634 is sized and configured to receive a k-wire, pin, or other fixation element as described in greater detail below. As best seen in FIG. 41, the lower side 1638 of targeting extension 1630 tapers along its length such that it narrows near end 1636.

Targeting extension 1630 also defines a hole 1640 that extends parallel to the length of targeting extension 1630 and is aligned with targeting slot 1632. Hole 1640 is sized and configured to receive a sleeve, such as sleeve 1650 illustrated in FIG. 43. Sleeve 1650 may have an elongate body 1652 extending from enlarged head 1654 to leading end 1656 and defining a through hole 1658. Through hole 1658 is sized and configured to receive a k-wire, pin, or other fixation element as described below.

Figure 44:
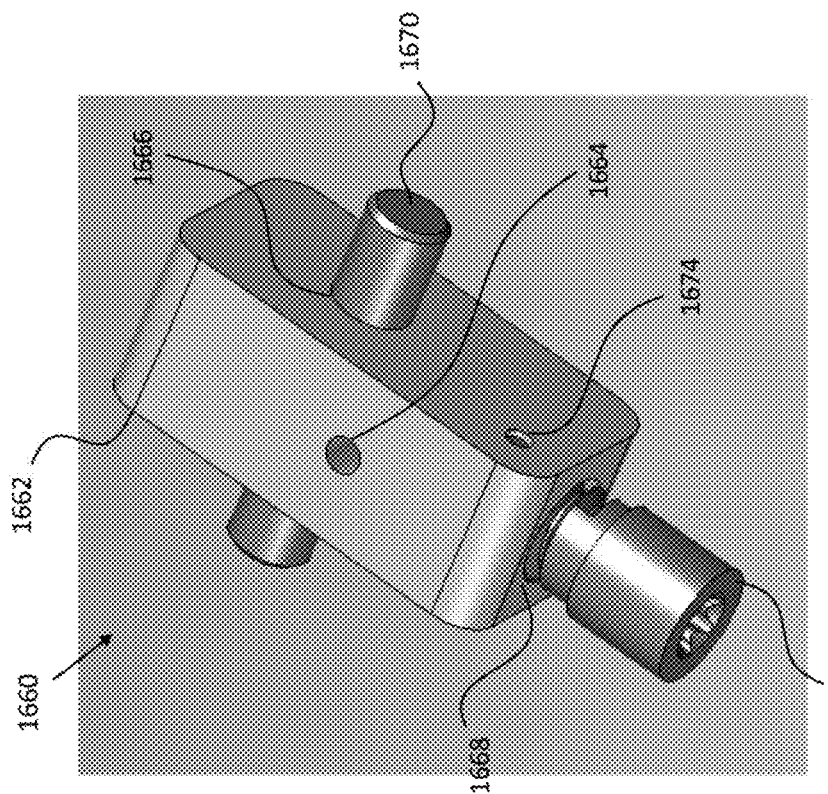
FIG. 44 is an isometric view of an adjustment guide block that may be used with the targeting arm illustrated in FIG. 36 in accordance with some embodiments.
Figure 43:
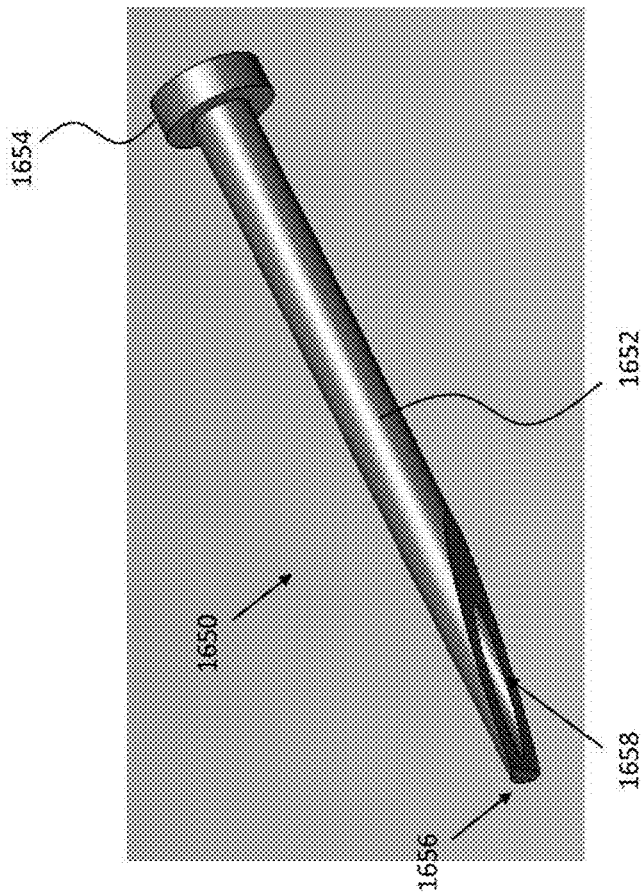
FIG. 43 is an isometric view of one example of a sleeve that may be used with the targeting arm illustrated in FIG. 36 in accordance with some embodiments.
Figure 46:
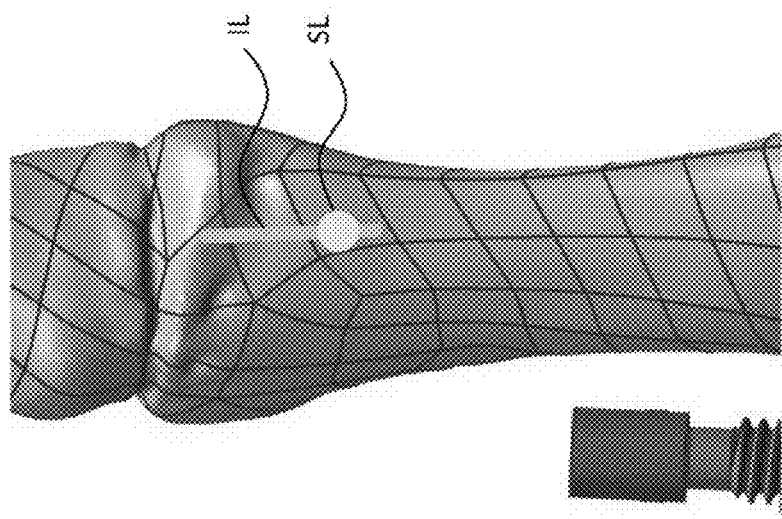
FIG. 46 illustrates an approximate location of an incision and desired screw entry over a second bone (e.g., a metatarsal) in accordance with some embodiments.

FIG. 44 illustrates one example of an adjustment guide block 1660 that may be used with targeting arm 1600. Adjustment guide block 1660 has a body 1662 sized and configured to be received within channel 1610 defined by arm portion 1602 of targeting arm 1600. Body 1662 defines a first hole 1664 that extends through body 1662 in a first direction, a second hole 1666 that extends through body 1662 in a second direction, and a third hole 1668 that extends into the body in a third direction. Hole 1664 is sized and configured to receive a k-wire, pin, or other fixation element, hole 1666 is sized and configured to receive a dowel, such as dowel 1670 illustrated in FIG. 44, and hole 1668 communicates with (e.g., intersects) hole 1664 and sized and configured to receive a locking screw 1672. In some embodiments, body 1662 may also define a fourth hole 1674 that receives a cross-pin (not shown) for securing locking screw 1672 to body 1662. Dowel 1670 is sized and configured to be received within slots 1622, 1624 defined by arm portion 1602 of targeting arm 1600.

Figure 45:
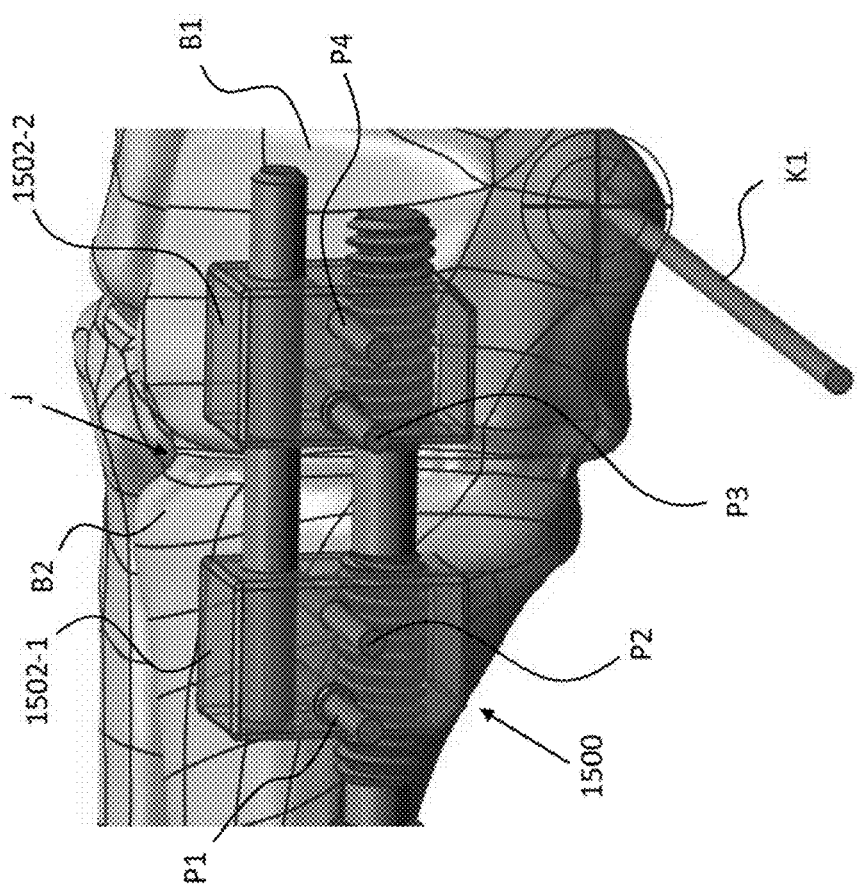
FIG. 45 illustrates one example of a k-wire being positioned within a first bone (e.g., a cuneiform) adjacent to the compression/distraction jig illustrated in FIGS. 34 and 35 in accordance with some embodiments.

One example of a surgical technique using the system described in FIGS. 33-44 is described with reference to FIGS. 45-53. Referring first to FIG. 45, compression/distraction jig 1500 is secured across a joint, such as a TMT joint, between a first bone B1 (e.g., a cuneiform) and a second bone B2 (e.g., a metatarsal). Compression/distraction jig 1500 may be secured to the bones B1, B2 by inserting pins (e.g., pins P1, P2) into holes 1516, 1518 defined by first body portion 1502-1 and inserting pins (e.g., pins P3, P4) into holes 1550, 1552 defined by second body portion 1502-2 as shown in FIG. 45. In some embodiments, compression/distraction jig 1500 is placed using a placement device as described above. Bolt 1506 may be used to obtain the desired compression/distraction of joint J by rotating bold 1506.

A first k-wire, K1, is inserted at the target location (indicated by the cross hairs in FIG. 45) of the first bone B1. In some embodiments, with compression/distraction jig 1500 coupled across joint J, an incision is made at and distal to the desired screw location SL. For example, the incision may be made approximately 3 mm lateral of the centerline of the second bone B2 as indicated by line IL in FIG. 46.

Figure 48:
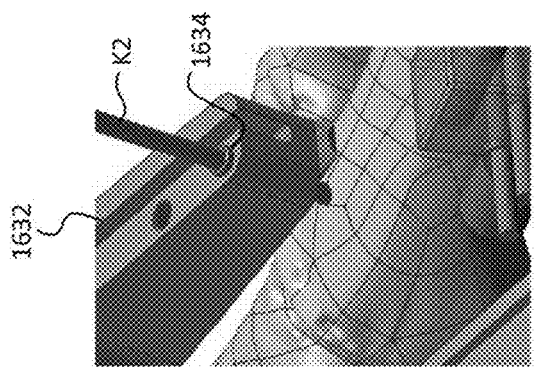
FIG. 48 illustrates the placement of a second k-wire in the second bone guided by the targeting arm illustrated in FIGS. 36-44 in accordance with some embodiments.
Figure 47:
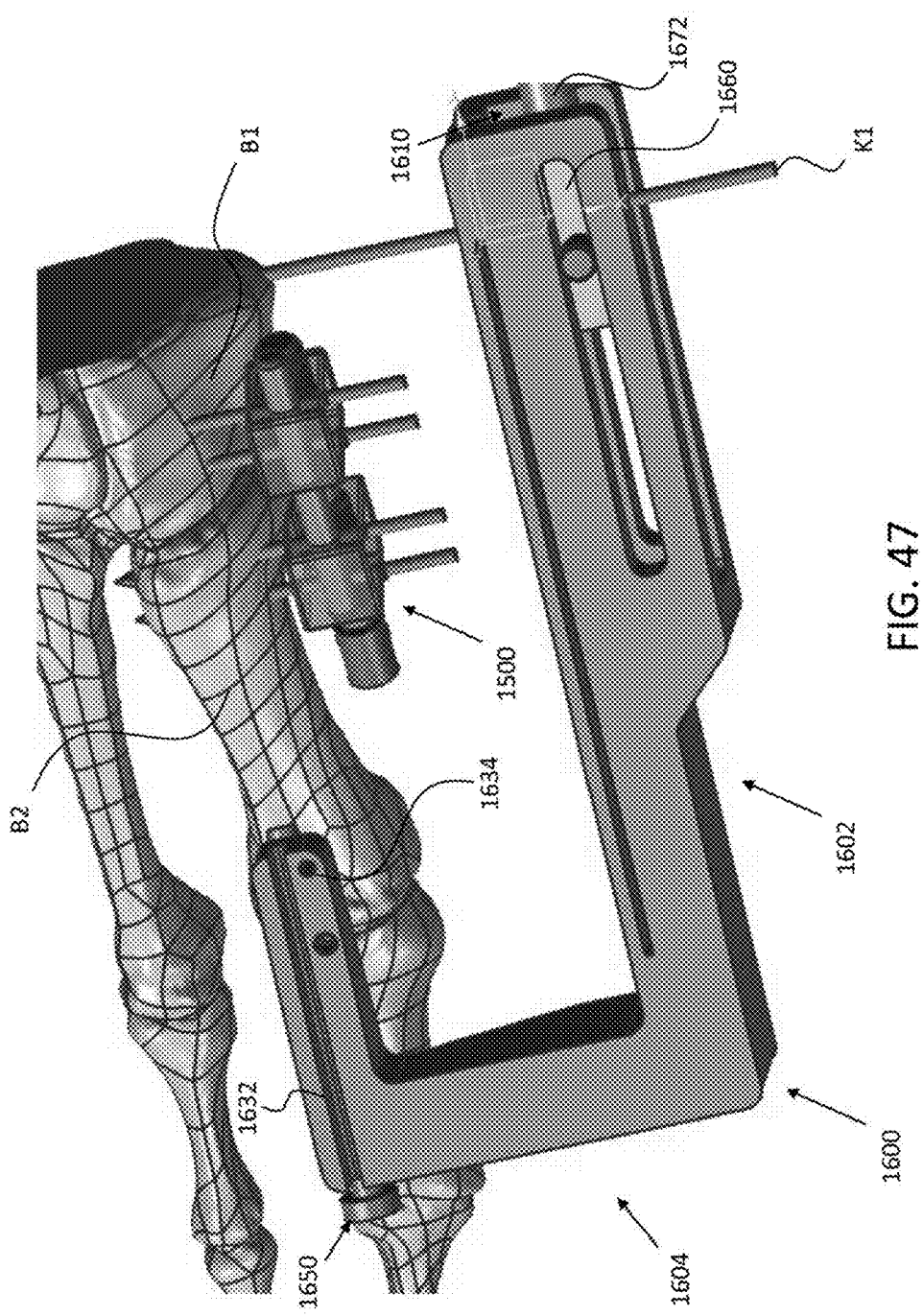
FIG. 47 illustrates the placement of the targeting arm illustrated in FIGS. 36-44 on the k-wire placed in FIG. 46 in accordance with some embodiments.
Figure 50:
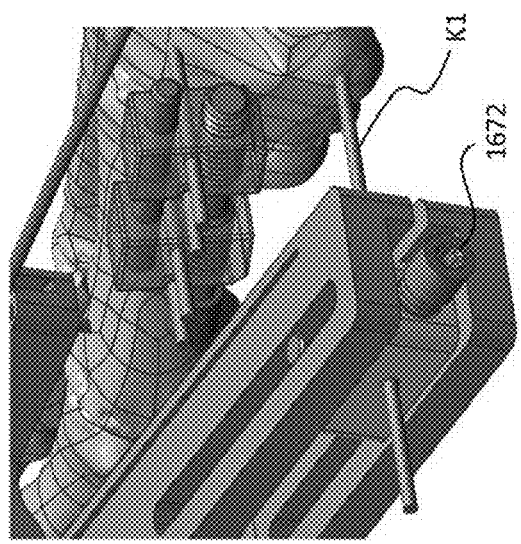
FIG. 50 illustrates the locking mechanism used to lock the targeting arm in accordance with some embodiments.

Turning now to FIG. 47, targeting arm 1600 is then coupled to k-wire K1 by inserting the exposed end of k-wire K1 into hole 1664 defined by adjustment guide block 1660 that is coupled within channel 1610 of arm portion 1602. Targeting arm 1600 may be slid along the k-wire K1 until targeting extension 1630 is positioned over bone B2. A second k-wire K2 may then be inserted into hole 1634 to couple the targeting extension 1630 (and targeting arm 1600) to the second bone B2 as shown in FIG. 48. In some embodiments, the sleeve 1650 is located within the previously made incision and the second k-wire K2 is placed adjacent to the distal end of the second bone B2.

Figure 49:
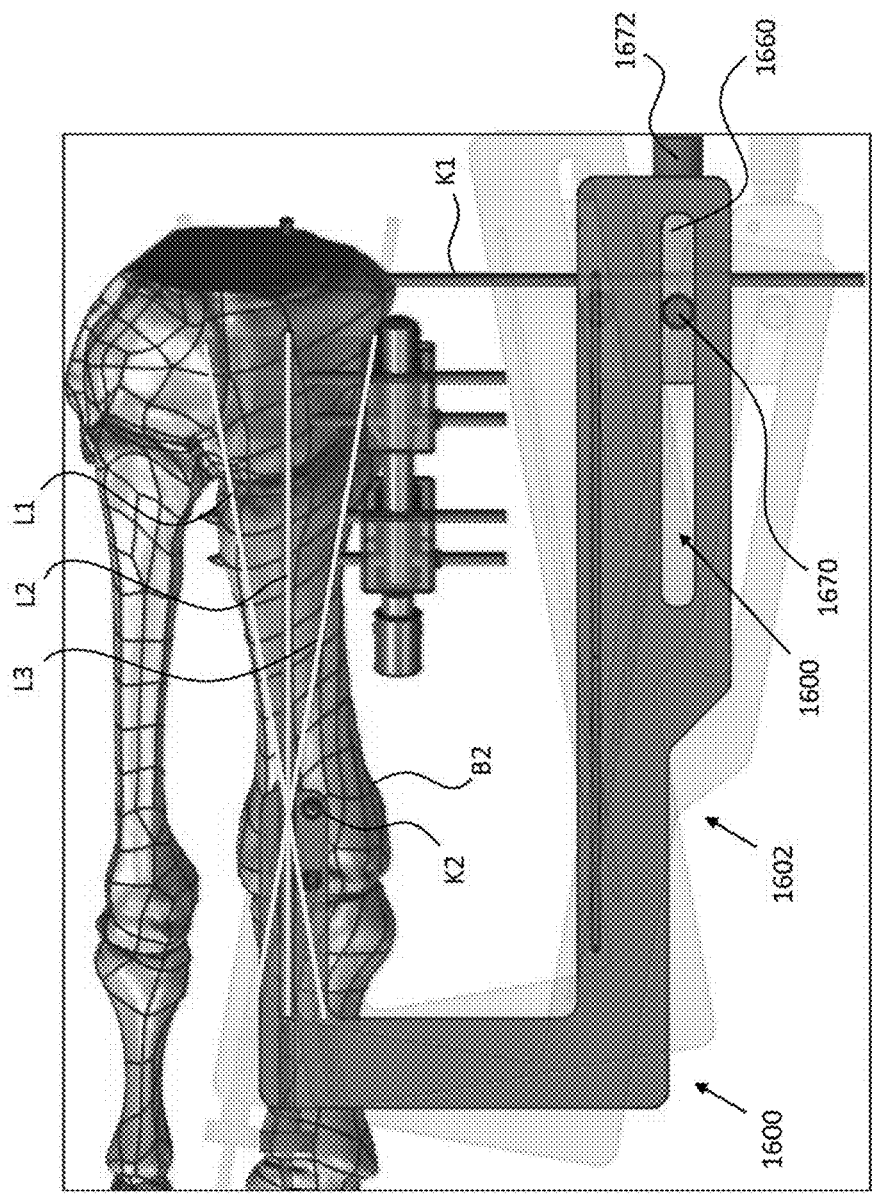
FIG. 49 illustrates one example of a range of motion of the targeting arm illustrated in FIGS. 36-44 in accordance with some embodiments.

As best seen in FIG. 49, the position of targeting arm relative to the longitudinal axis defined by the second bone B2 may be adjusted even when coupled to the first and second bones B1, B2 by k-wires K1, K2. More specifically, the alignment arm 1600 is able to rotate about a longitudinal axis of k-wire K2 (by virtue of hole 1634) while at the same time being able to slide along the longitudinal axis of k-wire K1. The targeting arm 1600 is able to translate along the longitudinal axis of k-wire K1 as targeting arm 1600 rotates about the axis of k-wire K2 due to the ability of adjustment guide block 1660 to rotate about the longitudinal axis defined by dowel 1670 that is secured within slots 1622, 1624 defined by arm portion 1602 of targeting arm 1600 and due to the ability of adjustment guide block 1660 to slide along slots 1622, 1624.

Targeting slot 1632 provides the surgeon with a visual indication of the insertion axis defined by the hole 1658 defined by sleeve 1650 that is supported by targeting arm 1600. For example and as mentioned above, slot 1632 is sized and configured to receive a pin or other radiopaque member that provides a visual indication (either with or without the use of fluoroscopy) of the trajectory of a pin or other surgical device if inserted into hole 1640. Lines L1, L2, and L3 in FIG. 49 illustrate one example of a range of motion of the targeting arm 1600 when coupled to the first and second bones B1, B2 via wires K1, K2 prior to its position being fixed or locked. When the desired position has been achieved, the locking screw 1672 is turned to provide a frictional engagement with the k-wire K1 disposed within hole 1664 of adjustment guide block 1660. The frictional engagement between locking screw 1672 and k-wire K1 will lock the position of the targeting arm 1600 as the adjustment guide block 1660 (and thus the targeting arm 1600) will be prevented from translating along the length of k-wire K1.

As noted above, targeting arm 1600 may include one or more radiopaque members 1626, which are shown in FIGS. 51 and 52. FIG. 51 provides one example of a medial view of the targeting arm 1600 coupled to the first and second bones B1, B2 and showing the sleeve 1650 located between the radiopaque members 1626. FIG. 52 provides one example of an anterior-posterior view (e.g., top down) view of the targeting arm 1600 coupled to the first and second bones B1, B2. Radiopaque members 1626 appear to be a single radiopaque member in FIG. 52, which indicates the proper alignment. When properly aligned, the slot 1632 (and any pin or radiopaque member inserted within slot) provides an over the skin trajectory confirmation for hole 1640.

When the alignment and location of the alignment arm 1600 has been confirmed, then a k-wire, pin, or other fixation element K3 is placed by inserting it through sleeve 1650. Once the k-wire, pin, or other fixation element K3 has been placed, the targeting arm 1600 and compression/distraction jig 1500 may be removed. The incision may then be closed as will be understood by one of ordinary skill in the art.

The system and method described herein, including those described above with respect to FIGS. 33-53, advantageously allows a surgeon or other user to percutaneously select an end point and a start point for the placement of a fixator across a joint (e.g., a first TMT joint for a Lapidus procedure). By placing a targeting k-wire in a target location from the medial side of the foot and making a dorsal incision above (and distal to) the desired screw entry point, the user may select the angle in the lateral view at which the screw will be placed. The built-in adjustment functionality provided by the targeting arm enables a user to switch to the AP (e.g., top-down) view to ensure the trajectory follows an appropriate angle. Once the desired angle is reached or has been achieved, a locking mechanism (e.g., a locking screw) may be used to fix the position of the targeting arm relative to the joint (and bones comprising the joint)). Further, as discussed above, the use of radiopaque markers and slots or other markings provide for the ability to check and/or confirm the trajectory.

Moreover, the disclosed systems and methods advantageously provide a surgeon with the ability to control compression, distraction, and rotation of bones in three anatomical planes. Such systems and methods may be used in correct hallux valgus deformities or other deformities as will be understood by one of ordinary skill in the art.

Although the jigs, systems, and methods have been described in terms of exemplary embodiments, they are not limited thereto. Rather, the appended claims should be construed broadly, to include other variants and embodiments, which may be made by those skilled in the art without departing from the scope and range of equivalents of the jigs, systems, and methods.

What is claimed is:

1. A system, comprising:
   a first tool, including:
      a first component;
      a second component; and
      at least one fastener for coupling the first component to the second component, the at least one fastener including a first threaded fastener for coupling the first component to the second component and for adjusting the distance between the first component and the second component;
   a second tool for positioning the first tool relative to a joint, the second tool configured to be coupled to an unthreaded section of the first threaded fastener;
   a third tool including a frame having a coupling section for coupling the third tool to the first tool; and
   a tool holder subassembly coupled to the frame, the tool holder subassembly including a tool guide for guiding a surgical instrument, the tool holder subassembly further includes a body for being coupled to the frame such that the body may be rotated relative to the frame, the body further configured to support the tool guide such that the tool guide is able to pivot about a pivot point;
   wherein the first component is coupled to the second component such that a distance between the first component and the second component in a first direction is adjustable, and
   wherein the first tool is configured to provide a controlled adjustment of a first bone relative to a second bone in a second direction that is different from the first direction.

2. The system of claim 1, wherein the first threaded fastener includes:
   a first threaded section having at least one thread of a first type; and
   a second threaded section having at least one thread of a second type that is different from the first type.

3. The system of claim 2, wherein the first threaded fastener includes an unthreaded section disposed between the first threaded section and the second threaded section, the unthreaded section including an area having an enlarged diameter relative to at least one of the first threaded section and the second threaded section.

4. The system of claim 1, wherein the at least one fastener includes a first unthreaded fastener for preventing rotation of the first component relative to the second component.

5. The system of claim 1, wherein
   the first component is configured to receive a first insert, the first insert configured to rotate relative to the first component; and
   the second component is configured to receive a second insert, the second insert configured to rotate relative to the second component.

6. The system of claim 5, wherein the first component is configured to move axially relative to the second component in response to a second fastener being rotated relative to the first component.

7. The system of claim 5, wherein each of the first component and the second component is configured to receive a respective fixation device for securing the first tool to at least one bone.

8. The system of claim 1, wherein
the second component defines a slot and a first hole,
the slot is sized and configured to receive a fixation device for coupling the second component to a bone,
the first hole is in communication with the slot and is sized and configured to receive a second fastener such that movement of the second fastener along an axis defined by the first hole causes movement of the fixation device when the fixation device is received within the slot.

9. The system of claim 1, wherein the body defines a hole for receiving a locking device for preventing rotation of the body relative to the frame.

10. The system of claim 1, wherein the body includes a track defining a curved channel for supporting the tool holder as the tool holder pivots about the pivot point.

11. The system of claim 1, wherein the the tool guide defines a hole for receiving a locking device for preventing rotation of the the tool guide relative to the frame.

12. The system of claim 1, wherein the the tool guide includes a track defining a curved channel for supporting the tool holder as the tool holder pivots about the pivot point.

13. A system, comprising:
a first tool for being coupled to a first bone and a second bone that together form a joint, the first tool including:
a first body component configured to receive one or more fixation devices for coupling the first body component to the first bone,
a second body component configured to receive one or more fixation devices for coupling the second body component to the second bone,
a first threaded fastener for coupling the first body component to the second body component and for adjusting the distance between the first component and the second component, the first threaded fastener including a first threaded section and a second threaded section;
a second tool for positioning the first tool relative to the joint, the second tool configured to be coupled to an unthreaded section of the first threaded fastener;
a third tool including a frame including a coupling section for coupling the third tool to the first tool; and
a tool holder subassembly coupled to the frame, the tool holder subassembly including a tool guide for guiding a surgical instrument, the tool holder subassembly further includes a body for being coupled to the frame such that the body may be rotated relative to the frame, the body further configured to support the tool guide such that the tool guide is able to pivot about a pivot point;
wherein rotation of the first threaded fastener in a first direction causes the first and second body components to move toward each other in a second direction to compress the joint and rotation of the first threaded fastener in a third direction causes the first and second body components to move away from each other in a fourth direction to distract the joint, and
wherein the first body component is configured to translate in a fifth direction relative to the second body component to translate the first bone relative to the second bone.

* * * * *